US006802898B1

(12) United States Patent
Liskowitz et al.

(10) Patent No.: US 6,802,898 B1
(45) Date of Patent: *Oct. 12, 2004

(54) METHOD FOR PREPARING FLY ASH FOR HIGH COMPRESSIVE STRENGTH CONCRETE AND MORTAR, AND COMPOSITIONS THEREOF

(75) Inventors: John W. Liskowitz, Belle Meade, NJ (US); Dennis Just, Akron, OH (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/234,810

(22) Filed: Jan. 21, 1999

(Under 37 CFR 1.47)

Related U.S. Application Data

(63) Continuation-in-part of application No. 08/768,167, filed on Dec. 13, 1996, now abandoned.
(60) Provisional application No. 60/008,690, filed on Dec. 15, 1995.

(51) Int. Cl.[7] .......................... C04B 18/06; C04B 14/00
(52) U.S. Cl. ....................... 106/705; 106/709; 106/405; 106/DIG. 1; 241/5
(58) Field of Search ............................ 106/705, 709, 106/405, DIG. 1; 241/5

(56) References Cited

U.S. PATENT DOCUMENTS

| | | | | |
|---|---|---|---|---|
| 2,250,107 A | | 7/1941 | Nelles | |
| 2,987,408 A | | 6/1961 | Minnick | |
| 3,669,703 A | * | 6/1972 | Pennachetti et al. | 106/405 |
| 3,852,084 A | | 12/1974 | Webster et al. | |
| 4,210,457 A | | 7/1980 | Dodson et al. | |
| 4,504,320 A | | 3/1985 | Rizer et al. | |
| 5,346,012 A | * | 9/1994 | Heathman et al. | 166/293 |
| 5,624,491 A | * | 4/1997 | Liskowitz et al. | 106/705 |
| 5,772,752 A | * | 6/1998 | Liskowitz et al. | 106/705 |

FOREIGN PATENT DOCUMENTS

| | | |
|---|---|---|
| GB | 940692 | 10/1963 |
| GB | 1527485 | 10/1978 |
| WO | WO 95/32162 | 11/1995 |
| WO | WO 95/32423 | 11/1995 |

OTHER PUBLICATIONS

Aitcin et al. (1986), Fly Ash, Silica Fume, Slag, and Natural Pozzolans in Concrete, SP–91, American Concrete Institute, Detroit, pp. 91–113.
Berry and Malhotra, 1980, ACI J. Proceedings 77:59–73.
Berry et al. (1989), Fly Ash, Silica Fume, Slag, and Natural Pozzolans in Concrete, SP–114, American concrete Institute, Detroit, pp. 241–273.
Giaccio and Malhotra (1988), Cement, Concrete, and Aggregates 10:88–95.
Giergiczny et al. (1989), Fly Ash, Silica Fume, Slag, and Natural Pozzolans in Concrete, SSP–114, American Concrete Institute, Detroit, pp. 97–115.
He et al. 1984, Cement and Concrete Research 14:505–511.
Lane and Best (1982) Concrete Int'l: Design & Construction 4:81–92.
Liskowitz et al., 1983, "Sorbate Characteristic of Fly Ash," Final Report, U.S. Dept. of Energy, Morgantown Energy Technology Center, p. 211.
Plowman, 1984, Proceedings, 2nd Int'l Conference on Ash Technology and Marketing, London, pp. 437–443.
Popovics, 1982, ACI J. Proceedings 79:43–49.
Ravina , 1980, Cement and Concrete Research 10:573–580.
Ravindrarajah et al. 1989, Fly Ash, Silica Fume, Slag, and Natural Pozzolans in Concrete, SP–114, American Concrete Institute, Detroit, pp. 139–155.
Swamy, 1984, Proceedings, 2nd Int'l Conference on Ash Technology and Marketing, London, pp. 359–367.
Ukita et al., 1989, SP–114, American Concrete Institute, Detroit, pp. 219–240.

* cited by examiner

*Primary Examiner*—Elizabeth D. Wood
(74) *Attorney, Agent, or Firm*—Klauber & Jackson

(57) ABSTRACT

The present invention relates to concrete, mortar and other hardenable mixtures comprising cement and fly ash for use in construction. The invention relates to hardenable mixtures comprising cement and fly ash which can achieve greater compressive strength than hardenable mixtures containing only concrete over the time period relevant for construction. In a specific example, processing fly ash by grinding to the desired size distribution range gives a 100% yield of fly ash for utilization in high quality concrete and mortar. Such materials can thus significantly reduce construction costs, as well as provide a useful outlet for material that is generally regarded as a pollutant and a nuisance.

57 Claims, 23 Drawing Sheets

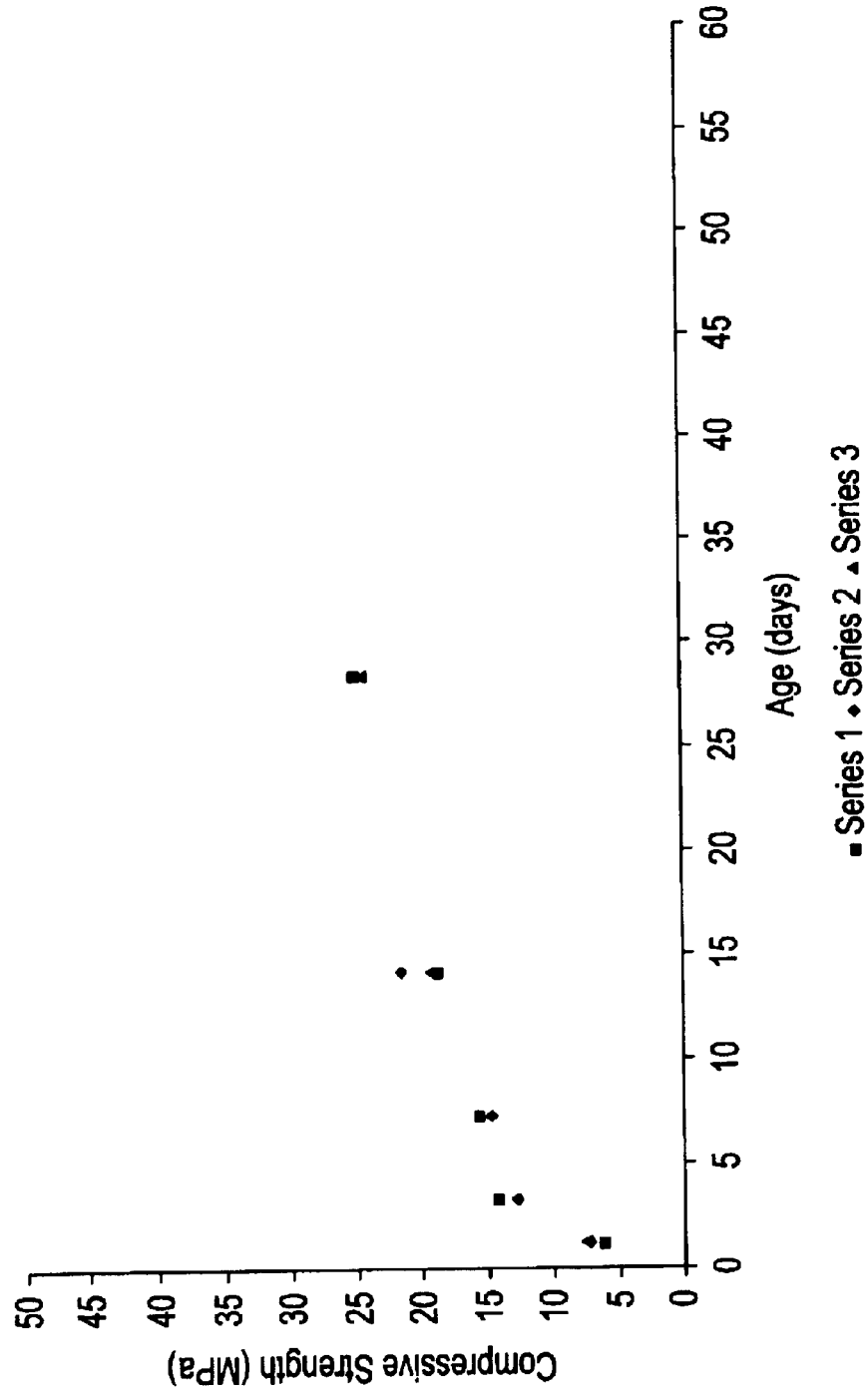

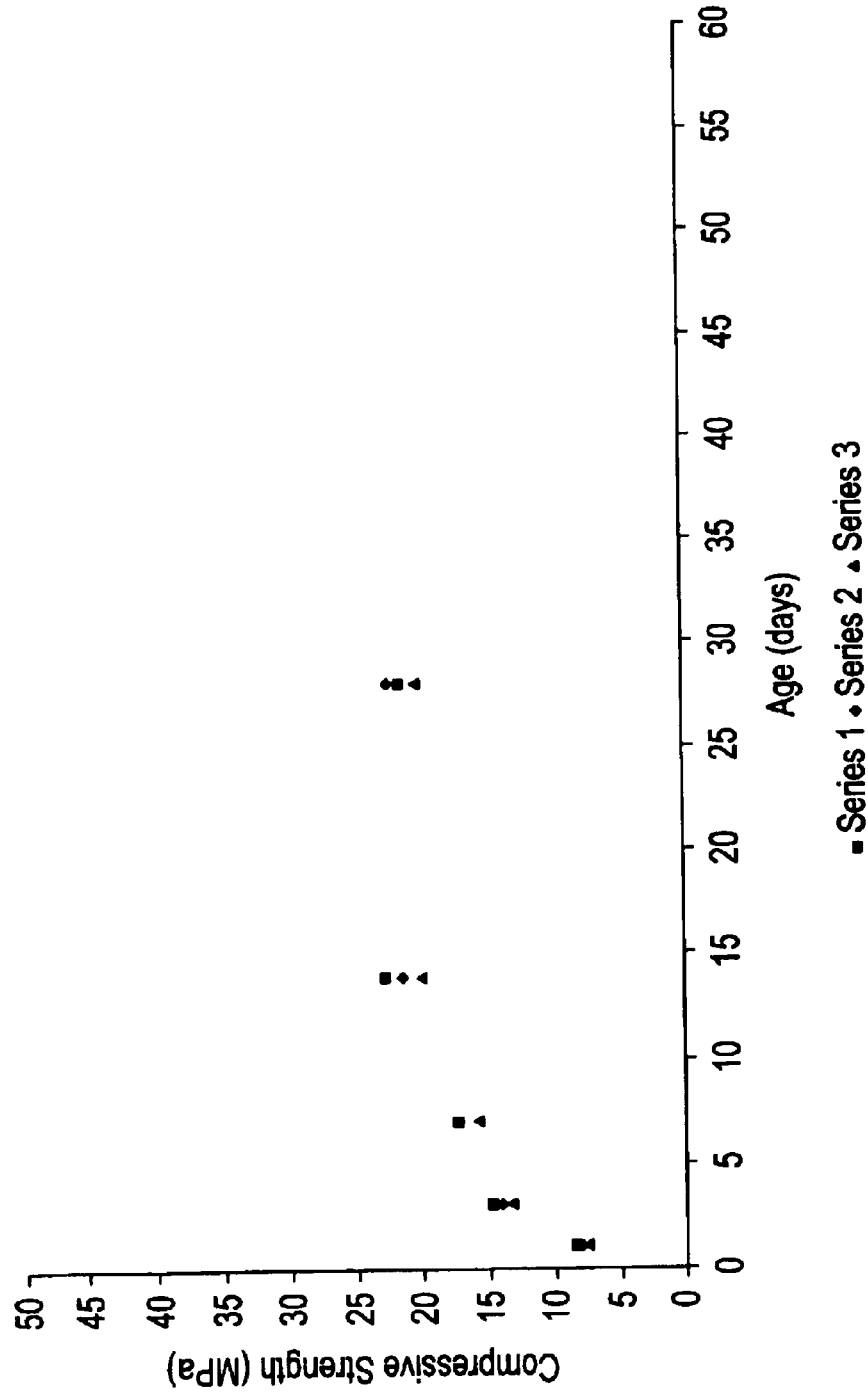

KINEMATIC POROSITY     EXPANDED MEDIA

Revolving arm hits grinding media   Media moves forward rapidly   Media collides with media, breaking up product particle

MEDIA AT REST

Stationary Shaft

EXPANDED MEDIA
Rotating Shaft

METHOD FOR PREPARING FLY ASH FOR HIGH COMPRESSIVE STRENGTH CONCRETE AND MORTAR, AND COMPOSITIONS THEREOF

CROSS REFERENCE TO RELATED APPLICATIONS

The instant application is a continuation-in-part of U.S. patent application Ser. No. 08/768,167 entitled "Method for Preparing Fly Ash for High Compressive Strength Concrete and Mortar, and Compositions thereof", which was filed Dec. 13, 1996 now abandoned, and is hereby incorporated by reference herein in its entirety, which claims priority under 35 U.S.C. § 119(e) of provisional patent Application No. 60/008,690, filed Dec. 15 1995, which is also hereby incorporated by reference in its entirety.

FIELD OF THE INVENTION

The present invention relates to concrete, mortar and other hardenable mixtures comprising cement and fly ash for use in construction. The invention includes a method for predicting the compressive strength of such a hardenable mixture, which is very important for planning a project. The invention further provides means to produce fly ash of a desired size modulus with a 100% yield in desirable production quantities for use in hardenable mixtures, along with hardenable mixtures comprising cement and fly ash which can achieve greater compressive strength than hardenable mixtures containing only cement without fly ash over the time period relevant for construction. Also provided is a method for the continuous production of fly ash with a 100% yield in desirable production quantities.

BACKGROUND OF THE INVENTION

Fly ash, a by-product of coal burning power plant, is produced worldwide in large quantities each year. In 1988, approximately 84 million tons of coal ash were produced in the U.S. in the form of fly ash (60.7%), bottom ash (16.7%), boiler slag (5.9%), and flue gas desulfurization (16.7%) (Tyson, 1990, Coal Combustion By-Product Utilization Seminar, Pittsburgh, 15 pp.). Out of the approximately 50 million tons of fly ash generated annually, only about 10 percent is used in concrete (ACI Committee 226, 1987, "Use of Fly Ash In Concrete," ACI 226.3R-87, ACI J. Proceedings 84:381–409) while the remaining portion is mostly disposed of as waste in landfills.

It is generally more beneficial for a utility to sell its ash, even at low or subsidized prices, rather than to dispose of it in a landfill, since this will avoid the disposal cost. In the 1960's and 70's the cost of ash disposal was typically less than $1.00 per ton. However, due to the more stringent environmental regulations starting in the late 1970's, the cost of ash disposal has rapidly increased to from $2.00 to $5.00 per ton and is still rising higher (Bahor and Golden, 1984, Proceedings, 2nd International Conference on Ash Technology and Marketing, London, pp. 133–136). The shortage of landfill due to environmental concerns has further escalated the disposal cost. The Environmental Protection Agency (EPA) estimated in 1987 that the total cost of waste disposal at coal fired power plants ranged from $11.00 to $20.00 per ton for fly ash and bottom ash (Courst, 1991, Proceedings: 9th International Ash Use Symposium, 1:21-1 to 21-10). This increasing trend of disposal cost has caused many concerns and researchers are urgently seeking means for better utilization of fly ash. One potential outlet for fly ash is incorporation in concrete or mortar mixtures.

Fly ash is used in concrete in two distinct ways, one as a replacement for cement and the other as a filler. The first use takes advantage of the pozzolanic properties of fly ash, which, when it reacts with lime or calcium hydroxide, can enhance the strength of cementitious composites. However, fly ash is relatively inert and the increase in compressive strength can take up to 90 days to materialize. Also, since fly ash is just a by-product from the power industry, the quality of fly ash has always been a major concern to the end users in the concrete industry.

Incorporation of fly ash in concrete improves workability and thereby reduces the water requirement with respect to the conventional concrete. This is most beneficial where concrete is pumped into place. Among numerous other beneficial effects are reduced bleeding, reduced segregation, reduced permeability, increased plasticity, lowered heat of hydration, and increased setting times (ACI Committee 226, 1987, supra). The slump is higher when fly ash is used (Ukita et al., 1989, SP-1 14, American Concrete Institute, Detroit, pp.219–240).

However, the use of fly ash in concrete has many drawbacks. For example, addition of fly ash to concrete results in a product with low air entrainment and low early strength development.

As noted above, a critical drawback of the use of fly ash in concrete is that initially the fly ash significantly reduces the compressive strength of the concrete. Tests conducted by Ravindrarajah and Tam (1989, Fly Ash, Silica Fume, Slag, and Natural Pozzolans in Concrete, SP-114, American Concrete Institute, Detroit, pp. 139–155) showed that the compressive strength of fly ash concrete at early ages are lower than those for the control concrete, which is a general property of concrete or mortar when fly ash is added. Most of the reported studies tend to show a lower concrete strength due to the presence of fly ash; none has yet suggested a solution to actually enhance the property of concrete economically. Yet, for fly ash to be used as a replacement for cement, it must be comparable to cement in terms of strength contribution at a point useful in construction. As a practical matter, this means that the fly ash concrete must reach an acceptable compressive strength within about 2 weeks.

Swamy (1984, Proceedings, 2nd International Conference on Ash Technology and Marketing, London, pp. 359–367) showed that 30% replacement by weight, and inclusion of a high dose of a superplasticizer, yielded concrete with material properties and structural behavior almost identical to those of concrete of similar strength without fly ash. However, due to the high cost of superplasticizer, mix proportions were not economical.

Fly ashes from different sources may have different effect to concrete. The same fly ash may behave differently with Portland cements of different types (Popovics, 1982, ACI J. Proceedings 79:43–49), since different types of Portland cement (type I to V) have different chemical composition. Other factors relating to the effects of fly ash on concrete that are not presently understood are lime availability, the rate of solubility and reactivity of the glassy phase in different fly ash, and the proper mix proportion to ensure early strength development of fly ash concrete.

Fly ash particles are typically spherical, ranging in diameter from 1 to 150 microns (Berry and Malhotra, 1980, ACI J. Proceedings 77:59–73). Aitcin et al. (1986, Fly Ash, Silica Fume, Slag, and Natural Pozzolans in Concrete, SP-91, American Concrete Institute, Detroit, pp. 91–113) showed that if the average diameters, $D_{50}$, of fly ash are smaller, the surface area of the fly ash will be larger than those with larger average diameters. Many factors affect the size or average diameter of fly ash, including storage conditions, ash collection processes, and combustion conditions. Combustion conditions are perhaps most important, because these determine whether carbon remains in the ash or if combustion is complete.

There are two main forms of combustion: dry bottom boiler combustion and wet bottom boiler combustion. The main difference between the two types of boiler is that wet bottom boilers reach the fusion temperature of ash, thus resulting in fly ash with greater glass characteristics.

There are generally two methods known to measure the fineness of fly ash. The first is by measuring the residue on the 45 micron (No. 325 sieve), which is the method used in the United States. The second method is the surface area method by air permeability test. Lane and Best (1982, Concrete International: Design & Construction 4:81–92) suggested that 45 microns sieve residue is a consistent indicator of pozzolanic activity. For use in concrete or mortar, ASTM C 618 (1990, ASTM C 618-89a, *Annual Book of ASTM Standards*, Vol. 04.02) specifies that not more than 34% by weight of a given fly ash be retained on a 45 microns sieve. However, Ravina (1980, Cement and Concrete Research 10:573–580) reported that specific surface area provides a more accurate indicator of pozzolanic activity.

Research carried out by Ukita et al. (1989, supra) purported that as the percentage of finer particles, i.e., those particles ranging from diameters of 1 to 20 microns, in concrete increases, the corresponding strength gain is notable. Similar observations have been reported by Giergiczny and Werynska (1989, Fly Ash, Silica Fume, Slag, and Natural Pozzolans in Concrete, SSP-114, American Concrete Institute, Detroit, pp. 97–115).

Both of the groups mentioned above describe results with fly ash of disparate characteristics and sources, but did not include controls for these variable. Thus, although the emphasis of these reports is on the performance of finer particle fly ashes, the variables introduced into the studies lead to reservations with respect to any conclusions that may be drawn. In particular, Ukita et al. (1989, supra) collected fly ash from different locations. However, an earlier report demonstrated that fly ashes collected from different locations have different chemical properties (Liskowitz et al., 1983, "Sorbate Characteristic of Fly Ash," Final Report, U.S. Dept. of Energy, Morgantown Energy Technology Center, p. 211). Giergiczny and Werynska (1989, supra) ground the original fly ash into different sizes. Grinding can add metal particles into the fly ash, and also tends to yield unnaturally shaped particles of fly ash. Thus, these reports fail to provide conclusive information about the effect of fine particle size on the properties imparted by fly ash.

Berry et al. (1989, Fly Ash, Silica Fume, Slag, and Natural Pozzolans in Concrete, SP-114, American concrete Institute, Detroit, pp. 241–273) studied the properties of fly ash with particle size smaller than 45 microns, so called "beneficiated" fly ash, in mortar. Fly ashes of this particle size showed improved pozzolanic activity, reduced water demand and enhanced ability to reduce alkali-aggregate reactivity.

Although beneficiated fly ash seem to show promising results in terms of improved performance of mortar, other researchers concluded otherwise when used in concrete. Giaccio and Malhotra (1988, Cement, Concrete, and Aggregates 10:88–95) also conducted the test using the beneficiated fly ashes. They showed that the concrete made with ASTM type I cement, the use of beneficiated fly ash and condensed silica fume did little to enhance the properties of concrete compared with the raw fly ash.

As explained above, efforts have been made to grind fly ash recovered from boilers so that they have a particle size in order to increase their pozzolanic activity and thus substitute for pozzolanic materials such as cement having comparable contribution at a point useful in construction as concrete that does not use fly ash. Grinding the fly ash has met with only limited success. There are numerous means to grind fly ash so that it can be used as a pozzolanic material. One such method involves grinding the fly ash with a grinding medium, such as zirconium silicate particles. In particular, Perry's Chemical Engineers Handbook, $6^{TH}$ Edition, teaches that in order to grind fly ash into particles having an appropriate size for use as a substitute for cement in concrete or mortar, the volume of fly ground should be equal to or greater than the void volume of the grinding material [page 8–32 of Perry's Handbook, $6^{th}$ Edition]. However, these grinding methods have met with only limited success in that the yield of fly ash particles having a diameter less than about 12 $\mu$m is low. As a result, much fly ash is wasted, and the grinding process is not economical.

Accordingly, what is needed are methods of grinding fly ash into particles that have a size that permits its use in concrete or mortar that undergo strength development comparable to, or superior to concrete and mortar comprising no fly ash, and which are readily used in the construction industry.

There is also a need utilize all of the fly ash produced in coal-dust fired boilers, thus decreasing the amount of waste produced by boilers, and decreasing the amount of cement used in the construction industry.

There is a further need to process fly ash efficiently to provide about 100% yield of useful product in desirable production quantities.

There is a further need in the art for high strength concrete and mortar containing fly ash.

There is yet a further need in the art for the utilization of fly ash generated during coal combustion.

These and other needs in the art are addressed in the instant application.

The citation or identification of any reference in this application shall not be construed as an admission that such reference is available as prior art to the present invention.

SUMMARY OF THE INVENTION

The present invention relates to hardenable mixtures comprising processed fly ash of a defined fineness as a replacement for cement in cementitious materials, which hardenable mixtures achieve compressive strength that is about equal to or greater than the compressive strength of the same hardenable mixture without fly ash in a time period that is acceptable for construction and other applications. In particular embodiments, the hardenable mixture can be concrete or mortar, as hereinafter defined.

The invention is related to the invention disclosed and claimed in U.S. Pat. No. 5,624,491 and in International Patent Publication No. WO 95/32423, published Nov. 30, 1995, of PCT International Patent Application No. PCT/US95/06182, both entitled "IMPROVED COMPRESSIVE STRENGTH OF CONCRETE AND MORTAR CONTAINING FLY ASH," each of which is incorporated herein by reference in their entireties. However, the present invention is based on the discovery that fly ash having desirable characteristics, such as a fineness modulus as defined in U.S. Pat. No. 5,624,491 and International Publication No. WO 95132423 (PCT/US95/06182), can be prepared by dry processing fly ash from boilers so as to shift the entire distribution of sizes to a desired range, while retaining substantially uniform spherical shape of the processed fly ash. This invention advantageously avoids the need for size fractionation, e.g., by air classification, and provides a product with approximately 100% yield in desirable production quantities that, when incorporated in a hardenable mixture, such as concrete or mortar, demonstrates compressive strength properties that are equal to or better than fractionated fly ash achieves with such classification methodology, such as air classification.

Broadly, the present invention extends to fly ash characterized by:
  a. substantially uniform spherical shape;
  b. greater than about 90% of the particles have a diameter of less than 11 µm, greater than about 60% of the particles have a diameter of less than 5.5 µm, and greater than about 15% of the particles have a diameter of less than 1.375 µm;
  c. a median particle diameter of less than about 4.0 µm; and
  b. a range of particle diameters of from about 0.1 µm to about 70 µm.

Furthermore, the present invention extends to fly ash as described above, wherein greater than about 93% of the particles have a diameter of less than 11 µm, greater than about 70% of the particles have a diameter of less than 5.5 µm, and greater than about 18% of the particles have a diameter of less than 1.375 µm.

In a particular embodiment, the present invention extends to fly ash characterized by having a median particle diameter of less than about 3.0 µm.

Furthermore, the present invention extends to fly ash as described above, wherein the range of particle diameters is from about 0.9 µm to about 62 µm.

Furthermore, any type of fly ash described herein has applications in the invention. In a particular embodiment, the fly ash is prepared by grinding unfractionated fly ash. Methods of grinding fly ash are set forth infra.

The present invention further extends to concrete and mortar which utilize fly ash. In particular, the present invention extends to a concrete comprising about 1 part by weight cementitious materials, about 1 to about 3 parts by weight fine aggregate, about 1 to about parts by weight coarse aggregate, and about 0.35 to about 0.6 parts by weight water. The cementitious materials of concrete and mortar of the invention comprise from about 10% to about 50% by weight the fly ash characterized by:
  a. substantially uniform spherical shape;
  b. greater than about 90% of the particles have a diameter of less than 11 µm, greater than about 60% of the particles have a diameter of less than 5.5 µm, and greater than about 15% of the particles have a diameter of less than 1.375 µm;
  c. a median particle diameter of less than about 4.0 µm; and
  b. a range of particle diameters of from about 0.1 µm to about 70 µm.

The concrete or mortar of this embodiment also comprises about 50% to about 90% by weight cement.

In addition, the present invention extends to a concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight fly ash characterized by:
  a. substantially uniform spherical shape;
  b. greater than about 93% of the particles have a diameter less than 11 µm, greater than about 70% of the particles have a diameter less than 5.5 µm, and greater than about 18% of the particles have a diameter of less than 1.375 µm;
  c. the median particle diameter is less than about 3.0 µm; and
  d. the range of particle diameters is from about 0.9 µm to about 62 µm, and about 50% to about 90% by weight cement.

Optionally, concrete of the invention as described above can further comprise silica fume, glass fibers, or a combination thereof.

In another embodiment the present invention extends to a mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash and about 50% to about 90% by weight cement, wherein the fly ash is characterized by:
  a. substantially uniform spherical shape;
  b. greater than about 90% of the particles have a diameter of less than 11 µm, greater than about 60% of the particles have a diameter of less than 5.5 m, and greater than about 15% of the particles have a diameter of less than 1.375 µm;
  c. a median particle diameter of less than about 4.0 µm; and
  d. a range of particle diameters of from about 0.1 µm to about 70 µm.

In another embodiment, the present invention extends to a mortar comprising about 1 part by weight cementitious materials, about 1 to about 3 parts by weight fine aggregate, and about 0.35 to about 0.6 parts by weight water, wherein the cenientitious materials comprise from about 10% to about 50% by weight the fly ash and about 50% to about 90% by weight cement, wherein the fly ash is characterized by:
  a. substantially uniform spherical shape;
  b. greater than about 93% of the particles have a diameter less than 11 µm, greater than about 70% of the particles have a diameter less than 5.5 µm, and greater than about 18% of the particles have a diameter of less than 1.375 µm;
  c. the median particle diameter is less than about 3.0 µm; and
  d. the range of particle diameters is from about 0.9 µm to about 62 µm, and about 50% to about 90% by weight cement.

Optionally, a mortar of the invention can further comprise silica fume, glass fibers, or a combination thereof.

The present invention also extends to methods for preparing fly ash, so as to shift the size distribution of fly ash particles, such that the finished fly ash has the following characteristics:
  a. substantially uniform spherical shape;
  b. greater than about 90% of the particles have a diameter of less than 11 µm, greater than about 60% of the particles have a diameter of less than 5.5 µm, and greater than about 15% of the particles have a diameter of less than 1.375 μm;

c. a median particle diameter of less than about 4.0 μm; and d. a range of particle diameters of from about 0.1 μm to about 70 μm.

The present invention encompasses numerous methods of producing fly ash having characteristics as described above. One such method involves a fluidized bed grinding process. In particular, the present invention extends to a method for preparing fly ash as described above, wherein the processing comprises grinding with a fluidized bed grinding process such that the volume of fly ash ground in the process is less than the void volume of the grinding medium. As a result, the collisions between the fly ash and grinding medium occur at a sufficient frequency to grind the fly ash and shift the size distribution of fly ash particles. In a particular embodiment, the ratio of fly ash to grinding medium comprises about one part unfractionated fly ash to about seven parts grinding media (by weight). In another embodiment, the ratio of fly ash to grinding medium comprises about one part fly ash to about 4 parts grinding medium, by volume. It has been discovered that fly ash serves as a lubricant during the grinding process. As a result, the high temperatures that would be expected in a situation where the volume of fly ash is less than the void volume of the grinding medium are not realized.

Furthermore, numerous grinding medium have applications in the fluidized bed grinding process of the invention. Examples of grinding medium having applications herein include, but certainly are not limited to, zirconium silicate, carbon steel, chromium steel, or stainless steel, to name only a few.

Furthermore, the present invention extends to concrete and mortar compositions. More specifically, in one embodiment, the present invention extends to a concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight fly ash and about 50% to about 90% by weight cement, wherein the fly ash is characterized by:

a) substantially uniform spherical shape;

b) greater than about 90% of the particles have a diameter of less than 11 μm, greater than about 60% of the particles have a diameter of less than about 5.5 μm, greater than about 60% of the particles have a diameter of less than 5.5 μm, and greater than about 15% of the particles have a diameter of less than 1.375 μm;

c) a median particle diameter of less than about 4.0 μm; and d) a range of particle diameters of from about 0.1 μm to about 70 μm.

Furthermore, a concrete of the invention, as described above, can further comprise glass fibers, silica fume, or a combination thereof.

In addition, the present invention extends to concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight fly ash and about 50% to about 90% by weight cement, wherein the fly ash is characterized by:

a. substantially uniform spherical shape;

b. greater than about 93% of the particles have a diameter less than 11 μm, greater than about 70% of the particles have a diameter less than 5.5 μm, and greater than about 18% of the particles have a diameter of less than 1.375 μm;

c. the median particle diameter is less than about 3.0 μm; and d. the range of particle diameters is from about 0.9 μm to about 62 μm, and about 50% to about 90% by weight cement.

Naturally, a concrete of the invention as described above, can further comprise silica fume glass fibers, or a combination thereof.

Also, the present invention extends to a mortar comprising about 1 part by weight cementitious materials, about 1 to about 3 parts by weight fine aggregate, and about 0.35 to about 0.6 parts by weight water, wherein the cementitious materials comprise from about 10% to about 50% by weight fly ash and about 50% to about 90% by weight cement, wherein the fly ash is characterized by:

a) substantially uniform spherical shape;

b) greater than about 90% of the particles have a diameter of less than 11 μm, greater than about 60% of the particles have a diameter of less than about 5.5 μm, greater than about 60% of the particles have a diameter of less than 5.5 μm, and greater than about 15% of the particles have a diameter of less than 1.375 μm;

c) a median particle diameter of less than about 4.0 μm; and d) a range of particle diameters of from about 0.1 μm to about 70 μm.

In another embodiment, mortar of the invention comprises about 1 part by weight cementitious materials, about 1 to about 3 parts by weight fine aggregate, and about 0.35 to about 0.6 parts by weight water, wherein the cementitious materials comprise from about 10% to about 50% by weight fly ash and about 50% to about 90% by weight cement, wherein the fly ash is characterized by:

a. substantially uniform spherical shape;

b. greater than about 93% of the particles have a diameter less than 11 μm, greater than about 70% of the particles have a diameter less than 5.5 μm, and greater than about 18% of the particles have a diameter of less than 1.375 μm;

c. the median particle diameter is less than about 3.0 μm; and d. the range of particle diameters is from about 0.9 μm to about 62 )m, and about 50% to about 90% by weight cement.

What's more, a mortar of the invention, as described above, can further comprise glass fibers, silica fume, or a combination thereof.

Moreover, the present invention extends to a method for preparing fly ash comprising processing fly ash so as to shift the size distribution to have the following characteristics:

a) substantially uniform spherical shape;

b) greater than about 90% of the particles have a diameter of less than 11 μm, greater than about 60% of the particles have a diameter of less than about 5.5 μm, greater than about 60% of the particles have a diameter of less than 5.5 μm, and greater than about 15% of the particles have a diameter of less than 1.375 μm;

c) a median particle diameter of less than about 4.0 μm; and d) a range of particle diameters of from about 0.1 μm to about 70 μm.

In particular, the present invention extends to a method of preparing fly ash as described above, wherein the processing comprises grinding fly ash with a fluidized bed grinding process using a ratio of one part unfractionated fly ash with seven parts grinding medium (by weight).

Numerous grinding media are readily available to the skilled artisan and have applications in a method of the invention. Particular examples include zirconium silicate, stainless steel, or carbon steel, to name only a few.

Furthermore, fly ash ground in a method of the invention can be dry bottom boiler or wet bottom boiler fly ash.

Furthermore, the present invention extends to fly ash prepared so as to shift the size distribution to have the following characteristics:
  a. substantially uniform spherical shape;
  b. greater than about 90% of the particles have a diameter of less than 12 μm, greater than about 50% of the particles have a diameter of less than 5 μm, and greater than about 15% of the particles have a diameter of less than 2.3 μm;
  c. a median particle diameter of less than about 6.0 μm; and
  d. a range of particle diameters of from about 0.78 μm to about 30 μm.

In a particular embodiment, fly ash prepared to shift the size distribution as described above is by grinding the fly ash with a grinding medium in a non-expanded bed, wherein the volume of fly ash is less than the void volume of the grinding medium. For example, in one embodiment of the invention, the ratio of fly ash to grinding medium in the non-expanded bed grinding process is about 1 part fly ash to about 4 parts grinding medium, by volume. In another embodiment, the ratio of fly ash to grinding medium comprises about 1 part fly ash to about 18 parts grinding medium, by weight. Naturally, numerous grinding medium are available to with the requisite specific gravity for using in producing fly ash as described above. Examples include, but certainly are not limited to carbon steel or stainless steel. In a particular embodiment of the invention, the grinding medium comprises carbon steel spheres having a diameter of about ⅛ inch.

In yet another embodiment, the present invention extends to a concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight fly ash and about 50% to about 90% by weight cement, wherein the fly ash is characterized by:
  a) substantially uniform spherical shape;
  b) greater than about 90% of the particles have a diameter of less than 11 μm, greater than about 60% of the particles have a diameter of less than about 5.5 μm, greater than about 60% of the particles have a diameter of less than 5.5 μm, greater than about 60% of the particles have a diameter of less than 1.375 μm, and greater than about 15% of the particles have a diameter of less than 1.375 μm;
  c) a median particle diameter of less than about 4.0 μm; and
  d) a range of particle diameters of from about 0.1 μm to about 70 μm,
wherein the fly ash is prepared by grinding fly ash with a grinding medium with a fluidized bed grinding process such that the volume of fly ash ground in the process is less than the void volume of the grinding medium. In a particular embodiment, the ratio of fly ash to grinding medium comprises about one part unfractionated fly ash to about seven parts grinding media (by weight).

In addition, the present invention extends to a concrete as described above, wherein the grinding medium comprises zirconium silicate, stainless steel or carbon steel. In addition, optionally, the concrete can further comprises glass fibers, silica fume, or a combination thereof. In a preferred embodiment, the grinding medium comprises zirconium silicate with a diameter of about 2–2.5 mm.

Moreover, the present invention extends to a mortar comprising about 1 part by weight cementitious materials, about 1 to about 3 parts by weight fine aggregate, and about 0.35 to about 0.6 parts by weight water, wherein the cementitious materials comprise from about 10% to about 50% by weight fly ash and about 50% to about 90% by weight cement, wherein the fly ash is characterized by:
  a) substantially uniform spherical shape;
  b) greater than about 90% of the particles have a diameter of less than 11 μm, greater than about 60% of the particles have a diameter of less than about 5.5 μm, greater than about 60% of the particles have a diameter of less than 5.5 μm, and greater than about 15% of the particles have a diameter of less than 1.375 μm;
  c) a median particle diameter of less than about 4.0 μm; and
  d) a range of particle diameters of from about 0.1 μm to about 70 μm,
wherein the fly ash is prepared by grinding fly ash with a grinding medium with a fluidized bed grinding process such that the volume of fly ash ground in the process is less than the void volume of the grinding medium. In a particular embodiment, the ratio of fly ash to grinding medium comprises about one part unfractionated fly ash to about seven parts grinding media (by weight). Furthermore, just as with concrete of the invention, numerous grinding media can be used in a mortar of the invention. Examples of grinding medium having applications herein include, but are not limited to zirconium silicate, carbon steel, or stainless steel. In a particular embodiment, the grinding medium comprises zirconium silicate having a diameter of about 2–2.5 mm.

Furthermore, the present invention extends to a mortar as described above, further comprising glass fibers, silica fume, or a combination thereof.

In another embodiment, the present invention extends to a concrete comprising fly ash prepared using a non-expanded grinding bed process. In particular, the present invention extends to a concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight fly ash and about 50% to about 90% by weight cement, wherein the fly ash is characterized by:
  a. substantially uniform spherical shape;
  b. greater than about 90% of the particles have a diameter of less than 12 μm, greater than about 50% of the particles have a diameter of less than 5 μm. and greater than about 15% of the particles have a diameter of less than 2.3 μm;
  c. a median particle diameter of less than about 6.0 μm; and
  d. a range of particle diameters of from about 0.78 μm to about 30 μm.

The fly ash of this concrete of the invention is prepared by grinding the fly ash with a grinding medium in a non-expanded bed, wherein the volume of fly ash in the non-expanded bed is less than the void volume of the grinding medium. Numerous grinding medium have applications in a non-expanded bed grinding process involved in the concrete of the invention. In an embodiment, the ratio of fly ash to grinding medium comprises about 1 part fly ash to about 4 parts grinding medium by volume. In another embodiment, the ratio of fly ash to grinding medium comprises about 1 part fly ash to about 18 parts grinding medium by weight. Particular examples of grinding medium include, but are not limited to carbon steel or stainless steel. In a particular embodiment of concrete, the grinding medium comprises carbon steel having a diameter of about 1/8 inch.

Moreover, the present invention extends to a concrete as described above, further comprises glass fibers, silica fume, or a combination thereof.

Naturally, the present invention extends to a mortar comprising fly ash prepared using a non-expanded grinding bed process. More specifically, the present invention extends to a mortar comprising about 1 part by weight cementitious materials, about 1 to about 3 parts by weight fine aggregate, and about 0.35 to about 0.6 parts by weight water, wherein the cementitious materials comprise from about 10% to about 50% by weight fly ash and about 50% to about 90% by weight cement. The cementitious materials of mortar of the invention comprise from about 10% to about 50% by weight fly ash and about 50% to about 90% by weight cement, wherein the fly ash is characterized by:

a. substantially uniform spherical shape;
b. greater than about 90% of the particles have a diameter of less than 12 $\mu$m, greater than about 50% of the particles have a diameter of less than 5 $\mu$m, and greater than about 15% of the particles have a diameter of less than 2.3 $\mu$m;
c. a median particle diameter of less than about 6 $\mu$m; and
d. a range of particle diameters of from about 0.78 $\mu$m to about 30 $\mu$m.

The fly ash of mortar of the invention is prepared by grinding the fly ash with a grinding medium in a non-expanded bed, wherein the volume of fly ash in the non-expanded bed is less than the void volume of the grinding medium. In an embodiment of the invention, the ratio of fly ash to grinding medium in the non-expanded bed comprises about 1 part fly ash to about 4 parts grinding medium by volume. In another embodiment, the ratio of fly ash to grinding medium comprises about 1 part fly ash to about 18 parts grinding medium, by weight.

Numerous grinding media have applications in a mortar of the invention as described above. Examples include, but certainly are not limited to carbon steel or stainless steel. In a particular embodiment, the grinding medium comprises carbon steel, having a diameter of about 1/8 inch.

Moreover, numerous types of fly ash have applications in methods, concrete, or mortar of the invention. Particular examples include dry bottom fly ash, or wet bottom fly ash.

An important advantage of the present invention relates to the improved compressive strength properties contributed by the processed fly ash hardenable mixtures. For example, in mortar prepared using processed fly ash of the invention to replace 25% of the cement, "cross-over" in compressive strength of the mortar compared with a control mortar occurs within 7 to 14 days, and the compressive strength of the mortar containing processed fly ash is 50% greater than the control after 56 days.

As noted above, another advantage of the invention is that the process does not require fractionation, and allows for utilization of about 100% of the fly ash obtained from a boiler operation to produce desirable production quantities of fly ash. Quantitative utilization of the fly ash avoids the need to dispose of undesirable fly ash fractions, which addressed the concerns of utilities for abatement of this otherwise undesirable pollutant.

A further advantage of the invention is that the grinding process appears to release ammonia captured in the surface of fly ash produced from urea-treated coal (which is used to reduce $NO_x$ emissions). The presence of ammonia in fly ash renders it unsuitable for use in concrete or mortar.

Yet another advantage of the present invention is that processing minimizes the effects of boiler conditions on the fly ash properties associated with boiler conditions and the degree of coal pulverization, such that the fly ash is desirable as a cement replacement in hardenable mixtures. Accordingly, fly ash can be dry bottom boiler fly ash or wet bottom boiler fly ash.

As is readily apparent to one of ordinary skill in the art, selection of starting material and grinding conditions are necessary to yield the fly ash of the invention. In a specific embodiment exemplified herein, unfractionated (unclassified) fly ash unexpectedly yields a superior processed fly ash product after grinding; a coarse fraction of fly ash does not yield the same quality processed fly ash product under the same grinding conditions.

Furthermore, one of ordinary skill in the art can readily use a method of the invention set forth below, particularly a method of grinding fly ash in a non-expanded bed, to produce fly ash readily usable in various industries, in desired production quantities, i.e, approximately three tons per hour.

In a further aspect, in a hardenable mixture, i.e., concrete or mortar, of the invention, the fine aggregate may comprise sand and fly ash, wherein a ratio by weight of sand to fly ash is from about 4:1 to about 1:1. Preferably, the fly ash has a fineness modulus of less than about 600, wherein the fineness modulus is calculated as the sum of the percent of fly ash retained on sieves of 0, 1, 1.5, 2, 3, 5, 10, 20, 45, 75, 150, and 300 microns (as described in U.S. Pat. No. 5,624,491 and International Publication No. WO 95/32423). In another embodiment, the fly ash used as fine aggregate is processed fly ash of the invention.

BRIEF DESCRIPTION OF THE DRAWINGS

FIG. 4. Compressive strength of fly ash mortar prepared with the M9F95 air classified product, used to replace 35% of cement. Three series of mortars were prepared (square, lozenge, and triangle).

FIG. 5. Compressive strength of fly ash mortar prepared with the M13N94 air classified product, used to replace 25% of cement. Three series of mortars were prepared (square, lozenge, and triangle).

DETAILED DESCRIPTION OF THE INVENTION

As described above, the present invention relates to hardenable mixtures comprising processed fly ash of a defined fineness as a replacement for cement in cementitious materials, which hardenable mixtures achieve compressive strength that is about equal to or greater than the compressive strength of the same hardenable mixture without fly ash. The invention further provides for replacement of a portion of the fine aggregates in a hardenable mixture with fly ash of a defined fineness. In particular embodiments, the hardenable mixture can be concrete or mortar, as hereinafter defined.

Throughout this specification, where specific ratios, percentages, or proportions are mentioned, they are determined by weight and not by volume unless stated otherwise.

The present invention is based, in part, on the observation that processing fly ash from a boiler to shift the entire distribution range of fly ash particles to a smaller size, and to narrow that range, allows for essentially quantitative utilization of fly ash, and yields hardenable mixtures, e.g., concrete and mortar, with a greater rate of compressive strength gain than other such compositions comprising fly ash, and crossover for greater compressive strength than such mixtures lacking fly ash after seven to fourteen days. These properties are independent of the source and chemical composition of fly ash, as the pozzolanic properties of the fly ash primarily depend on the degree of fineness of the fly ash. It has been surprisingly found that processing fly ash by grinding to a defined fineness modulus as herein defined provides a high degree of quality control, regardless of the classification or combustion conditions of the fly ash.

Furthermore, the present invention is based upon the discovery that surprisingly, grinding a volume of fly ash with a grinding medium, wherein the fly ash has a volume less than the void volume of the grinding medium, permits increased collisions of fly ash particles with grinding medium. As a result, the fly ash is ground to a size which permits the use of fly ash in concrete and mortar of the invention, which have acceptable compressive strength within about 2 weeks of the pouring of the concrete or mortar.

In addition, the present invention is based upon the discovery that, unexpectedly, grinding fly ash in a non-expanded bed results in desirable production quantities of fly ash that is substantially spherical and shape, and greater than 90% of the fly ash particles have a size less than 12 $\mu$m.

Figure 6A:
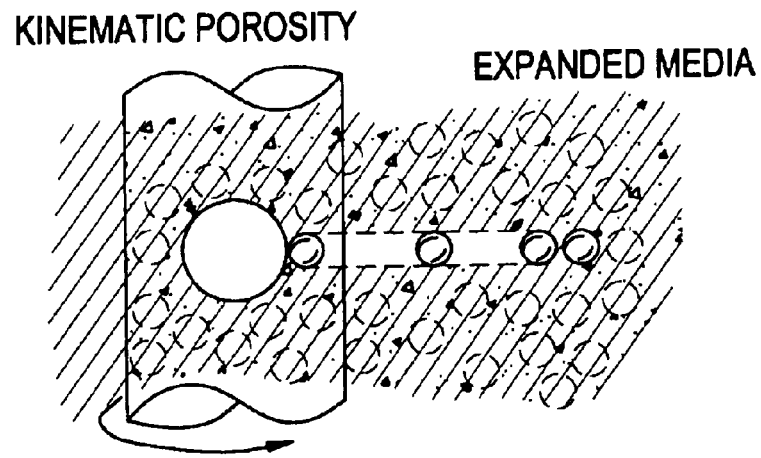
FIG. 6 (prior art). Schematic diagram of the dry grinding process employed to process the coarse fraction of air classified fly ash, and unfractionated fly ash. The Attritor dry grinding process is achieved in a stationary tank by means of a rotating shaft and arms that agitate the media into a random state of motion of internal porosity called kinematic porosity. In this expanded condition, the media and particles are free to move, collide, and impinge upon each other. (A) Kinematic porosity in expanded media. The revolving arm hits grinding media. The media moves forward rapidly. The media collides with the substrate, breaking up or reducing in size the product particle. (B) Media at rest when the shaft is stationary. (C) Expanded media when the shaft is rotating.
Figure 6B:
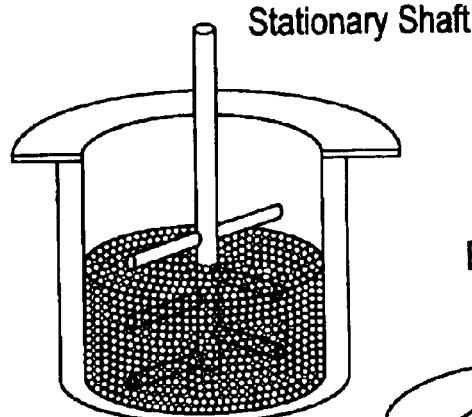
Figure 6C:
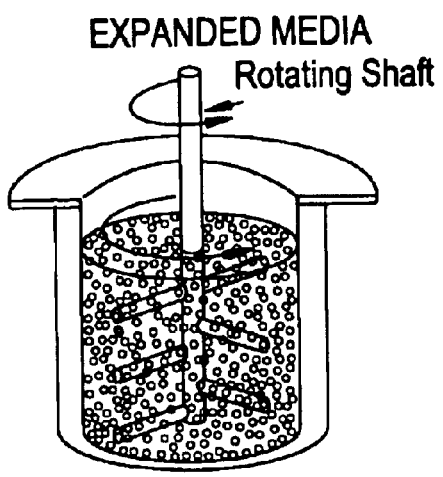

As used herein, the phrase a "non-expanded bed" refers to a grinding bed which does not significantly increase in volume during the grinding process. More specifically, a grinder used to produce fly ash of the present invention, such as the HSA-30 attritor, comprises a tank and a rotating shaft in the center of the tank, having arms protruding from the shaft. If these arms have a sufficient rotation speed, the volume of the grinding medium and fly ash in the tank expands. FIGS. 6B and 6C provide a schematical view of this phenomenon. In particular, FIG. 6B shows the volume of the bed at rest, i.e, where the RPM of the shaft and the arms equals zero. However, when the shaft is rotated at a sufficient RPM, the volume of the medium and fly ash increases to a value slightly less than twice its volume when at rest. It has been discovered that unexpectedly, if grinding occurs at an RPM at which the volume of the grinding medium and fly ash essentially does not expand, then a greater amount of grinding medium can be added to the tank than the amount used in an expanded bed. This allows increases in the feed rate of fly ash to the grinding process so that desirable rates of fly ash product are obtained, i.e. about 3 tons per hour. However, in order for the non-expanded bed process to be used, RPMs less than those used in the expanded bed process are employed. Therefore, the grinding medium in the non-expanded bed process must have a density greater than that of the grinding medium used in an expanded bed process, so that the same ratio of fly ash to grinding medium, e.g., 1:4 by volume, and energy input can be used to grind the fly ash without expanded the bed.

As used herein, the term "fly ash" refers to a solid material having a chemical composition similar to or the same as the composition of the material that is produced during the combustion of powdered coal. In a specific aspect, the solid material is the material remaining after the combustion of powdered coal. ACI Committee 116 (1990, ACI 116-85, *ACI Manual of Concrete Practice Part I*, American Concrete Institute, Detroit) defines fly ash as "the fmely divided residue resulting from the combustion of ground or powder coal which is transported form the firebox through the flue gases", and the term "fly ash" as used herein encompasses this definition. Generally, fly ash derived from various coals have differences in chemical composition, but the principal components of fly ash are $SiO_2$ (25% to 60%), $Al_2O_3$ (10% to 30%), and $Fe_2O_3$ (5% to 25%). The MgO content of fly is generally not greater than 5%. Thus, the term fly ash generally refers to solid powders comprising from about 25% to about 60% silica, from about 10% to about 30% $Al_2O_3$, from about 5% to about 25% $Fe_2O_3$, from about 0% to about 20% CaO, and from about 0% to about 5% MgO.

The term "fly ash" further contemplates synthetic fly ash, which may be prepared to have the same performance characteristics as fly ash as described herein.

Presently, fly ash is classified primarily in two groups: Class C and Class F, according to the ASTM C 618 (1990, supra). Class F is generally produced by burning bituminous coal, and Class C results from sub-bituminous coal or lignite. Generally, the fly ash from the combustion of sub-bituminous coals contains more CaO and less $Fe_2O_3$ than fly ash from bituminous coal (Berry and Malhotra, 1980, ACI J. Proceedings 77:59–73). Thus, the CaO content of the Class C fly ash is usually higher than 10%, with the sum of the oxides of $SiO_2$, $Al_2O_3$ and $Fe_2O_3$ not less than 50%. For Class F fly ash the CaO content is normally less than 10% and the sum of the above mentioned oxides is not less than 70%.

The glassy phase of fly ash depends essentially on the combustion conditions and type of boiler. Non-fractionated fly ash obtained from different boilers, such as dry bottom boilers or wet bottom boilers, has been found to behave differently. Boilers that achieve higher temperature yield fly ash with a more developed or pronounced glassy phase. Alternatively, combustion in the presence of a fluxing agent, which reduces the fusion temperature of the fly ash, can also increase the glassy phase of fly ash produced by combustion for lower temperature boilers. Compressive strength of a hardenable mixture containing fly ash may depend in part on the glassy phase of the fly ash, so generally fly ash produced for higher temperature boilers, or produced in the presence of a fluxing agent, or both, may be preferred. However, the fineness modulus is the most important parameter for defining compressive strength, and fractionated fly ash from any source, with a defined fineness modulus, can be used according to the invention.

Although fly ash generally comes in a dry and finely divided form, in many instances, due to weathering and transportation processes, fly ash becomes wet and often forms lumps. Such fly ash can be less reactive.

Pozzolanic, as defined by ASTM C 593 (1990, ASTM C 593-89, *Annual Book of ASTM Standards*, Vol. 04.02), is "a siliceous or alumino-siliceous material that in itself possesses little or no cementitious value but that in finely divided form and in the presence of moisture will chemically react with alkali and alkaline earth hydroxides at ordinary temperatures to form or assist in forming compounds possessing cementitious properties." The present invention relates to the determination of the fineness modulus of fractionated fly ash. As used herein, the term "fineness modulus" refers to a measure of the distribution of volumes of particles of fly ash or distribution of particle sizes of the fly ash. According to the present invention, the fineness modulus is a distribution analysis that is much more informative than an average or median particle diameter determination or total surface area determination. The value of fineness modulus corresponds to the fineness of a fraction of fly ash, or to non-fractionated fly ash. Thus, a fraction of fly ash containing a distribution of particles having smaller size, e.g., a median diameter that falls within a smaller range set, will have a fineness modulus value that is lower than a fraction of fly ash containing a distribution of particles having somewhat larger size, e.g., a median diameter that falls within a larger range set, or non-fractionated fly ash. According to the present invention, lower values of fineness modulus are preferred, since hardenable mixtures that contain fractions having a lower fineness modulus achieve compressive strength gains more rapidly. In another embodiment, larger values of fineness modulus may be preferred, where a slower rate of compressive strength gain may be desired.

The fineness modulus can be determined experimentally, e.g., by sequentially sieving fly ash particles on different sized sieves, or by light diffraction index analysis. The latter method provides a basis for virtual sieving by indicating the size distribution and number, thus allowing for prediction of percent retention (or pass through) on a sieve of a given size.

Thus, the present invention is directed, in part, to use of processed fly ash, in which the fly ash particles in any given fraction have a more uniform distribution of volumes, sizes, and regular spherical shape than non-fractionated fly ash, or fly ash processed by crushing or other techniques that fracture the particles, resulting in irregular, microscopically jagged shape.

Preferably, the fineness modulus is determined as the sum of the percentage of fly ash remaining on each of, a series of different sized sieves. As noted above, this value can be a virtual number, determined by predicting the percent retention on different sized sieves from size information derived using other techniques. Accordingly, the term "fineness modulus" refers to a relative value, which can vary depending on the series of sieves (or other sizing apparatus) chosen. Since, according to the instant invention, fly ash particles of smaller size or diameter are preferred for use in hardenable mixtures, more accurate determinations of fineness modulus are available if a series of smaller sieves are chosen. Preferably, the size of the sieves is predominantly below 10 $\mu$, e.g., the sieves may be 0.5, 1, 2, 3, 4, 5, 6, 7, 8 and 10 microns, with sieves ranging up to 300 microns being useful. The number of sieves sized 10 microns or less should be at least one more than the number of sieves sized greater than 10 microns. In a preferred embodiment, the number of sieves sized 10 microns or less is at least five. Although in a specific embodiment dry sieves are used to calculate a value for the fineness modulus, other methods, such as wet sieving, can also be used. Quantitative determination of fineness modulus, as well as preparation of hardenable mixtures with greater rates of increase in compressive strength, is more fully developed in co-pending U.S. Pat. No. 5,624,491, entitled "IMPROVED COMPRESSIVE STRENGTH OF CONCRETE AND MORTAR CONTAINING FLY ASH," and International Patent Publication No. WO 95/32423, published Nov. 30, 1995, of International Patent Application No. PCT/US95/06182, filed May 19, 1995, by Liskowitz et al. and having the same title, both of which are incorporated herein by reference in their entireties.

The greater the number of sieves sized 10 microns or less, the greater the absolute value of fineness modulus. Accordingly, where sieves of 0.5, 1, 2, 3, 4, 5, 6, 7, 8, and 10 microns are used, the fineness modulus will be a higher absolute number, reflective of the greater degree of accuracy of determination of this value for the smaller diameter or smaller size fly ash particles.

Although not intending to be bound by any particular theory or hypothesis, it is believed that dissolution of fly ash in a hardenable mixture, whereby the pozzolanic properties of the fly ash can contribute to compressive strength of the hardenable mixture, is acutely dependent on the size distribution of the fly ash to a certain minimum size. It has been further discovered that fly ash particles with a uniform, generally spherical, shape are preferred because they do not degrade the workability of cementitious mixtures. The data disclosed in the Examples, infra, support a conclusion that the fly ash contribution to compressive strength of a hardenable mixture depends on the distribution of particle volumes, or sizes. Above a minimum size, the contribution diminishes. Below this minimum size, strength of the concrete appears to be independent of size. Most surprising is the discovery that a regular, predominantly spherical, surface is preferred. This observation is surprising because the surface area hypothetically determines the reactivity of a particle, since surface functional groups are presumably more available for reaction, and thus one might expect that an irregular surface area, such as with a jagged particle, would be preferred.

The pozzolanic reaction of fly ash in a hardenable mixture comprising cement is the reaction between constituents of the fly ash and calcium hydroxide or other alkaline materials. It is generally assumed to take place on the surface of fly ash particles, between silicates and aluminates from the glass phase of the fly ash and hydroxide ion in the pore solution (Plowman, 1984, Proceedings, 2nd International Conference on Ash Technology and Marketing, London, pp.437–443). However, the result of the research leading to the present invention indicates that the pozzolanic reactions of the ash are dependent on the volume and shape of the fly ash particles: the smaller the particle volume, and the more regular its shape, the more rapidly it completes its reaction with the cement to contribute to compressive strength. The rate of solubility and reactivity of these glassy phases in different types of fly ash depends on the glassy phase of fly ash, which in turn depends on the combustion temperature of the boiler that produced the fly ash. In addition to the effect of combustion conditions on the glassy phase of fly ash, different fly ashes from one class can behave differently, depending on the $SiO_2$, $Al_2O_3$ and $Fe_2O_3$ content, and other factors such as the particle size distribution and storage conditions of the ash (see Aitcin et al, 1986, supra; Liskowitz et al., 1983, supra).

During hydration, Portland cement produces a surfeit of lime (CaO) that is released to the pore spaces. It is the presence of this lime that allows the reaction between the silica components in fly ash and calcium hydroxide to form additional calcium silicate hydrate [C—S—H]. He et al. (1984, Cement and Concrete Research 14:505–511) showed that the content of crystalline calcium hydroxide in the fly ash-Portland cement pastes decreases as a result of the addition of fly ash, most likely resulting from a reaction of calcium with alumina and silica from fly ash to form addition C—S—H. This process stabilizes the concrete, reduces permeability and increases resistance to chemical attacks.

Processing of fly ash to achieve the desired fineness modulus, i.e., distribution of sizes, can be accomplished by any means known in the art, provided that it preserves or results in particles of fairly regular, preferably spherical, shape. In one example, processing comprises grinding with a fluidized bed grinding process with a low ratio of fly ash to grinding media, such that the volume of fly ash is less than the void volume of the grinding medium. In a specific embodiment, infra, about one part unfractionated fly ash is ground with about seven parts grinding media (by weight), and the grinding media is zirconium silicate. However, other grinding media, such as carbon steel, are also contemplated for use according to the invention.

The term "cement" as used herein refers to a powder comprising alumina, silica, lime, iron oxide and magnesia burned together in a kiln and finely pulverized, which upon mixing with water binds or unites other materials present in the mixture in a hard mixture. Thus, the hardenable mixtures of the invention comprise cement. Generally, the term cement refers to hydraulic cements such as, but not limited to, Portland cement, in particular Portland type I, II, III, IV and V cements.

As used herein, the term "cementitious materials" refers to the portion of a hardenable mixture that provides for binding or uniting the other materials present in the mixture, and thus includes cement and pozzolanic fly ash. Fly ash can comprise from about 5% to about 50% of the cementitious materials in a hardenable mixture of the invention; preferably, fly ash comprises from about 10% to about 35% of cementitious materials. The balance of cementitious materials will generally be cement, in particular Portland cement. In a specific embodiment, infra, the hardenable mixtures of the invention comprise Portland type I cement.

The term "concrete" refers to a hardenable mixture comprising cementitious materials; a fine aggregate, such as sand; a coarse aggregate, such as but not limited to crushed basalt coarse aggregate; and water. Concrete of the invention further comprises fly ash having defined fineness. In a specific embodiment, the fly ash makes up from about 10% to about 50% of the cementitious materials. In a further aspect, the fly ash is used as fine aggregate in a ratio of from about 4:1 to about 1:1 to sand. In yet a further embodiment, the fly ash is an additive in addition to a replacement of cement, or a replacement of cement and fine aggregate.

Various ratios of cement, fine aggregate, coarse aggregate, water, and optionally additives as set forth below, are used to prepare concrete, and are contemplated by the present invention. In specific embodiments, concrete of the invention consists essentially of about 1 part by weight cementitious materials, about 1 to about 3 parts by weight fine aggregate, about 1 to about 5 parts by weight coarse aggregate, about 0.35 to about 0.6 parts by weight water, and optionally additives as set forth below, such that the ratio of cementitious materials to water ranges from approximately 3:1 to 1.5:1; preferably, the ratio of cementitious materials to water is about 2:1. In a specific embodiment, the concrete consists essentially of 1 part cementitious materials, 2 parts siliceous river sand or Ottawa sand, 3 parts ⅜" crushed basalt coarse aggregate, and 0.5 parts water.

The term "mortar" refers to a hardenable mixture comprising cementitious materials; a fine aggregate, such as sand; and water. Mortar of the invention further comprises fly ash having defined fineness. In a specific embodiment, the fly ash makes up from about 10% to about 50% of the cementitious materials. In a further aspect, the fly ash is used as fine aggregate in a ratio of from about 4:1 to about 1:1 to sand. In yet a further embodiment, the fly ash is an additive in addition to a replacement of cement, or a replacement of cement and fine aggregate.

Various ratios of cement, fine aggregate, water, and optionally additives as set forth below, are used to prepare mortar, and are contemplated by the present invention. In specific embodiments, mortar of the invention consists essentially of about 1 part by weight cementitious materials, about 1 to about 3 parts by weight fine aggregate, about 0.5 parts by weight water, and optionally additives, such that the ratio of cementitious materials to water is approximately 2:1. In a specific embodiment, the mortar consists essentially of 1 part cementitious materials, 2.75 parts Ottawa sand, and 0.5 parts water.

As noted above, fly ash can be used as a fine aggregate in concrete or mortar, in addition to having a role as a cementitious material. It has been found that substituting fly ash for a conventional fine aggregate, such as sand, provides the advantages of increased compressive strength of the concrete or mortar since the total amount of fly ash in the hardenable composition is the same, with a rapid rate of increase of compressive strength because the amount of cement in the cementitious materials is greater.

According to the present invention, the hardenable mixture can further comprise one or more of the following in quantities commonly used in concrete and mortar compositions: kiln dust, e.g., the dust generated in the manufacture of cement; silica fume, which is a by-product from the silicon metal industry usually consisting of about 96%–98% reactive $SiO_2$, and which generally comes in very fine particle sizes of less than 1 micron; superplasticizer, such as Daracem-100 (W. R. Grace),an expensive but common additive for concrete used to decrease the water requirement for mixing the concrete; and a dispersing agent, such as sodium hexametaphosphate ($NaPO_3$). The use of a dispersing agent is particularly preferred when weathered fly ash is incorporated in the hardenable mixture.

Addition of silica fume can enhance the early rate of strength gain of a hardenable mixture, and therefore may be a desirable component of hardenable mixtures of the invention.

In a specific embodiment, a hardenable mixture of the invention may also contain glass fibers for reinforcement. The use of glass fibers in hardenable mixtures of the invention for reinforcement can be achieved because the fly ash, particularly finer fractions of fly ash, reacts more readily than glass fibers with reactive components of the cement, e.g., $Ca(OH)_2$ and continues to react with an excess of fine fly ash particles made pursuant to the instant invention, thus preventing long term reaction of the glass fibers with these reactive components, which would otherwise degrade the glass fibers. The most inert hardenable mixtures are those that contain approximately equal amounts of fly ash, or fly ash and silica fume (as discussed below), and cement. The ability of fly ash to neutralize reactive agents in cement is discussed in greater detail in U.S. application Ser. No. 08/246,861, filed May 20, 1994, and International Patent Publication No. WO 95132162, published Nov. 30, 1995, of International Application No. PCT/US95/06336, filed May 19, 1995, both entitled "SULFATE AND ACID RESISTANT CONCRETE AND MORTAR" by John Liskowitz et al., which is incorporated herein by reference in its entirety.

In another specific embodiment, a hardenable mixture of the invention further comprises glass fibers, and silica fume. Silica fume reacts more readily with reactive components of cement than the glass fibers, and thus can provide early desirable protection of the glass fibers from degradation as well as early compressive strength gains. Subsequently, the fly ash will react with such reactive components, thus precluding early and late reactivity of glass fibers. As noted above, reaction of glass fibers with alkali and alkali earth compounds can lead to degradation of the glass fibers, and loss of tensile strength of the hardenable mixture.

Concrete beams of the invention with dimensions of 3"×6"×27" can be used to evaluate the bending strength of fly ash concrete, e.g., using simple beam with third-point loading. Preferably, such test procedures are in accordance with ASTM C 78 (1990, ASTM C 78–84, *Annual Book of ASTM Standards*, Vol 04.02)

The present invention will be better understood by reference to the following Examples, which are provided by way of exemplification and not by way of limitation. The Examples compare various techniques for processing fly ash, including air classification and grinding, and demonstrate that grinding a specific starting materials under appropriate conditions is necessary to produce a processed fly ash with the advantages disclosed and exemplified herein.

EXAMPLE 1

Air Classification of Fly Ash

Although it has been generally recognized that fly ash produced in utility coal fired boilers when used in small quantities ($\leq 15\%$) as a replacement for cement can provide desirable properties to cement products, its widespread use by the cement industry has been severely limited. This is due to variability in the properties of fly ash collected from different boilers at different times, its retarding early strength development, and lack of accurate relationship to predict performance of fly ash in cement products when the quantity of the fly ash used as cement replacement exceeds 15%. This occurs because of a lack of understanding of the factors and fly ash properties that influence the performance of the fly ash in combination with the cement in cement products. As a result, fly ash has been used in small amounts as a generic material in cement to gain improvement in the engineering properties of the cement products without affecting the performance of the cement products that can result from variability in the fly ash properties. The present Examples address these deficiencies, and demonstrates that quantitative utilization of fly ash can be achieved in high quality concrete and mortar compositions.

Materials and Methods

Twenty super sacs (10 tons total) of marketable fly ash were collected from an electricity generation boiler. An MS-20 commercial air classification fractionater (Progressive Industries, Sylacanga, Alabama) was employed to obtain the desired fly ash product. The coarse fraction of fly ash that is produced along with the desirable fly ash product in the fractionater was intended to be ground to produce a targeted ground fly ash particle size distribution that is comparable to the fractionated fly ash product.

Grinding of the coarse fraction from the MS-20 Progressive Industry Fractionater was carried out using a fluidized bed process (Union Processing, Akron, Ohio). As part of this effort, grinding of the fly ash collected from the boiler was also investigated to determine if the desirable fly ash particle sizes in the fly ash could be increased with grinding. Also, dependence of desirable fly ash product on coal pulverizer performance and boiler operating conditions could be minimized through grinding. The amount of fly ash product with desirable particle sizes available in the fly ash was averaging only about 55 percent of the total particles present in the samples that were collected and analyzed without further processing.

Results and Discussion

Twelve different MS-20 fractionation control settings were evaluated for their effects on product yield. The processing rate was adjusted in the different settings. Increasing the processing rate of the MS-20 from 3 tons/hour up to 5 tons/hr reduced the product yield from 38% down to 28%, respectively. However, particle size analysis using the Leeds and Northrup Microtrac shows that the fly ash product produced at the greater processing rate of 5 tons/hr (M8F95) contained a greater fraction of fine particle sizes than the product produced at a rate of 3 tons/hour (M9F95). Selecting 11 microns as the desired maximum particle size (diameter) in the product, and 5.5 microns as the mean particle size range for comparison of size distribution, 93% and 78% of the particles in the M8F95 product were less that 11 microns and 5.5 microns, respectively (see Table 1), whereas 92% and 73% of the particles in the M9F95 are seen to be less than 11 and 5.5 microns (see Table 2). The median particle diameter for the M8F95 and M9F95 fractions was measured to be 2.8 microns and 3.4 microns, respectively.

TABLE 1

MICROTRAC STANDARD RANGE PARTICLE ANALYZER
PERCENT PASSING DATA
ASVR PARAMETERS

| Id #1: M8F95 | Summary Data | Chan. Progression: |
|---|---|---|
| Distrib. Format: Volume | dv = 0.0579 | Standard |
| Filter: n/a | 10% = 1.121 | Upper Channel |
| Run Time: 15 seconds | 50% = 2.828 | Edge: 704.0 |
| Run Number: Avg of 3 runs | 90% = 8.924 | Lower Channel |
| Transmission: 0.87 | mv = 4.228 | Edge: 0,688 |
| Laser Int: 1,018/0.000/0.000 | mn = 1.217 | Number of |
| Residuals: Disabled | ma = 2.306 | Channels: 20 |
| Above Residual: 0.000 | ca = 2.602 | |
| Below Residual: 0.000 | sd = 2.656 | |

| Ch Top | % Pass | % Change |
|---|---|---|
| 704.0 | 100.00 | 0.00 |
| 497.8 | 100.00 | 0.00 |
| 352.0 | 100.00 | 0.00 |
| 248.9 | 100.00 | 0.00 |
| 176.0 | 100.00 | 0.00 |
| 124.5 | 100.00 | 0.00 |
| 88.00 | 100.00 | 0.00 |
| 62.23 | 100.00 | 0.00 |
| 44.00 | 100.00 | 0.03 |
| 31.11 | 99.97 | 0.83 |
| 22.00 | 99.14 | 2.37 |
| 15.56 | 96.77 | 3.78 |
| 11.00 | 92.99 | 5.45 |
| 7.778 | 87.54 | 9.13 |
| 5.500 | 78.41 | 15.46 |
| 3.889 | 62.95 | 14.13 |
| 2.750 | 48.82 | 16.66 |
| 1.945 | 32.16 | 14.54 |
| 1.375 | 17.62 | 11.94 |
| 0.972 | 5.68 | 5.68 |

TABLE 2

MICROTRAC STANDARD RANGE PARTICLE ANALYZER
PERCENT PASSING DATA
ASVR PARAMETERS

| Id #1: M9F95 | Summary Data | Chan. Progression: |
|---|---|---|
| Distrib. Format: Volume | dv = 0.0316 | Standard |
| Filter: n/a | 10% = 1.153 | Upper Channel Edge: |
| Run Time: 15 seconds | 50% = 3.357 | 704.0 |
| Run Number: Avg of 3 runs | 90% = 10.06 | Lower Channel Edge: |
| Transmission: 0.93 | mv = 4.710 | 0,688 |
| Laser Int: 1,016/0.000/0.000 | mn = 1.220 | Number of Channels: |
| Residuals: Disabled | ma = 2.480 | 20 |
| Above Residual: 0.000 | ca = 2.420 | |
| Below Residual: 0.000 | sd = 3.130 | |

| Ch Top | % Pass | % Change |
|---|---|---|
| 704.0 | 100.00 | 0.00 |
| 497.8 | 100.00 | 0.00 |
| 352.0 | 100.00 | 0.00 |
| 248.9 | 100.00 | 0.00 |
| 176.0 | 100.00 | 0.00 |
| 88.00 | 100.00 | 0.00 |
| 62.23 | 100.00 | 0.00 |
| 44.00 | 100.00 | 0.05 |
| 31.11 | 99.95 | 1.11 |

TABLE 2-continued

MICROTRAC STANDARD RANGE PARTICLE ANALYZER
PERCENT PASSING DATA
ASVR PARAMETERS

| | | |
|---|---|---|
| 22.00 | 98.84 | 2.72 |
| 15.56 | 96.12 | 4.59 |
| 11.00 | 91.53 | 7.04 |
| 7.778 | 84.49 | 11.33 |
| 5.500 | 73.16 | 17.46 |
| 3.889 | 55.70 | 12.67 |
| 2.750 | 43.03 | 13.90 |
| 1.945 | 29.13 | 13.10 |
| 1.375 | 16.03 | 10.84 |
| 0.972 | 5.19 | 5.19 |

A comparison of the compressive strength development exhibited by the M8F95 and M9F95 fly ash-containing mortar in mortar with 25% cement replacement achieved after up to twenty-eight days of curing show differences between the two products. Comparing FIG. 1 (M8F95-25) with FIG. 2 (M9F95-25), the compressive strength development achieved with the M8F95-25 mortar is seen to be slightly greater than that achieved with M9F95-25 mortar up to fourteen days of curing. After twenty eight days of curing, both the M8F95-25 and M9F95-25 mortar exhibit comparable compressive strength. Apparently, the finer particle size distribution present in the M8F95 product compared to the M9F95 particle size distribution accounts for faster early compressive strength development exhibited by the M8F95-25 mortar.

Figure 3:
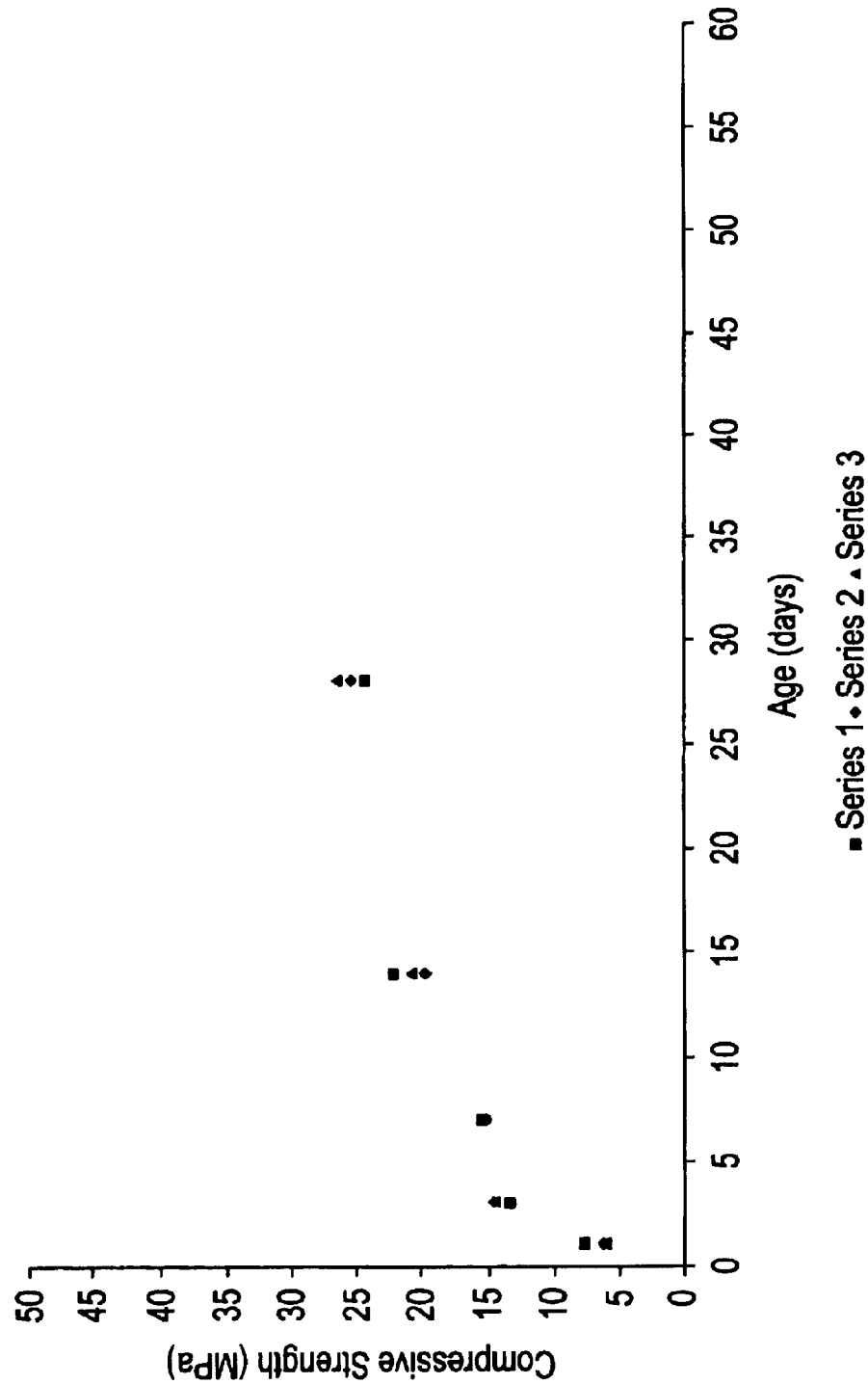
FIG. 3. Compressive strength of fly ash mortar prepared with the M8F95 air classified product, used to replace 35% of cement. Three series of mortars were prepared (square, lozenge, and triangle).

Mortars were also prepared with M8F95 and M9F95 fly ash products by replacing 35% of the cement with these fly ash products. These mortars did not have observable differences in the rate or extent of compressive strength (compare FIG. 3, M8F95-25, with FIG. 4, M9F95-35) between them. The use of larger amounts of fly ash in the mortar apparently masks the influence of differences in particle size distribution in the M8F95 and M9F95 products on compressive strength development.

Compressive strength development exhibited by the mortars prepared with 25% replacement of the cement with the M9F95 fly ash product and the M13N94 fly ash product prepared from ash collected in late 1994 provided comparable results. If one compares FIG. 2 with FIG. 5, the compressive strengths measured at seven days, fourteen days and twenty eight days of curing can be seen to be comparable for the M9F95-25 and M13N94-25 mortars, respectively.

This result was consistent with our predictions from the fineness modulus, since the control setting on the fractionater used to prepare the M13N94 ash provide a processing rate of 3.2 ton/hour which was comparable to the 3 ton/hour processing rate used for the M9F95 product. Particle size analysis indicated their particle size distributions are similar (compare Table 2 with Table 3).

TABLE 3

MICROTRAC STANDARD RANGE PARTICLE ANALYZER
PERCENT PASSING DATA
ASVR PARAMETERS

| Id #1: M13N | Summary Data | Chan. Progression: |
|---|---|---|
| Distrib. Format: Volume | dv = 0.0392 | Standard |
| Filter: n/a | 10% = 1.198 | Upper Channel Edge: |
| Run Time: 15 seconds | 50% = 3.943 | 704.0 |
| Run Number: Avg of 3 runs | 90% = 8.718 | Lower Channel Edge: |

TABLE 3-continued

MICROTRAC STANDARD RANGE PARTICLE ANALYZER
PERCENT PASSING DATA
ASVR PARAMETERS

| Transmission: 0.92 | mv = 4.557 | 0,688 |
|---|---|---|
| Laser Int: 1,006/0.000/0.000 | mn = 1.235 | Number of Channels: |
| Residuals: Disabled | ma = 2.638 | 20 |
| Above Residual: 0.000 | ca = 2.275 | |
| Below Residual: 0.000 | sd = 2.961 | |

| Ch Top | % Pass | % Change |
|---|---|---|
| 704.0 | 100.00 | 0.00 |
| 497.8 | 100.00 | 0.00 |
| 352.0 | 100.00 | 0.00 |
| 248.9 | 100.00 | 0.00 |
| 176.0 | 100.00 | 0.00 |
| 124.5 | 100.00 | 0.00 |
| 88.00 | 100.00 | 0.00 |
| 62.23 | 100.00 | 0.00 |
| 44.00 | 100.00 | 0.00 |
| 31.11 | 100.00 | 0.13 |
| 22.00 | 99.87 | 1.81 |
| 15.56 | 98.06 | 2.52 |
| 11.00 | 95.54 | 9.45 |
| 7.778 | 86.09 | 16.19 |
| 5.500 | 69.90 | 20.61 |
| 3.889 | 49.29 | 11.59 |
| 2.750 | 37.70 | 11.74 |
| 1.945 | 25.96 | 11.69 |
| 1.375 | 14.27 | 9.66 |
| 0.972 | 4.61 | 4.61 |

These results indicate that proper sittings of the MS-20 fractionater at given feed rates to achieve specific yields of fly ash product can minimize variability in fly ash pozzolanic activity that may exist in fly ash samples collected at different times or from different boilers. Increasing the feed rate increases the quantity of fine particle sizes in the product but at the expense of the product yield.

EXAMPLE 2

Grinding Results

The coarse fraction (M8CG) produced along with the M8F95 fly ash product in the MS-20 fractionater was selected for grinding. The M8CG fraction was chosen over the M9CG fraction because particle size analysis of these two coarse fractions reveal that 47% of the M8CG fraction particles were below 11 microns and 37% of the M9CG fraction were below 11 microns. Fly ash particle sizes 11 microns and below are the preferred particle sizes for fly ash products to be incorporated in concrete or mortar. Both the grinding of the M8CG coarse fraction and the unfractionated fly ash was investigated using the Union Process Dry Grinding Attritor whose principle of operation is described in FIG. 6 (prior art). This grinding process was selected because it was assumed that grinding and rotation of the fly ash particles in an expanded media bed would produce ground particles that are similar in shape to the spherical unground particle. The spherical shape of fly ash particles in cement improves the workability of the fly ash cement product.

A series of six grinding experiments were carried out in a HSA-30 Attritor, which allows scale-up and assessment of the grinding performance of the commercial size Attritor without the need for large quantities of sample. The grinding experiments were carried out by changing the quantity of 2–2.5 mm zirconium silicate beads which served as the grinding media in the Attritor, and the feed rate. The grinding and compressive strength development achieved with the ground M8CG2 product produced from the course M8CG fraction and the ground product (M0G95) prepared from the unfractionated fly ash were evaluated.

Microscopic examination of the ground fly ash particles indicates uniformity in shape, comparable to the spherical fractionated fly ash product produced by the air classification process. These results indicate that the Attritor grinding process achieves size reduction by surface grinding as opposed to fracturing the fly ash particles. If fracturing occurred, one would expect to observe irregular shaped particles.

Comparison of the results of the grinding of the MGCG course fraction and the unfractionated fly ash shows that the ground products obtained from the unfractionated fly ash (M0G95) is finer than the ground M8CG2 fraction. In this experiment, we found that 90% of the ground M0G95 fly ash product is smaller than 11 microns, and that 73% is smaller than 5.5 microns, respectively (see Table 4), with the median particle size measured to be 3.0 microns. The percentage of the particle sizes below 11 microns and 5.5 microns measured in the ground M8CG2 product was 89% and 58%, with a median diameter of 4.6 microns (see Table 5).

TABLE 4

MICROTRAC x100 PARTICLE ANALYZER
PERCENT PASSING DATA
ASVR PARAMETERS

| Id #1: FLY ASH RAW FEED 2 | Summary Data | Chan. Progression: |
|---|---|---|
| Distrib. Format: Volume | dv = 0.0518 | Standard |
| Filter: On | 10% = 0.827 | Upper Channel |
| Run Time: 15 seconds | 50% = 2.992 | Edge: 704.0 |
| Run Number: Avg of 2 runs | 90% = 10.75 | Lower Channel |
| Transmission: 0.87 | mv = 21.74 | Edge: 0.122 |
| Laser Int: 1,007/0.005/0.999 | mn = 0.514 | Number of |
| Residuals: Disabled | ma = 1.820 | Channels: 50 |
| Above Residual: 0.000 | ca = 3.297 | |
| Below Residual: 0.000 | sd = 3.369 | |

| Ch Top | % Pass | % Change |
|---|---|---|
| 704.0 | 100.00 | 0.00 |
| 592.0 | 100.00 | 0.00 |
| 497.8 | 100.00 | 0.00 |
| 418.6 | 100.00 | 1.31 |
| 352.0 | 98.69 | 2.96 |
| 296.0 | 95.73 | 1.32 |
| 248.9 | 94.41 | 0.00 |
| 209.3 | 94.41 | 0.00 |
| 176.0 | 94.41 | 0.00 |
| 148.0 | 94.41 | 0.00 |
| 124.5 | 94.41 | 0.00 |
| 104.7 | 94.41 | 0.00 |
| 88.00 | 94.41 | 0.00 |
| 74.00 | 94.41 | 0.00 |
| 62.23 | 94.41 | 0.00 |
| 52.33 | 94.41 | 0.00 |
| 44.00 | 94.41 | 0.00 |
| 37.00 | 94.41 | 0.00 |
| 31.11 | 94.41 | 0.00 |
| 26.16 | 94.41 | 0.15 |
| 22.00 | 94.26 | 0.45 |
| 18.50 | 93.81 | 0.72 |
| 15.56 | 93.09 | 1.10 |
| 13.08 | 91.99 | 1.70 |
| 11.00 | 90.29 | 2.56 |
| 9.250 | 87.73 | 3.71 |
| 7.778 | 84.02 | 4.96 |
| 6.541 | 79.06 | 6.02 |
| 5.500 | 73.04 | 6.63 |
| 4.625 | 66.41 | 6.76 |
| 3.889 | 59.65 | 6.51 |
| 3.270 | 53.14 | 5.97 |
| 2.750 | 47.17 | 5.39 |
| 2.312 | 41.78 | 5.08 |
| 1.945 | 36.70 | 5.21 |
| 1.635 | 31.49 | 5.71 |
| 1.375 | 25.78 | 6.06 |
| 1.156 | 19.72 | 5.60 |
| 0.572 | 14.12 | 4.35 |
| 0.818 | 9.77 | 3.00 |
| 0.688 | 6.77 | 2.03 |
| 0.578 | 4.74 | 1.43 |
| 0.486 | 3.31 | 1.08 |
| 0.409 | 2.23 | 0.87 |
| 0.344 | 1.36 | 0.73 |
| 0.289 | 0.63 | 0.63 |
| 0.243 | 0.00 | 0.00 |
| 0.204 | 0.00 | 0.00 |
| 0.172 | 0.00 | 0.00 |
| 0.145 | 0.00 | 0.00 |

TABLE 5

MICROTRAC x100 PARTICLE ANALYZER
PERCENT PASSING DATA
ASVR PARAMETERS

| Id #1: FLY ASH 8 COARSE | Summary Data | Time: 10:30 |
|---|---|---|
| Distrib. Format: Volume | dv = 0.0291 | Chan. Progression: |
| Filter: On | 10% = 0.947 | Standard |
| Run Time: 15 seconds | 50% = 4.577 | Upper Channel |
| Run Number: Avg of 2 runs | 90% = 11.40 | Edge: 704.0 |
| Transmission: 0.94 | mv = 5,570 | Lower Channel |
| Laser Int: 1,007/0.005/0.999 | mn = 0.479 | Edge: 0.122 |
| Residuals: Disabled | ma = 2.265 | Number of |
| Above Residual: 0.000 | ca = 2.649 | Channels: 50 |
| Below Residual: 0.000 | sd = 4.093 | |

| Ch Top | % Pass | % Change |
|---|---|---|
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.00 |
| 296.0 | 100.00 | 0.00 |
| 248.9 | 100.00 | 0.00 |
| 209.3 | 100.00 | 0.00 |
| 176.0 | 100.00 | 0.00 |
| 148.0 | 100.00 | 0.00 |
| 124.5 | 100.00 | 0.00 |
| 104.7 | 100.00 | 0.00 |
| 88.00 | 100.00 | 0.00 |
| 74.00 | 100.00 | 0.00 |
| 62.23 | 100.00 | 0.00 |
| 52.33 | 100.00 | 0.00 |
| 44.00 | 100.00 | 0.00 |
| 37.00 | 100.00 | 0.00 |
| 31.11 | 100.00 | 0.39 |
| 26.16 | 99.61 | 0.66 |
| 22.00 | 98.95 | 1.10 |
| 18.50 | 97.85 | 1.81 |
| 15.56 | 96.04 | 2.81 |
| 13.08 | 93.23 | 4.20 |
| 11.00 | 89.03 | 5.88 |
| 9.250 | 83.15 | 7.53 |
| 7.778 | 75.62 | 8.55 |
| 6.541 | 67.07 | 8.64 |
| 5.500 | 58.43 | 7.98 |
| 4.625 | 50.45 | 7.02 |
| 3.889 | 43.43 | 6.02 |
| 3.270 | 37.41 | 5.04 |
| 2.750 | 32.37 | 4.20 |
| 2.312 | 28.17 | 3.63 |

TABLE 5-continued

MICROTRAC ×100 PARTICLE ANALYZER
PERCENT PASSING DATA
ASVR PARAMETERS

| | | |
|---|---|---|
| 1.945 | 24.54 | 3.44 |
| 1.635 | 21.10 | 3.52 |
| 1.375 | 17.58 | 3.65 |
| 1.156 | 13.93 | 3.46 |
| 0.972 | 10.47 | 2.85 |
| 0.818 | 7.62 | 2.10 |
| 0.688 | 5.52 | 1.50 |
| 0.578 | 4.02 | 1.10 |
| 0.486 | 2.92 | 0.87 |
| 0.409 | 2.05 | 0.74 |
| 0.344 | 1.31 | 0.68 |
| 0.289 | 0.63 | 0.63 |
| 0.243 | 0.00 | 0.00 |
| 0.204 | 0.00 | 0.00 |
| 0.172 | 0.00 | 0.00 |
| 0.145 | 0.00 | 0.00 |

Figure 7:
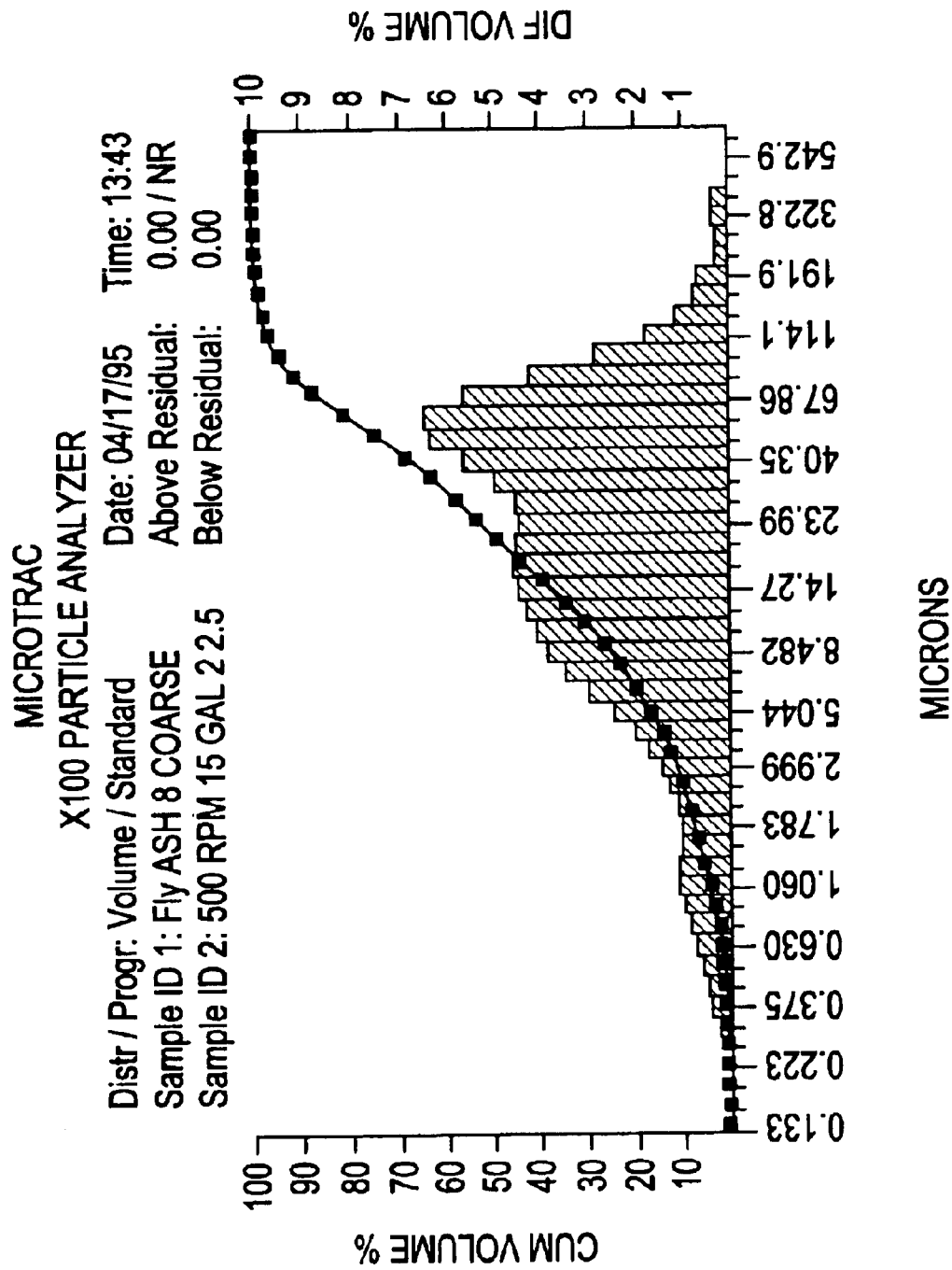
FIG. 7. Analysis of the particle size distribution and mode for the coarse air classified fly ash fraction (M8C95) prior to grinding.
Figure 8:
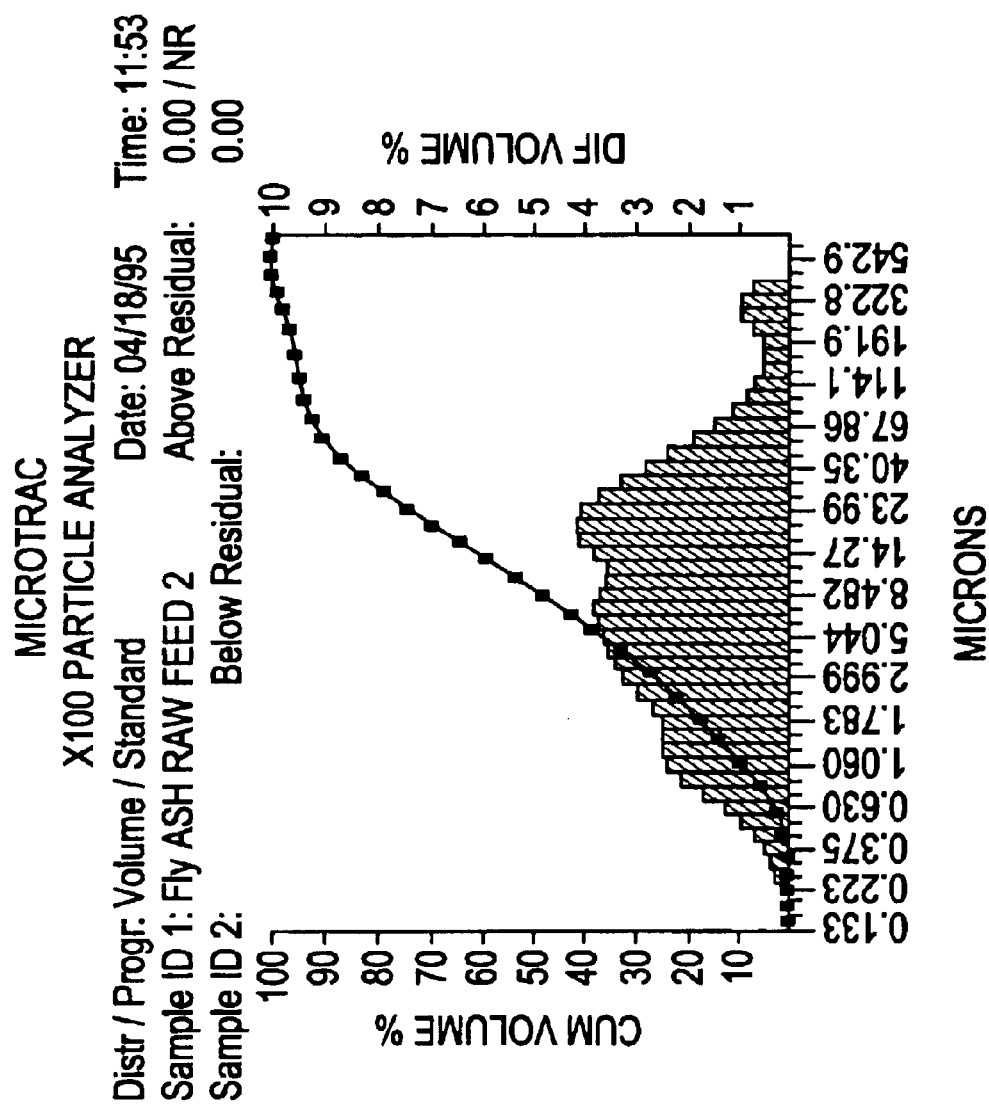
FIG. 8. Analysis of the particle size distribution and mode for the unfractionated fly ash (M0C95) prior to grinding.

Differences in particle size distribution between the ground M8CG2 product and the ground M0G95 product under the same specific grinding operating conditions using a ratio of one part fly ash to seven parts grinding media (by weight) appear to be due to the differences in particle size distribution exhibited by the pre-ground M8CG feed and pre-ground fly ash feed. A comparison of particle size distributions show that the particle sizes in the M8CG coarse fraction (see FIG. 7) is skewed toward the 5 micron to 88 micron range. The unground fly ash contains a broad distribution of sizes, primarily in 0.9 micron to 62 micron range (see FIG. 8). The grinding of the two fly ash samples with different particle size distributions resulted in increasing the quantity of particles with sizes below 1.375 and 5.5 microns in the M8CG sample from 6% to 18% and 18% to 58%, respectively, and in the unground fly ash from 14% to 26% and 40% to 73%, respectively.

These data show that direct grinding of the fly ash eliminates the need for initial fractionation of the fly ash followed by grinding of the coarse product to improve the yield. A comparison of the particle size distribution of the M8F95 product produced with the MS-20 fractionation and the M0G95 product achieved with direct grinding of the fly ash suggests that they are similar. The percentage of particle sizes below 11 microns, 5.5 microns, and 1.375 microns in the M8F95 product are 93%, 78%, and 18%, respectively, with a median particle diameter of a 2.8 microns (see Table 1). The percentages for the particle sizes below 11 microns, 5.5 microns, and 1.375 microns in the ground M0G95 product are 90%, 73% and 26%, respectively, with a median diameter of 3 microns (see Table 4).

A comparison of the compressive strength development of mortar prepared with 25 percent replacement of cement with the ground M8CG2 and ground M0G95 fly ash shows the ground unfractionated fly ash mortar (M0G95-25) exhibits a faster rate of compressive strength gain, and overall greater compressive strength gain, than the ground course fraction (M8CG2–25)-containing mortar up to the twenty eight day design strength. This is observed by comparison of compressive strength development of the M0G95-25 mortar with curing age in FIG. 9 with that measured for the M8CG-2–25 mortar in FIG. 10. These results are consistent with our expectations based on comparison of the quantity of fine particle sizes in the ground M0G95 product, which is greater than in the ground M8CG2 product.

Figure 11:
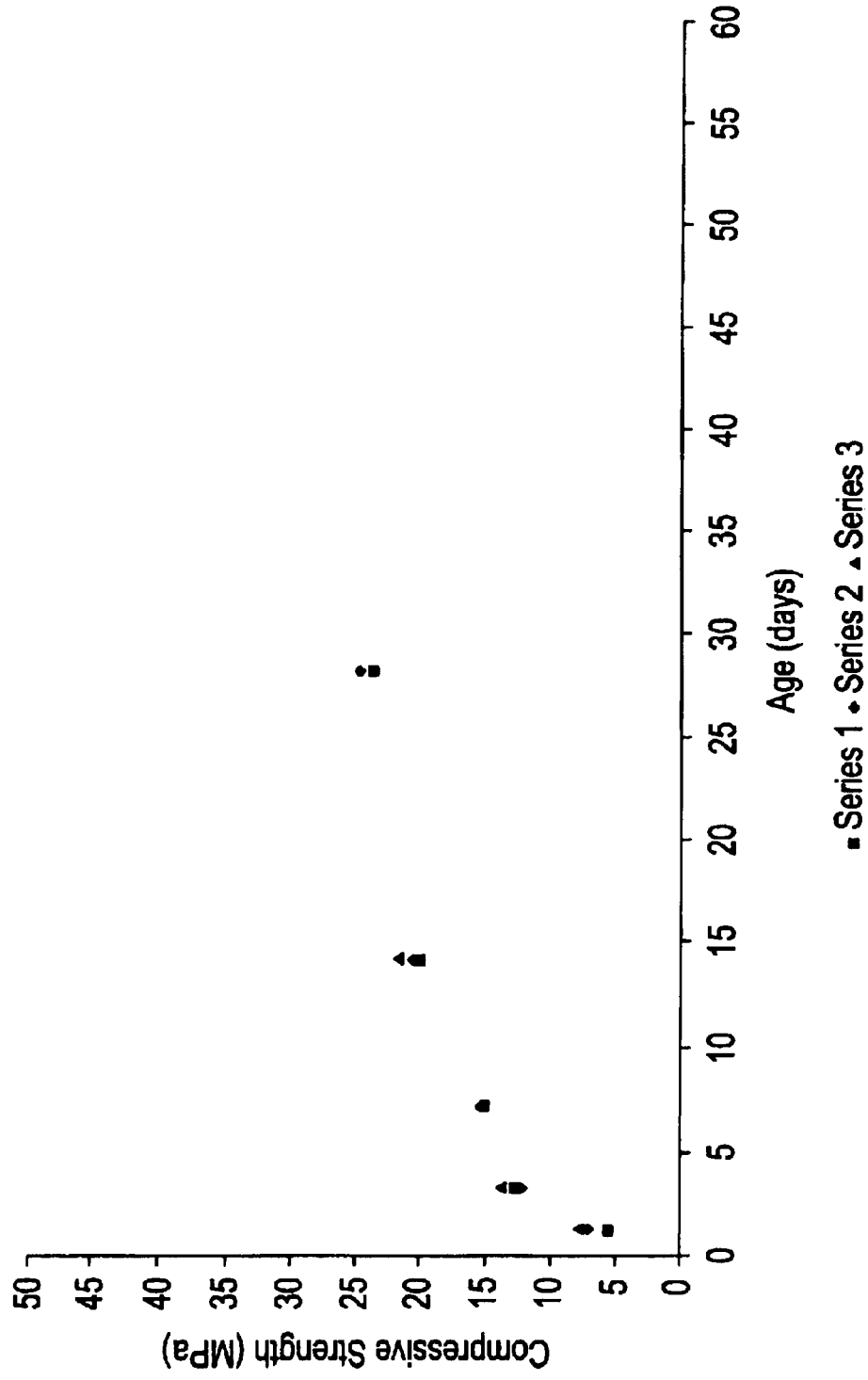
FIG. 11. Compressive strength of fly ash mortar prepared with the M0G95 product, after grinding, used to replace 35% of cement. Three series of mortars were prepared (square, lozenge, and triangle).

Compressive strength development of mortars, M0G95-25, M0G95-35, M8F95-25, and M8F95-35, prepared with the ground M0G95 unfractionated fly ash product and the fractionated product (M8F95) using 25% and 35% cement replacement with the fly ash products are comparable. This is seen by comparing the compressive strength development for M8F95-25 mortar in FIG. 1 with compressive strength development for M0G95-25 in FIG. 9 and compressive strength development M8F95-35 in FIG. 3 with that for M0G95-35 in FIG. 11.

Figure 1:
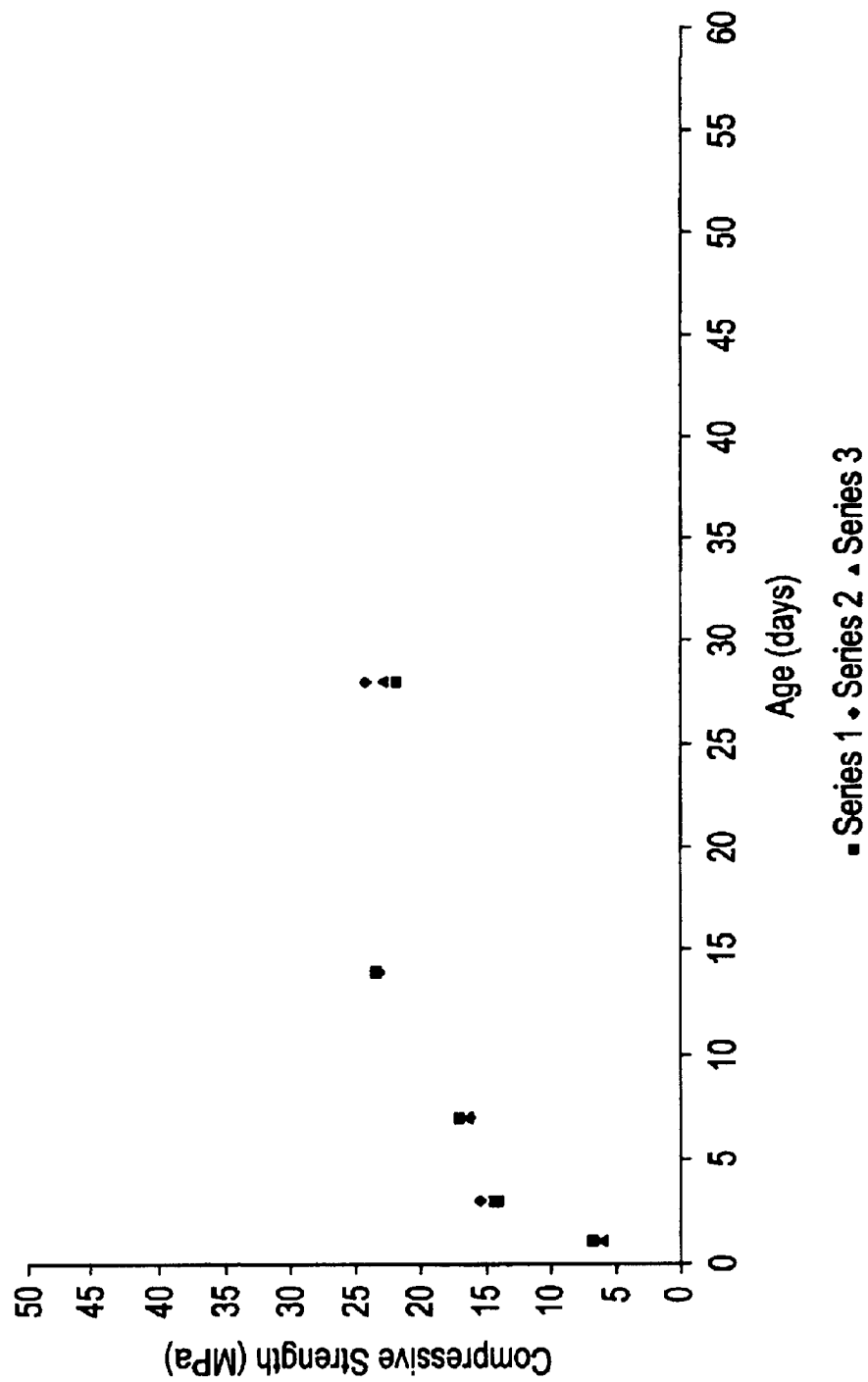
FIG. 1. Compressive strength of fly ash mortar prepared with the M8F95 air classified product, used to replace 25% of cement. Three series of mortars were prepared (square, lozenge, and triangle).
Figure 2:
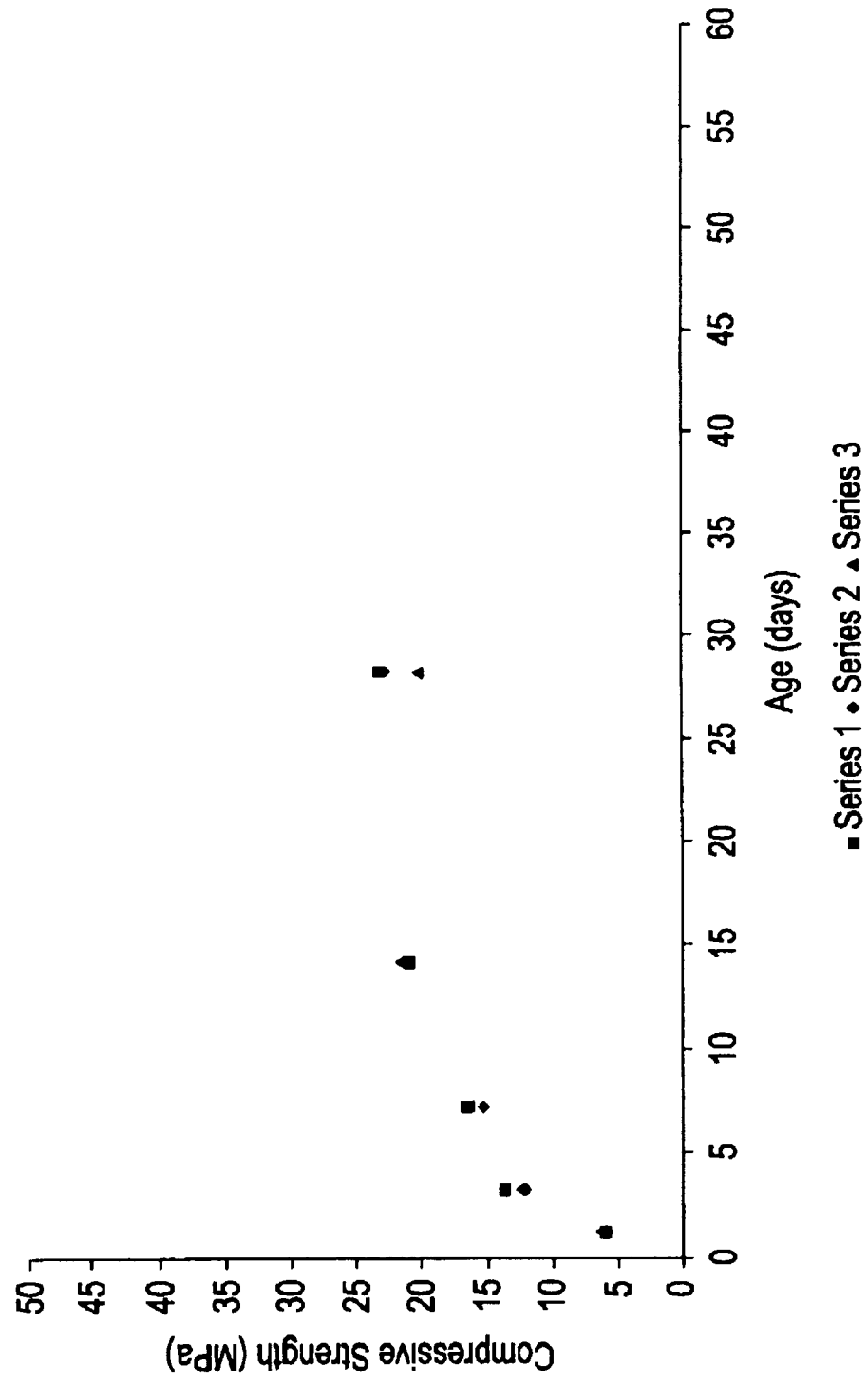
FIG. 2. Compressive strength of fly ash mortar prepared with the M9F95 air classified product, used to replace 25% of cement. Three series of mortars were prepared (square, lozenge, and triangle).
Figure 9:
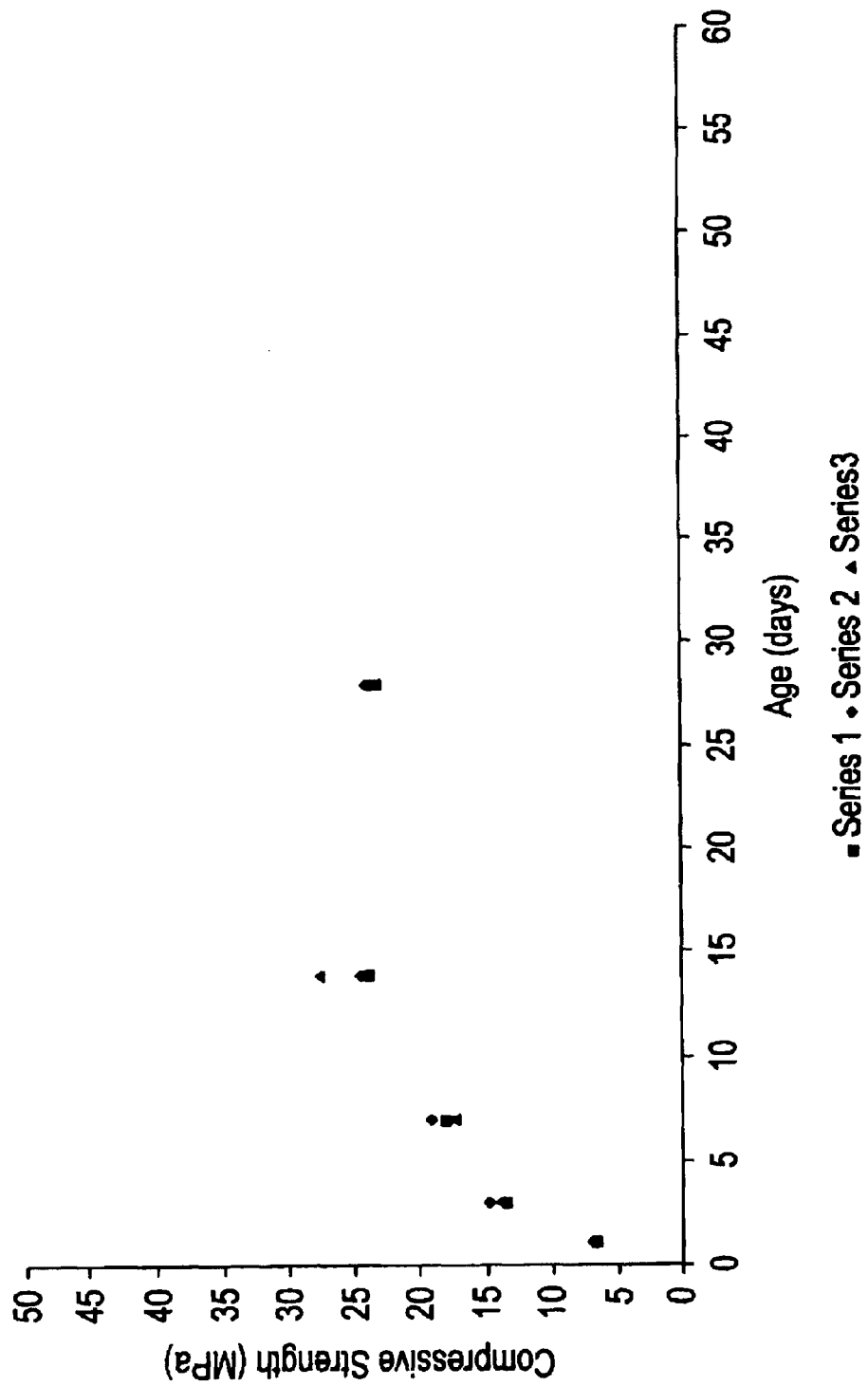
FIG. 9. Compressive strength of fly ash mortar prepared with the M0G95 (ground, unfractionated fly ash) product, used to replace 25% of cement. Three series of mortars were prepared (square, lozenge, and triangle).
Figure 10:
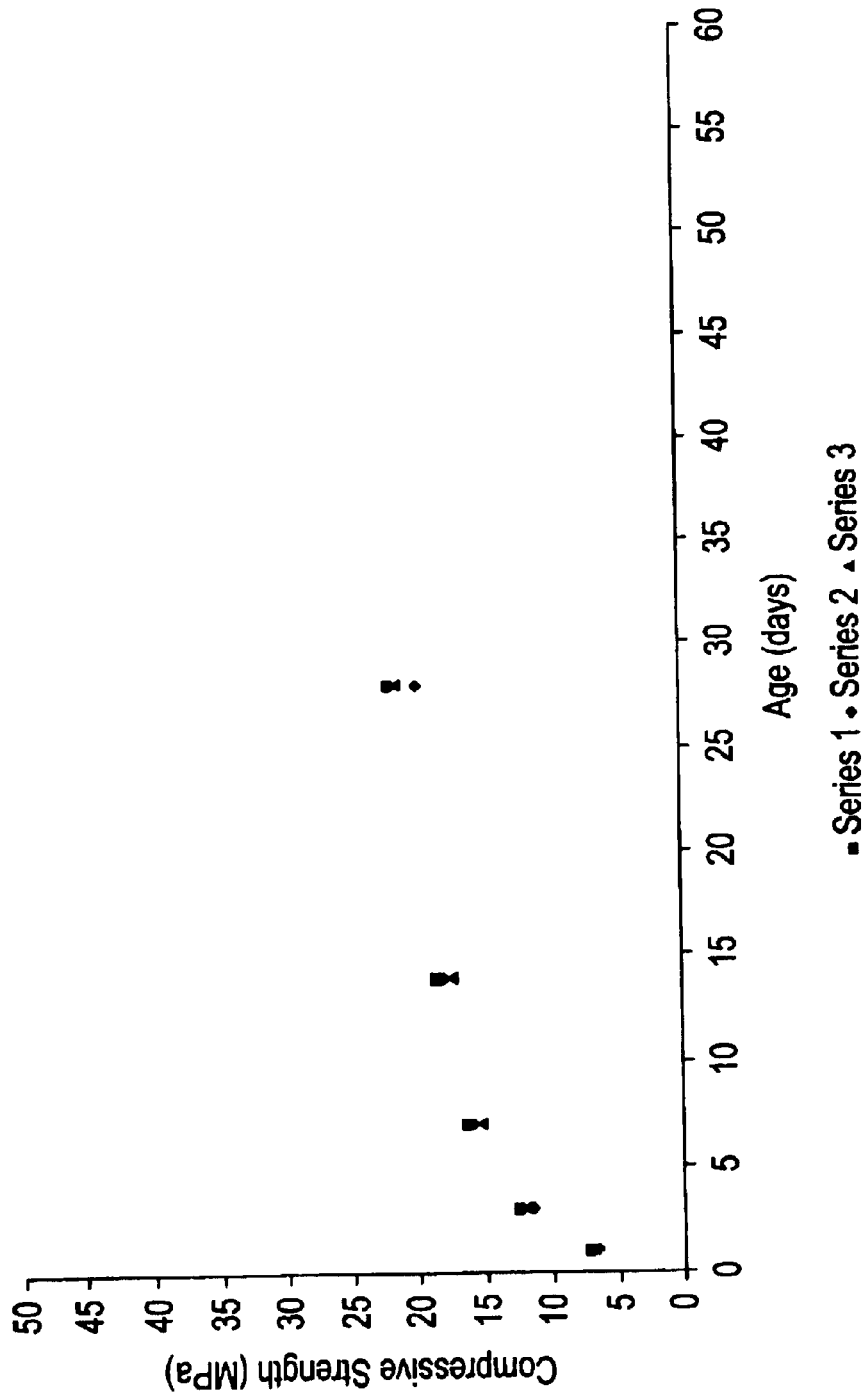
FIG. 10. Compressive strength of fly ash mortar prepared with the M8CG95 air classified product after grinding, used to replace 25% of cement. Three series of mortars were prepared (square, lozenge, and triangle).
Figure 12:
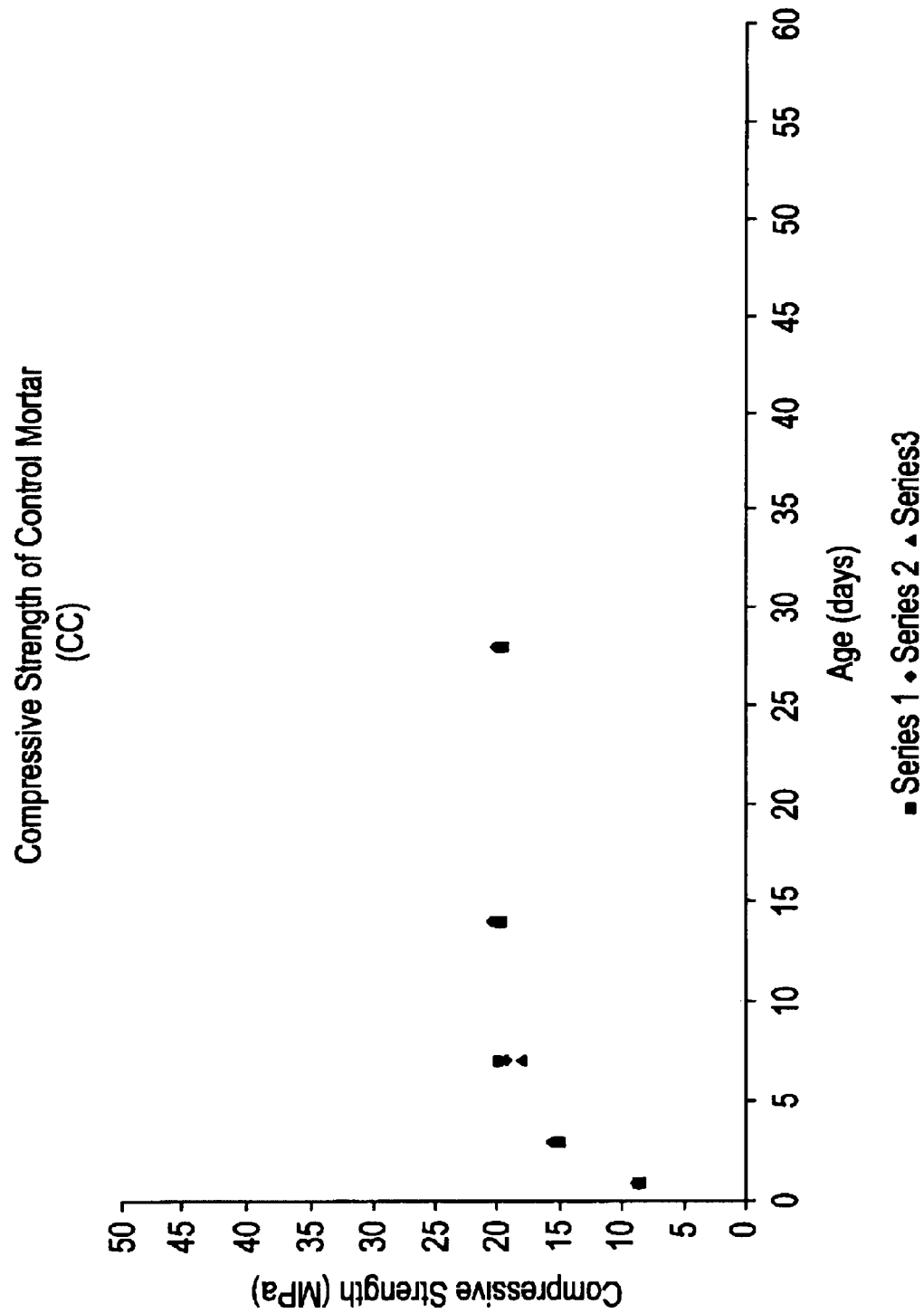
FIG. 12. Compressive strength of control fly ash mortar prepared with cement without fly ash. Three series of mortars were prepared (square, lozenge, and triangle).

The compressive strength development of the mortars M8F95-25 and M0G95-25, prepared with 25 percent replacement of cement with the fractionated M8F95 product or ground unfractionated M0G95 product, achieves control strength between 7 and 14 days of curing (compare FIG. 12 with FIG. 1 and FIG. 9, respectively). The compressive strength of the M8F95-35 and M0C95-35 mortars prepared with 35 percent placement of cement with the MBF95 and M0G95 fly ash product achieves control strength at 14 days of curing (compare FIG. 12 with FIG. 3 and FIG. 11, respectively).

Conclusion

Particle surface grinding achieved with the Union Process Attritor provided targeted fly ash particle size distribution and particle shapes that are comparable to the desirable fly ash product produced with the air classification process. Compressive strength development achieved with mortar up to the 28 day design strength using ground unfractionated Mercer fly ash as a cement replacement is comparable to that achieved with the fly ash product produced in the commercial size Progressive Industries MS-20 air classifier. Compressive strength development exhibited by mortar prepared with 25% cement replacement with ground unfractionated fly ash exceeds control compressive strength between 7 and 14 days of curing.

Most surprisingly, the grinding process produces a desired fly ash product with 100% product yield without the need for air classification. The use of the grinding process can minimize the dependance of produce yield on operating conditions employed in conventional coal fired utility boilers.

The fly ash product has been demonstrated to significantly enhance the strength development and durability of concrete. The two major distinct characteristics of the fly ash product are (1) it performs as good as or better than normal cement using the same design mix portions at early age; and (2) it exhibits exceptional resistance against acid and chemical attack. The studies carried out so far utilized conventional mix proportions as recommended by ASTM. No additives or admixtures were added in the tested mix proportions since the studies were aimed at evaluating and understanding the performance characteristics of the fly ash product. These data point the way for developing commercial formulations of fly ash product mortar and concrete for permeability, freeze-thaw resistance, mortar and concrete with early strength, mortar and concrete with strong acid and salt resistance for repair applications, concrete for glass fiber reinforced composites, and concrete with fly ash product and microsilica (silica fume).

EXAMPLE 3

Grinding Results Using a Non-expanded Bed

In this example, both an expanded and non-expanded bed were used to grind fly ash. In particular, an unprocessed, raw fly ash was selected for grinding. The grinding of the raw fly ash in a non-expanded bed was investigated using the Union Process Dry Grinding Attritor whose principle of operation is described in FIG. 6.

Two experiments comprising a series of eleven grinding runs were carried out in a HSA-30 Attritor, which allows scale-up and assessment of the grinding performance of the commercial size Attritor without the need for large quantities of sample. The first three grinding runs involved an expanded bed, wherein the shaft of the grinder had a speed of 600 RPM. The remaining grinding runs were performed with a non-expanded bed, wherein the speed of the shaft was 400 RPM, with a current of 65 amps. In order to maintain this amperage in the non-expanded bed, i.e., transfer the same amount of energy to the grinding medium, an additional 5.8 gallons of grinding medium were used in the non-expanded bed experiments. The grinding medium used in these experiments was carbon steel spheres having a diameter of about ⅛ inch, and a packing density of about 40.2 lbs/gallon.

Experiment 1

Expanded Bed Grinding

In the first experiment three runs were made grinding fly ash in an expanded bed.

Run No. 1

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 600 |
| Power: | 65 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 180 lbs/10 minutes |
| | 2) Product Temperature: 260° F. |
| | 3) Cooling Water Inlet temperature: 55° F./Outlet: 82° F. |
| | 4) Cooling Rate: 10 GPM |
| | 5) Feeder Setting: 460 |
| Process Rate: | 1080 lbs/hour |

The grinding medium comprised 440 lbs (5.7 gallons) of carbon steel spheres with a diameter of about ⅛ inch.

The Results of the grinding are set forth below in Table 6:

TABLE 6

MICROTRAC x100 PARTICLE ANALYZER
PERCENT PASSING DATA
ASVR PARAMETERS

| | | |
|---|---|---|
| Id #1: FLY ASH 8 COARSE | Summary Data | Id#2: Fly ash |
| Distrib. Format: Volume | dv = 0.0356 | Low Load |
| Filter: On | 10% = 2.030 | Time: 11:00 |
| Run Time: 60 seconds | 50% = 5.156 | Chan. Progression: |
| Run Number: Avg of 2 runs | 90% = 22.21 | Geom/8rt2 |
| Transmission: 0.94 | mv = 30.38 | Upper Channel |
| Laser Int: 1,008/1.002/1.004 | mn = 1.870 | Edge: 704.0 |
| Residuals: Disabled | ma = 4.180 | Lower Channel |
| Above Residual: 0.000 | cs = 1.436 | Edge: 0.122 |

TABLE 6-continued

MICROTRAC x100 PARTICLE ANALYZER
PERCENT PASSING DATA
ASVR PARAMETERS

| | | |
|---|---|---|
| Below Residual: 0.000 | sd = 5.591 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.06 |
| 383.9 | 99.94 | 0.43 |
| 352.0 | 99.51 | 1.76 |
| 322.8 | 97.75 | 2.21 |
| 296.0 | 95.54 | 1.86 |
| 271.4 | 93.68 | 1.31 |
| 248.9 | 92.37 | 0.45 |
| 228.2 | 91.92 | 0.11 |
| 209.3 | 91.81 | 0.00 |
| 191.9 | 91.81 | 0.00 |
| 176.0 | 91.81 | 0.00 |
| 161.4 | 91.81 | 0.00 |
| 148.0 | 91.81 | 0.00 |
| 135.7 | 91.81 | 0.00 |
| 124.5 | 91.81 | 0.00 |
| 114.1 | 91.81 | 0.00 |
| 104.7 | 91.81 | 0.00 |
| 95.96 | 91.81 | 0.00 |
| 88.00 | 91.81 | 0.00 |
| 80.70 | 91.81 | 0.00 |
| 74.00 | 91.81 | 0.00 |
| 67.86 | 91.81 | 0.00 |
| 62.23 | 91.81 | 0.00 |
| 57.06 | 91.81 | 0.00 |
| 52.33 | 91.81 | 0.00 |
| 47.98 | 91.81 | 0.00 |
| 44.00 | 91.81 | 0.00 |
| 40.35 | 91.81 | 0.00 |
| 37.00 | 91.81 | 0.13 |
| 33.93 | 91.68 | 0.20 |
| 31.11 | 91.48 | 0.25 |
| 28.53 | 91.23 | 0.33 |
| 26.16 | 90.90 | 0.42 |
| 23.99 | 90.48 | 0.54 |
| 22.00 | 89.94 | 0.67 |
| 20.17 | 89.27 | 0.83 |
| 18.50 | 88.44 | 1.01 |
| 16.96 | 87.43 | 1.20 |
| 15.56 | 86023 | 1.42 |
| 14.27 | 84.81 | 1.65 |
| 13.08 | 83.16 | 1.90 |
| 12.00 | 81.62 | 2.15 |
| 11.00 | 79.11 | 2.41 |
| 10.09 | 76.70 | 2.68 |
| 9.250 | 74.02 | 2.94 |
| 8.482 | 17.08 | 3.19 |
| 7.778 | 67.89 | 3.42 |
| 7.133 | 64.47 | 3.63 |
| 6.541 | 60.84 | 3.81 |
| 5.998 | 57.03 | 3.97 |
| 5.500 | 53.06 | 4.09 |
| 5.044 | 48.97 | 4.19 |
| 4.625 | 44.78 | 4.25 |
| | | 4 |
| 4.241 | 4.053 | 4.28 |
| 3.889 | 36.25 | 4.26 |

TABLE 6-continued

MICROTRAC x100 PARTICLE ANALYZER
PERCENT PASSING DATA
ASVR PARAMETERS

| | | |
|---|---|---|
| 3.566 | 31.99 | 4.15 |
| 3.270 | 27.84 | 3.97 |
| 2.999 | 23.87 | 3.71 |
| 2.750 | 20.16 | 3.36 |
| 2.522 | 16.80 | 3.00 |
| 2.312 | 13.80 | 2.62 |
| 2.121 | 11.18 | 2.26 |
| 1.945 | 8.92 | 1.93 |
| 1.783 | 6.99 | 1.64 |
| 1.635 | 5.35 | 1.37 |
| 1.499 | 3.98 | 1.13 |
| 1.375 | 2.85 | 0.90 |
| 1.261 | 1.95 | 0.70 |
| 1.156 | 1.25 | 0.50 |
| 1.060 | 0.75 | 0.36 |
| 0.972 | 0.93 | 0.25 |
| 0.892 | 0.14 | 0.14 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

Figure 13:
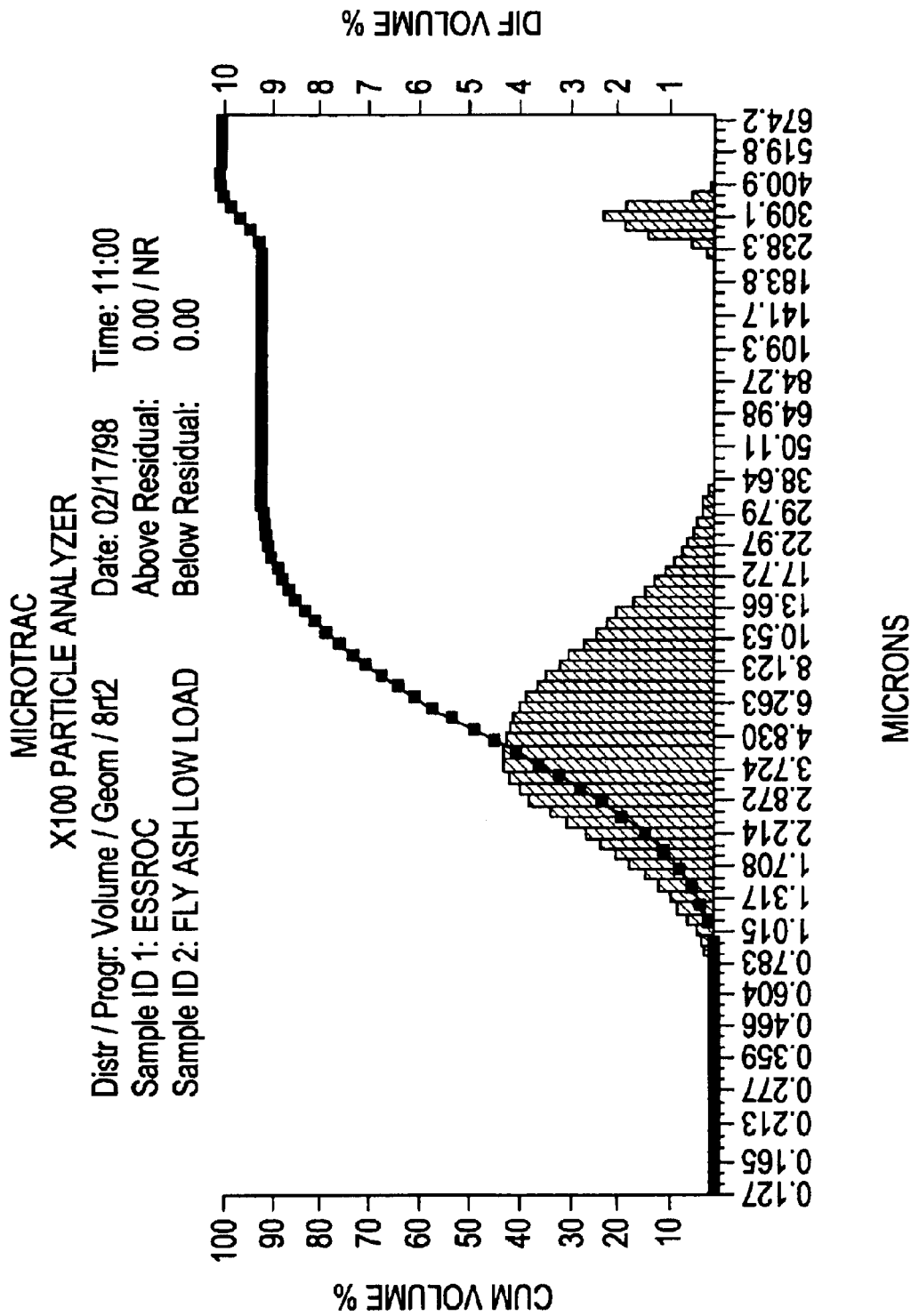
FIG. 13. Histogram of particle size verses percentage of the volume of fly ash particles having a particular size ground in an expanded bed. 1050 lbs/hour of fly ash were ground with a grinding medium comprising 5.7 gallons (229 lbs) of carbon steel spheres having a diameter of ⅛ inch. The power setting for the grinder was 66 amps, and the RPM setting of grounder was 600.

The data of Table 6 are graphically shown in FIG. 13. The final particle size achieved in this experiment were:

90% of the particles had a size less than 22.21 μm;

81.2% of the particles had a size less than 12.0 μm;

50% of the particles had a size less than 5.15 μm; and the median value of the size of the particles was 30.83 μm Run No. 2

A second experiment using an expanded bed was performed, and the following parameters were used:

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 600 |
| Power: | 65 amps |
| Original Particle Size: | DCP 50% 16.3 μm/MV 30.08 μm/ 90% 74.44 μm |
| Desired Particle Size: | 90% - 12 μm |
| Process Procedure: | Continuous Dry Grind |

| | |
|---|---|
| Test Data: | 1) Material Processed: 239 lbs/10 minutes |
| | 2) Product Temperature: 230° F. |
| | 3) Cooling Water Inlet temperature: 30° F./Outlet: 48° F. |
| | 4) Cooling Rate: 10 GPM |
| | 5) Feeder Setting: 550 |
| Process Rate: | 1434 lbs/hour |

In Table 6 above and in Tables 7 through 13 infra, flow rate was 15 ml/sec: Ultrasonic Power was 40 watts, and ultrasonic time was 100 seconds.

The grinding medium comprised 440 lbs (5.7 gallons) of carbon steel spheres with a diameter of about ⅛ inch. The Results of the grinding are set forth below in Table 7, and graphically set forth in FIG. 14.

TABLE 7

MICROTRAC x100 PARTICLE ANALYZER
PERCENT PASSING DATA
ASVR PARAMETERS

| Id #1: FLY ASH 8 COARSE | Summary Data | | Id#2: Fly Ash |
|---|---|---|---|
| Distrib. Format: Volume | dv = | 0.0576 | Med Load |
| Filter: On | 10% = | 2.308 | Time: 12:40 |
| Run Time: 60 seconds | 50% = | 6.719 | Chan. Progression: |
| Run Number: Avg of 2 runs | 90% = | 21.41 | Geom/8rt2 |
| Transmission: 0.91 | mv = | 9.881 | Upper Channel |
| Laser Int: 1,008/1.002/1.004 | mn = | 1.976 | Edge: 704.0 |
| Residuals: Disabled | ma = | 4.933 | Lower Channel |
| Above Residual: 0.000 | cs = | 1.216 | Edge: 0.122 |
| Below Residual: 0.000 | sd = | 7.223 | Number of Channels: 100 |
| | | | Fluid Refractive Index: 1.33 |
| | | | Particle Transparency: Transp. |
| | | | Spherical Particles: No |
| | | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.0 | 0.00 |
| 352.0 | 100.0 | 0.00 |
| 322.8 | 100.0 | 0.00 |
| 296.0 | 100.0 | 0.00 |
| 271.4 | 100.0 | 0.00 |
| 248.9 | 100.0 | 0.00 |
| 228.2 | 100.0 | 0.00 |
| 209.3 | 100.0 | 0.00 |
| 191.9 | 100.0 | 0.00 |
| 176.0 | 100.0 | 0.00 |
| 161.4 | 100.0 | 0.00 |
| 148.0 | 100.0 | 0.00 |
| 135.7 | 100.0 | 0.00 |
| 124.5 | 100.0 | 0.00 |
| 114.1 | 100.0 | 0.00 |
| 104.7 | 100.0 | 0.00 |
| 95.96 | 100.0 | 0.00 |
| 88.00 | 100.0 | 0.00 |
| 80.70 | 100.0 | 0.00 |
| 74.00 | 100.0 | 0.08 |
| 67.86 | 99.92 | 0.13 |
| 62.23 | 99.79 | 0.19 |
| 57.06 | 99.60 | 0.23 |
| 52.33 | 99.37 | 0.26 |
| 47.98 | 99.11 | 0.31 |

TABLE 7-continued

MICROTRAC x100 PARTICLE ANALYZER
PERCENT PASSING DATA
ASVR PARAMETERS

| | | |
|---|---|---|
| 44.00 | 98.80 | 0.38 |
| 40.35 | 98.42 | 0.48 |
| 37.00 | 97.94 | 0.62 |
| 33.93 | 97.32 | 0.80 |
| 31.11 | 96.52 | 1.03 |
| 28.53 | 95.49 | 1.29 |
| 26.16 | 94.20 | 1.61 |
| 23.99 | 92.59 | 1.91 |
| 22.00 | 90.68 | 2.21 |
| 20.17 | 88.47 | 2.45 |
| 18.50 | 86.02 | 2.64 |
| 16.96 | 83.38 | 2.76 |
| 15.56 | 80.62 | 2.83 |
| 14.27 | 77.79 | 2.88 |
| 13.08 | 74.91 | 2.92 |
| 12.00 | 71.99 | 2.97 |
| 11.00 | 69.02 | 3.06 |
| 10.09 | 65.96 | 3.16 |
| 9.250 | 62.80 | 3.30 |
| 8.482 | 59.50 | 3.43 |
| 7.778 | 56.07 | 3.56 |
| 7.133 | 52.51 | 3.64 |
| 6.541 | 48.87 | 3.69 |
| 5.998 | 45.18 | 3.70 |
| 5.500 | 41.48 | 3.69 |
| 5.044 | 37.79 | 3.64 |
| 4.625 | 34.15 | 3.57 |
| 4.241 | 30.58 | 3.48 |
| 3.889 | 27.10 | 3.37 |
| 3.566 | 23.73 | 3.21 |
| 3.270 | 20.52 | 3.02 |
| 2.999 | 17.50 | 2.77 |
| 2.750 | 14.73 | 2.49 |
| 2.522 | 12.24 | 2.20 |
| 2.312 | 10.04 | 1.91 |
| 2.121 | 8.13 | 1.64 |
| 1.945 | 6.49 | 1.41 |
| 1.783 | 5.08 | 1.19 |
| 1.635 | 3.89 | 1.01 |
| 1.499 | 2.88 | 0.84 |
| 1.375 | 2.04 | 0.68 |
| 1.261 | 1.36 | 0.53 |
| 1.156 | 0.83 | 0.40 |
| 1.060 | 0.43 | 0.27 |
| 0.972 | 0.16 | 0.12 |
| 0.892 | 0.04 | 0.04 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this second expanded bed experiment were:

90% of the particles had a size less than 21.41 $\mu$m;

71.9% of the particles had a size less than 12.0 $\mu$m;

50% of the particles had a size less than 6.71 $\mu$m; and the median value of the size of the particles was 9.88.

Run No. 3

In this run, a third expanded grinding bed was used to grind fly ash, with the objective of obtaining a final size of greater than 90% of the fly ash particles being 12 $\mu$m or less. The parameters used in the grinding are as follows:

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 600 |
| Power: | 65 amps |
| Original Particle Size: | DCF 50% 16.3 $\mu$m/MV 30.08 $\mu$m/ 90% 74.44 $\mu$m |
| Desired Particle Size: | 90% - 12 $\mu$m |
| Process Procedure: | Continuous Dry Grind |
| Test Data: | 1) Material Processed: 300 lbs/10 minutes |
| | 2) Product Temperature: 210° F. |
| | 3) Cooling Water Inlet temperature: 28° F./ Outlet: 48° F. |
| | 4) Cooling Rate: 10 GPM |
| | 5) Feeder Setting: 640 |
| Process Rate: | 1434 lbs/hour |

Hence, the amount of fly ash ground is increased relative to the amount ground in Experiments 1 and 2 above.

The grinding medium comprised 440 lbs (5.7 gallons) of carbon steel spheres with a diameter of about ⅛ inch. The Results of the grinding are set forth below in Table 8, and graphically set forth in FIG. 15.

TABLE 8

MICROTRAC x100 PARTICLE ANALYZER
PERCENT PASSING DATA
ASVR PARAMETERS

| Id #1: FLY ASH 8 COARSE | Summary Data | Id#2: Fly Ash |
|---|---|---|
| Distrib. Format: Volume | dv = 0.0647 | Med Load |
| Filter: On | 10% = 2.446 | Time: 13:00 |
| Run Time: 60 seconds | 50% = 7.663 | Chan. Progression: |
| Run Number: Avg of 2 runs | 90% = 25.26 | Geom/8rt2 |
| Transmission: 0.90 | mv = 11.69 | Upper Channel |
| Laser Int: 1,008/1.002/1.004 | mn = 1.982 | Edge: 704.0 |
| Residuals: Disabled | ma = 5.386 | Lower Channel |
| Above Residual: 0.000 | cs = 1.114 | Edge: 0.122 |
| Below Residual: 0.000 | sd = 8.699 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |

TABLE 8-continued

MICROTRAC x100 PARTICLE ANALYZER
PERCENT PASSING DATA
ASVR PARAMETERS

| | | |
|---|---|---|
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.08 |
| 95.96 | 99.92 | 0.11 |
| 88.00 | 99.81 | 0.09 |
| 80.70 | 99.72 | 0.13 |
| 74.00 | 99.59 | 0.21 |
| 67.86 | 99.38 | 0.27 |
| 62.23 | 99.11 | 0.28 |
| 57.06 | 98.83 | 0.33 |
| 52.33 | 98.50 | 0.39 |
| 47.98 | 98.11 | 0.47 |
| 44.00 | 97.64 | 0.59 |
| 40.35 | 97.05 | 0.75 |
| 37.00 | 96.30 | 0.95 |
| 33.93 | 95.35 | 1.20 |
| 31.11 | 94.15 | 1.50 |
| 28.53 | 92.65 | 1.81 |
| 26.16 | 90.84 | 2.16 |
| 23.99 | 88.68 | 2.45 |
| 22.00 | 96.23 | 2.69 |
| 20.17 | 83.54 | 2.86 |
| 18.50 | 80.68 | 2.94 |
| 16.96 | 77.74 | 2.97 |
| 15.56 | 74.77 | 2.94 |
| 14.27 | 71.83 | 2.91 |
| 13.08 | 68.92 | 2.89 |
| 12.00 | 66.03 | 2.92 |
| 11.00 | 63.11 | 2.68 |
| 10.09 | 60.13 | 3.06 |
| 9.250 | 57.07 | 3.18 |
| 8.482 | 53.89 | 3.30 |
| 7.778 | 50.59 | 3.39 |
| 7.133 | 47.20 | 3.47 |
| 6.541 | 43.73 | 3.50 |
| 5.998 | 40.23 | 3.49 |
| 5.500 | 36.74 | 3.40 |
| 5.044 | 33.34 | 3.32 |
| 4.625 | 30.02 | 3.22 |
| 4.241 | 26.80 | 3.11 |
| 3.889 | 23.69 | 2.98 |
| 3.566 | 20.71 | 2.82 |
| 3.270 | 17.89 | 2.63 |
| 2.999 | 15.26 | 2.41 |
| 2.750 | 12.85 | 2.16 |
| 2.522 | 10.69 | 1.90 |
| 2.312 | 8.79 | 1.65 |
| 2.121 | 7.14 | 1.43 |
| 1.945 | 5.71 | 1.22 |
| 1.783 | 4.49 | 1.04 |
| 1.635 | 3.45 | 0.88 |
| 1.499 | 2.57 | 0.74 |
| 1.375 | 1.83 | 0.60 |
| 1.261 | 1.23 | 0.47 |
| 1.156 | 0.76 | 0.37 |
| 1.060 | 0.39 | 0.24 |
| 0.972 | 0.15 | 0.11 |
| 0.892 | 0.04 | 0.04 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |

TABLE 8-continued

MICROTRAC x100 PARTICLE ANALYZER
PERCENT PASSING DATA
ASVR PARAMETERS

| | | |
|---|---|---|
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size range achieved in this third expanded bed experiment were:

90% of the particles had a size less than 25.26 μm;

66% of the particles had a size less than 12 μm;

50% of the particles had a size less than 7.66 μm; and the median value of the size of the particles was 11.69

Thus, in these expanded bed grinding runs set forth in this Example, the desired final particle size of greater than 90% of the particles having a size of 12 μm was not obtained. Furthermore, as the volume of fly ash ground increases, i.e, as the ratio of the volume of fly ash to the void volume decreased, the efficiency of the grinding process decreased.

Experiment 4

Grinding in a Non-expanded Bed

In this experiment, 8 runs were made using a non-expanded bed of the invention to grind fly ash. The volume of fly ash ground in each run was increased to the volume ground in the previous run.

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 66 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 270 lbs/15 minutes |
| | 2) Product Temperature: 260° F. |
| | 3) Cooling Water Inlet temperature: 44° F./ Outlet: 62° F. |
| | 4) Cooling Rate: 10 GPM |
| | 5) Feeder Setting: 440 |
| Process Rate: | 1080 lbs/hour |

Figure 16:
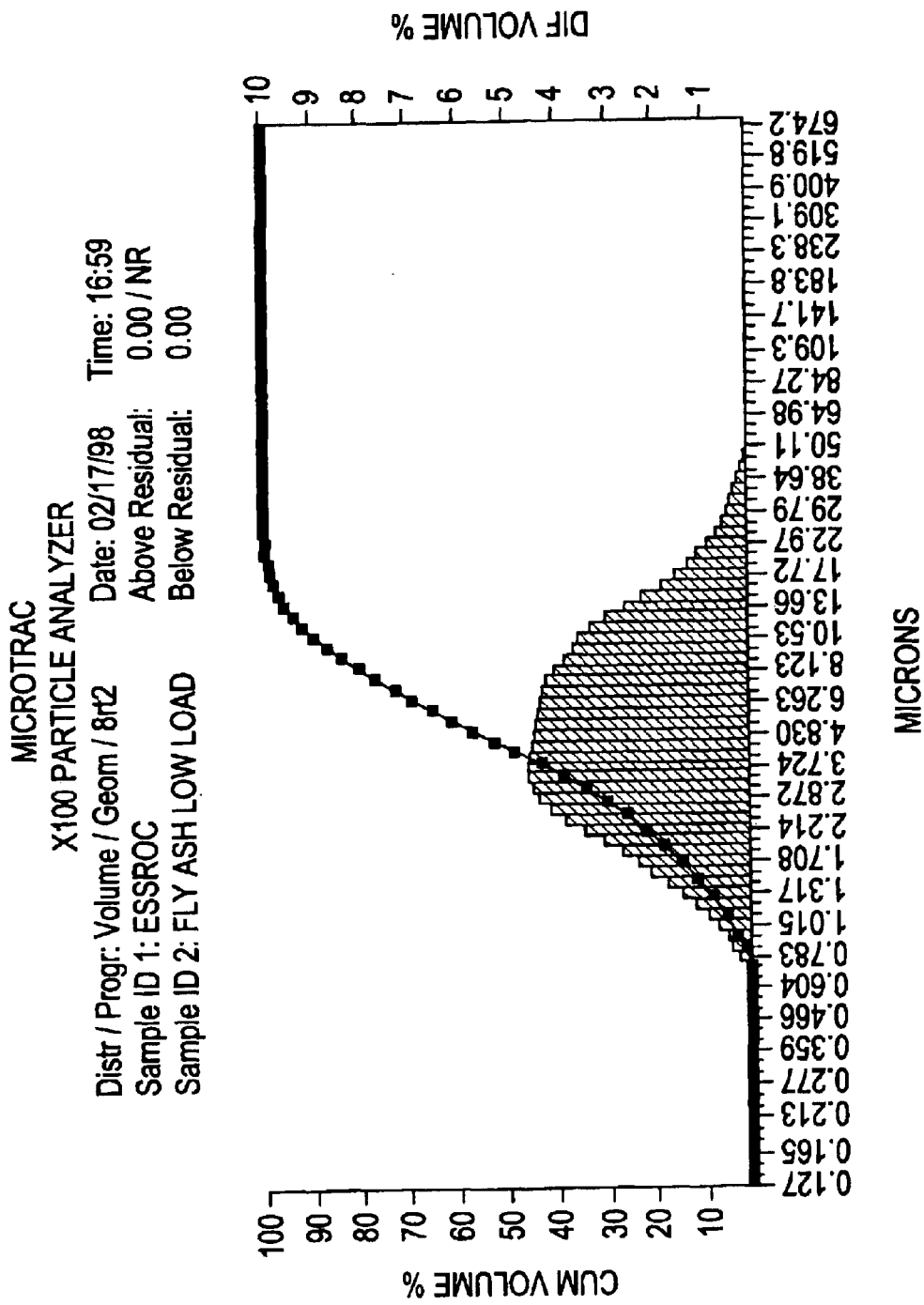
FIG. 16. Histogram of particle size verses percentage of the volume of fly ash particles having a particular size ground in a non-expanded bed. 1050 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results obtained from the first run are set forth in Table 9, and graphically in FIG. 16.

TABLE 9

MICROTRAC x100 PARTICLE ANALYZER PERCENT PASSING DATA ASVR PARAMETERS

| Id #1: FLY ASH 8 COARSE | Summary Data | Id #2: Fly ash |
|---|---|---|
| Distrib. Format: Volume | dv = 0.0446 | Med Load |
| Filter: On | 10% = 1.920 | Time: 16:59 |
| Run Time: 15 seconds | 50% = 4.703 | Chan. Progression: |
| Run Number: Avg of 2 runs | 90% = 11.91 | Geom/8rt2 |
| Transmission: 0.91 | mv = 6.050 | Upper Channel |
| Laser Int: 1,008/1.002/1.004 | mn = 1.861 | Edge: 704.0 |
| Residuals: Disabled | ma = 3.775 | Lower Channel |
| Above Residual: 0.00 | cs = 1.589 | Edge: 0.122 |
| Below Residual: 0.00 | sd = 3.757 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.00 |
| 33.93 | 100.00 | 0.00 |
| 31.11 | 100.00 | 0.16 |
| 28.53 | 99.84 | 0.26 |
| 26.16 | 99.58 | 0.33 |
| 23.99 | 99.25 | 0.42 |
| 22.00 | 99.83 | 0.55 |
| 20.17 | 99.28 | 0.72 |
| 18.50 | 97.56 | 0.92 |
| 16.96 | 96.64 | 1.15 |
| 15.56 | 95.49 | 1.43 |
| 14.27 | 94.06 | 1.75 |
| 13.08 | 92.31 | 2.10 |
| 12.00 | 90.21 | 2.46 |
| 11.00 | 87.75 | 2.84 |
| 10.09 | 84.91 | 3.18 |
| 9.250 | 81.73 | 3.50 |
| 8.482 | 78.23 | 3.75 |
| 7.778 | 74.48 | 3.96 |

TABLE 9-continued

MICROTRAC x100 PARTICLE ANALYZER PERCENT PASSING DATA ASVR PARAMETERS

| Ch Top | % Pass | % Change |
|---|---|---|
| 7.133 | 70.52 | 4.11 |
| 6.541 | 66.41 | 4.21 |
| 5.998 | 62.20 | 4.29 |
| 5.500 | 57.91 | 4.35 |
| 5.044 | 53.56 | 4.40 |
| 4.625 | 49.16 | 4.46 |
| 4.241 | 44.70 | 4.49 |
| 3.889 | 40.21 | 4.50 |
| 3.566 | 35.71 | 4.44 |
| 3.270 | 31.27 | 4.30 |
| 2.999 | 26.97 | 4.06 |
| 2.750 | 22.91 | 3.72 |
| 2.522 | 19.19 | 3.34 |
| 2.312 | 15.85 | 2.94 |
| 2.121 | 12.91 | 2.57 |
| 1.945 | 10.34 | 2.22 |
| 1.783 | 8.12 | 1.90 |
| 1.635 | 6.22 | 1.62 |
| 1.499 | 4.60 | 1.34 |
| 1.375 | 3.26 | 1.08 |
| 1.261 | 2.18 | 0.82 |
| 1.156 | 1.36 | 0.58 |
| 1.060 | 0.78 | 0.39 |
| 0.972 | 0.39 | 0.26 |
| 0.892 | 0.13 | 0.13 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this second expanded bed experiment were:

90% of the particles had a size less than 11.91 $\mu$m;

50% of the particles had a size less than 6.05 $\mu$m; and the median value of the size of the particles was 6.05 $\mu$m More importantly, 90.21% of the fly ash produced with this non-expanded bed process had a size less than 12.0 $\mu$m.

Run No. 2

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |

-continued

| | |
|---|---|
| Power: | 66 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 358 lbs/15 minutes |
| | 2) Product Temperature: 230° F. |
| | 3) Cooling Water Inlet temperature: 30° F./ Outlet: 54° F. |
| | 4) Cooling Rate: 10 GPM |
| Process Rate: | 1432 lbs/hour |

Figure 17:
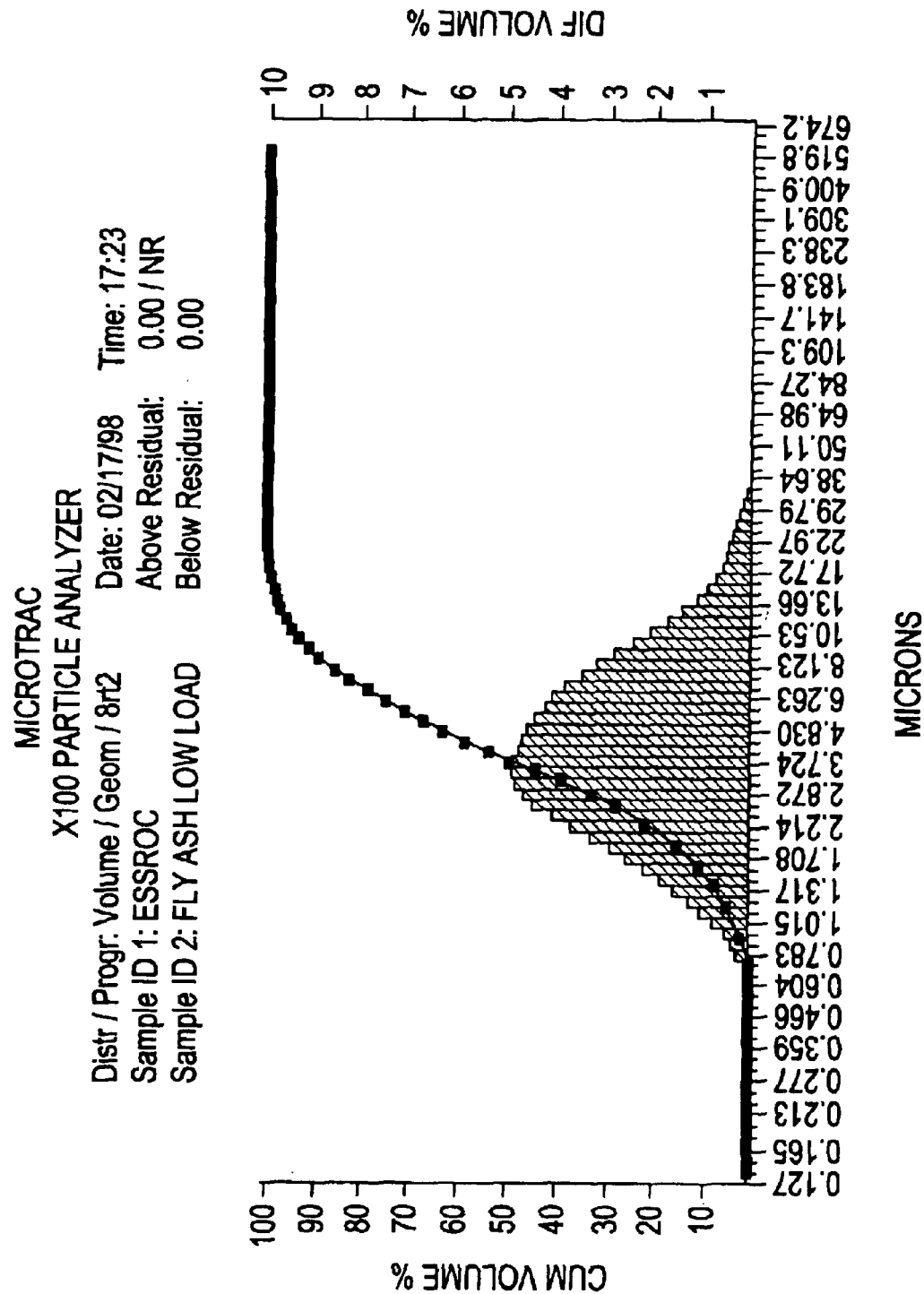
FIG. 17. Histogram of particle size verses percentage of the volume of fly ash particles having a particular size ground in a non-expanded bed. 1440 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 10, and graphically in FIG. 17.

TABLE 10

MICROTRAC ×100 PARTICLE ANALYZER PERCENT PASSING DATA ASVR PARAMETERS

| Id #1: FLY ASH 8 COARSE | Summary Data | Id #2: Fly ash |
|---|---|---|
| Distrib. Format: Volume | dv = 0.0412 | Med Load |
| Filter: On | 10% = 1.830 | Time: 17:23 |
| Run Time: 60 seconds | 50% = 4.301 | Chan. Progression: |
| Run Number: Avg of 2 runs | 90% = 10.49 | Geom/8rt2 |
| Transmission: 0.92 | mv = 5.458 | Upper Channel |
| Laser Int: 1,008/1.002/1.004 | mn = 1.829 | Edge: 704.0 |
| Residuals: Disabled | ma = 3.531 | Lower Channel |
| Above Residual: 0.00 | cs = 1.699 | Edge: 0.122 |
| Below Residual: 0.00 | sd = 3.251 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |

TABLE 10-continued

MICROTRAC ×100 PARTICLE ANALYZER PERCENT PASSING DATA ASVR PARAMETERS

| | | |
|---|---|---|
| 47.98 | 100.00 | 0.00 |
| 44.00 | 100.00 | 0.00 |
| 40.35 | 100.00 | 0.00 |
| 37.00 | 100.00 | 0.00 |
| 33.93 | 100.00 | 0.00 |
| 31.11 | 100.00 | 0.05 |
| 28.53 | 99.95 | 0.12 |
| 26.16 | 99.83 | 0.21 |
| 23.99 | 99.62 | 0.30 |
| 22.00 | 99.32 | 0.37 |
| 20.17 | 98.95 | 0.48 |
| 18.50 | 98.47 | 0.62 |
| 16.96 | 97.85 | 0.80 |
| 15.56 | 97.05 | 1.01 |
| 14.27 | 96.04 | 1.28 |
| 13.08 | 94.76 | 1.59 |
| 12.00 | 93.17 | 1.95 |
| 11.00 | 91.22 | 2.33 |
| 10.09 | 88.89 | 2.72 |
| 9.250 | 86.17 | 3.11 |
| 8.482 | 83.06 | 3.46 |
| 7.778 | 79.60 | 3.77 |
| 7.133 | 75.83 | 4.03 |
| 6.541 | 71.80 | 4.23 |
| 5.998 | 67.57 | 4.40 |
| 5.500 | 63.17 | 4.53 |
| 5.044 | 58.64 | 4.65 |
| 4.625 | 53.99 | 4.75 |
| 4.241 | 49.24 | 4.82 |
| 3.889 | 44.24 | 4.85 |
| 3.566 | 39.57 | 4.80 |
| 3.270 | 34.77 | 4.67 |
| 2.999 | 30.10 | 4.43 |
| 2.750 | 25.67 | 4.08 |
| 2.522 | 21.59 | 3.69 |
| 2.312 | 17.90 | 3.26 |
| 2.121 | 14.64 | 2.86 |
| 1.945 | 11.78 | 2.49 |
| 1.783 | 9.29 | 2.15 |
| 1.635 | 7.14 | 1.84 |
| 1.499 | 5.30 | 1.54 |
| 1.375 | 3.76 | 1.24 |
| 1.261 | 2.52 | 0.95 |
| 1.156 | 1.57 | 0.67 |
| 1.060 | 0.90 | 0.46 |
| 0.972 | 0.44 | 0.29 |
| 0.892 | 0.15 | 0.15 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this second non-expanded bed were:

90% of the particles had a size less than 10.49 μm;
93.1% of the particles had a size less than 12.0 μm;
50% of the particles had a size less than 4.31 μm; and
the median value of the size of the particles was 5.45

Run No. 3

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 66 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 450 lbs/15 minutes |
| | 2) Product Temperature: 206° F. |
| | 3) Cooling Water Inlet temperature: 40° F./ Outlet: 50° F. |
| | 4) Cooling Rate: 10 GPM |
| | 5) Feeder setting: 640 |
| Process Rate: | 1800 lbs/hour |

Figure 18:
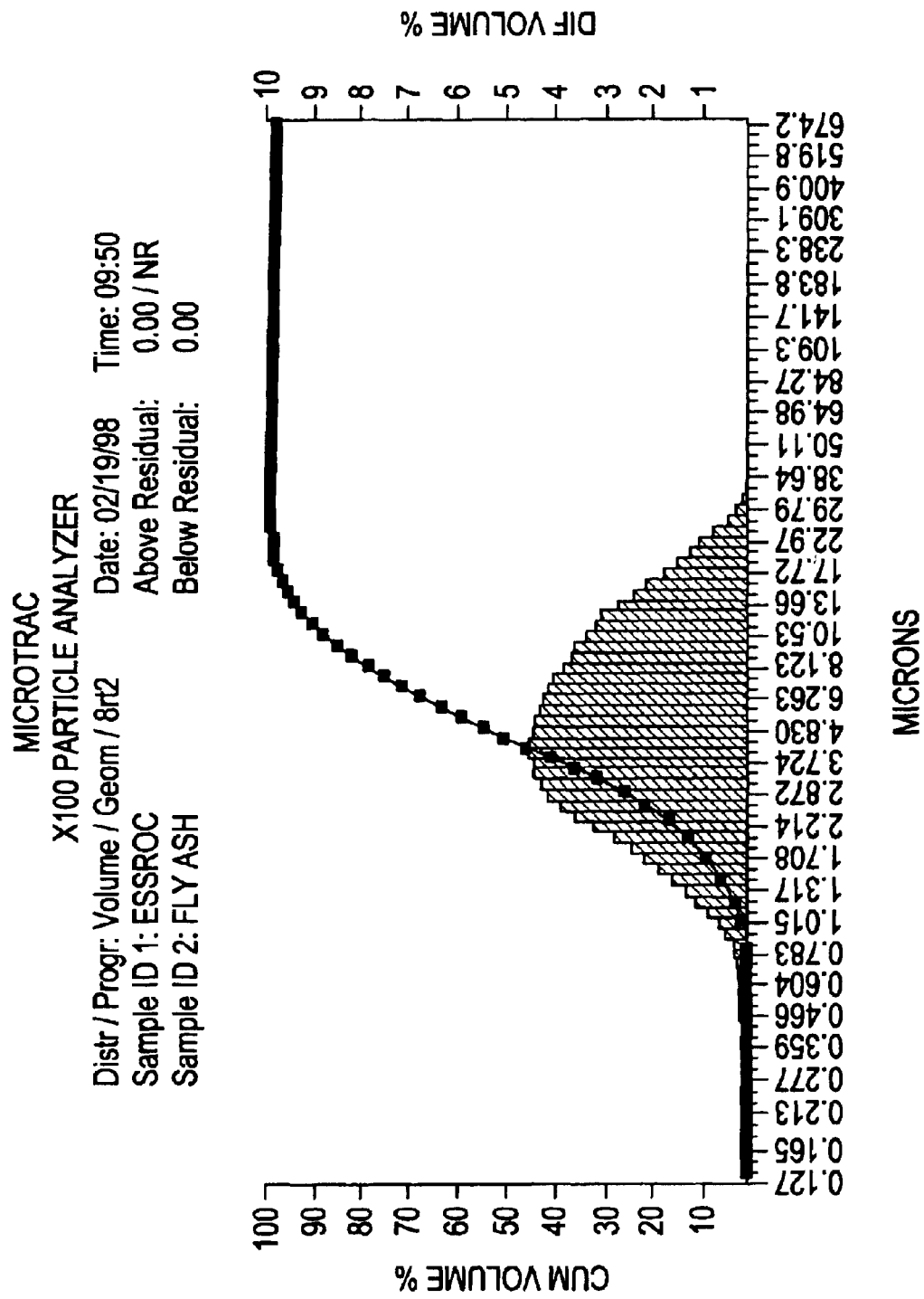
FIG. 18. Histogram of particle size verses percentage of the volume of fly ash particles having a particular size ground in a non-expanded bed. 1800 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 11, and graphically in FIG. 18.

TABLE 11

MICROTRAC x100 PARTICLE ANALYZER
PERCENT PASSING DATA
ASVR PARAMETERS

| Id #1: FLY ASH 8 COARSE | Summary Data | Id #2: Fly ash |
|---|---|---|
| Distrib. Format: Volume | dv = 0.0575 | Med Load |
| Filter: On | 10% = 1.907 | Chan. Progression: |
| Run Time: 60 seconds | 50% = 4.709 | Geom/8rt2 |
| Run Number: Avg of 2 runs | 90% = 12.31 | Upper Channel |
| Transmission: 0.90 | mv = 6.148 | Edge: 704.0 |
| Laser Int: 1,008/1.002/1.004 | mn = 1.843 | Lower Channel |
| Residuals: Disabled | ma = 3.774 | Edge: 0.122 |
| Above Residual: 0.00 | cs = 1.590 | Number of |
| Below Residual: 0.00 | sd = 3.861 | Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |

TABLE 11-continued

MICROTRAC x100 PARTICLE ANALYZER
PERCENT PASSING DATA
ASVR PARAMETERS

| Ch Top | % Pass | % Change |
|---|---|---|
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.05 |
| 33.93 | 99.95 | 0.10 |
| 31.11 | 99.85 | 0.19 |
| 28.53 | 99.66 | 0.26 |
| 26.16 | 99.40 | 0.34 |
| 23.99 | 99.06 | 0.46 |
| 22.00 | 98.60 | 0.61 |
| 20.17 | 97.99 | 0.79 |
| 18.50 | 97.20 | 1.02 |
| 16.96 | 96.18 | 1.28 |
| 15.56 | 94.90 | 1.56 |
| 14.27 | 93.34 | 1.84 |
| 13.08 | 91.50 | 2.14 |
| 12.00 | 89.36 | 2.44 |
| 11.00 | 86.92 | 2.73 |
| 10.09 | 84.19 | 3.03 |
| 9.250 | 81.16 | 3.31 |
| 8.482 | 77.85 | 3.57 |
| 7.778 | 74.28 | 3.81 |
| 7.133 | 70.47 | 4.02 |
| 6.541 | 66.45 | 4.18 |
| 5.998 | 62.27 | 4.31 |
| 5.500 | 57.96 | 4.40 |
| 5.044 | 53.56 | 4.48 |
| 4.625 | 49.08 | 4.52 |
| 4.241 | 44.56 | 4.54 |
| 3.889 | 40.02 | 4.51 |
| 3.566 | 35.51 | 4.41 |
| 3.270 | 31.10 | 4.23 |
| 2.999 | 26.87 | 3.98 |
| 2.750 | 22.89 | 3.65 |
| 2.522 | 19.24 | 3.28 |
| 2.312 | 15.96 | 2.89 |
| 2.121 | 13.07 | 2.54 |
| 1.945 | 10.53 | 2.21 |
| 1.783 | 8.32 | 1.91 |
| 1.635 | 6.41 | 1.64 |
| 1.499 | 4.77 | 1.37 |
| 1.375 | 3.40 | 1.11 |
| 1.261 | 2.29 | 0.85 |
| 1.156 | 1.44 | 0.61 |
| 1.060 | 0.83 | 0.42 |
| 0.972 | 0.41 | 0.27 |
| 0.892 | 0.14 | 0.14 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |

TABLE 11-continued

MICROTRAC x100 PARTICLE ANALYZER
PERCENT PASSING DATA
ASVR PARAMETERS

| | | |
|---|---|---|
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this third non-expanded bed were:

90% of the particles had a size less than 12.31 μm;

89.3% of the particles had a size less than 12.0 μm;

50% of the particles had a size less than 4.70 μm; and the median value of the size of the particles was 6.14

Run No. 4

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 66 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 500 lbs/15 minutes |
| | 2) Product Temperature: 200° F. |
| | 3) Cooling Water Inlet temperature: 40° F./ Outlet: 50° F. |
| | 4) Cooling Rate: 10 GPM |
| | 5) Feeder setting: 720 |
| Process Rate: | 2000 lbs/hour |

Figure 19:
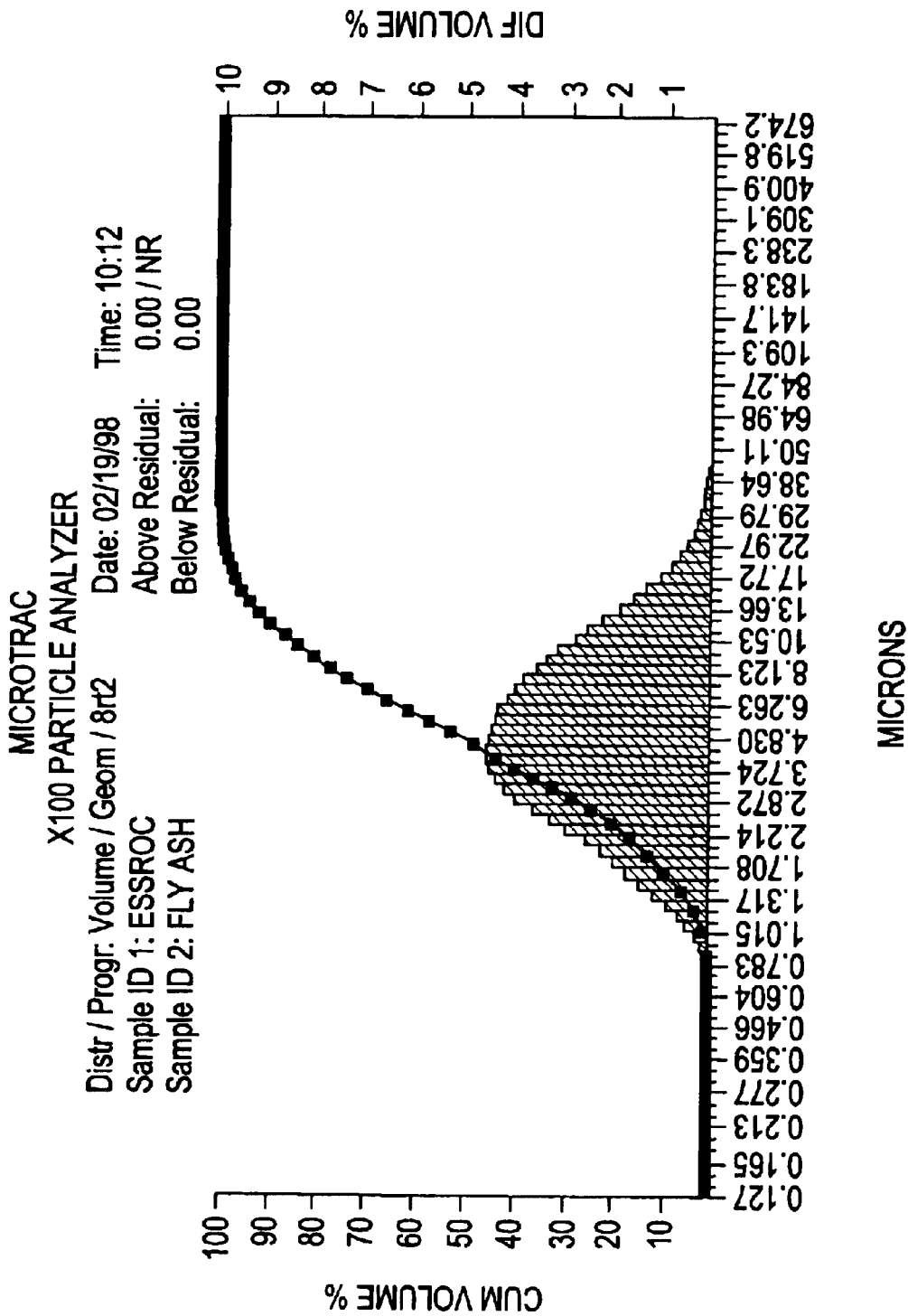
FIG. 19. Histogram of particle size verses percentage of the volume of fly ash particles having a particular size ground in a non-expanded bed. 2000 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 12 below, and graphically in FIG. 19.

TABLE 12

MICROTRAC x100 PARTICLE ANALYZER
PERCENT PASSING DATA
ASVR PARAMETERS

| | | |
|---|---|---|
| Id #1: FLY ASH 8 COARSE | Summary Data | Id #2: Fly ash |
| Distrib. Format: Volume | dv = 0.0393 | Med Load |
| Filter: On | 10% = 1.969 | Chan. Progression: |
| Run Time: 60 seconds | 50% = 4.912 | Geom/8rt2 |
| Run Number: Avg of 2 runs | 90% = 12.55 | Upper Channel |
| Transmission: 0.93 | mv = 6.301 | Edge: 704.0 |
| Laser Int: 1,008/1.002/1.004 | mn = 1.873 | Lower Channel |
| Residuals: Disabled | ma = 3.899 | Edge: 0.122 |

TABLE 12-continued

MICROTRAC x100 PARTICLE ANALYZER
PERCENT PASSING DATA
ASVR PARAMETERS

| | | |
|---|---|---|
| Above Residual: 0.00 | cs = 1.539 | Number of Channels: 100 |
| Below Residual: 0.00 | sd = 3.965 | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.00 |
| 33.93 | 100.00 | 0.00 |
| 31.11 | 100.00 | 0.17 |
| 28.53 | 99.83 | 0.28 |
| 26.16 | 99.55 | 0.35 |
| 23.99 | 99.20 | 0.48 |
| 22.00 | 98.72 | 0.65 |
| 20.17 | 98.07 | 0.86 |
| 18.50 | 97.21 | 1.11 |
| 16.96 | 96.10 | 1.37 |
| 15.56 | 94.73 | 1.67 |
| 14.27 | 93.06 | 1.98 |
| 13.08 | 91.08 | 2.30 |
| 12.00 | 88.78 | 2.63 |
| 11.00 | 86.15 | 2.95 |
| 10.09 | 83.20 | 3.26 |
| 9.250 | 79.94 | 3.55 |
| 8.482 | 76.39 | 3.79 |
| 7.778 | 72.60 | 4.00 |
| 7.133 | 68.60 | 4.17 |
| 6.541 | 64.43 | 4.28 |
| 5.998 | 60.15 | 4.37 |
| 5.500 | 55.78 | 4.41 |
| 5.044 | 51.37 | 4.45 |
| 4.625 | 46.92 | 4.46 |
| 4.241 | 42.46 | 4.44 |
| 3.889 | 38.02 | 4.39 |
| 3.566 | 33.63 | 4.28 |

TABLE 12-continued

MICROTRAC x100 PARTICLE ANALYZER
PERCENT PASSING DATA
ASVR PARAMETERS

| | | |
|---|---|---|
| 3.270 | 29.35 | 4.09 |
| 2.999 | 25.26 | 3.83 |
| 2.750 | 21.43 | 3.49 |
| 2.522 | 17.94 | 3.12 |
| 2.312 | 14.82 | 2.75 |
| 2.121 | 12.07 | 2.39 |
| 1.945 | 9.68 | 2.07 |
| 1.783 | 7.61 | 1.78 |
| 1.635 | 5.83 | 1.51 |
| 1.499 | 4.32 | 1.25 |
| 1.375 | 3.07 | 1.00 |
| 1.261 | 2.07 | 0.77 |
| 1.156 | 1.30 | 0.55 |
| 1.060 | 0.75 | 0.37 |
| 0.972 | 0.38 | 0.25 |
| 0.892 | 0.13 | 0.13 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this fourth non-expanded bed were:

90% of the particles had a size less than 12.55 μm;
88.7% of the particles had a size less than 12.0 μm;
50% of the particles had a size less than 4.91 μm; and
the median value of the size of the particles was 6.30 μm.

Run No. 5

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 65 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 550 lbs/15 minutes |
| | 2) Product Temperature: 195° F. |
| | 3) Cooling Water Inlet temperature: 42° F./ Outlet: 58° F. |
| | 4) Cooling Rate: 10 GPM |
| | 5) Feeder setting: 800 |
| Process Rate: | 2200 lbs/hour |

Figure 20:
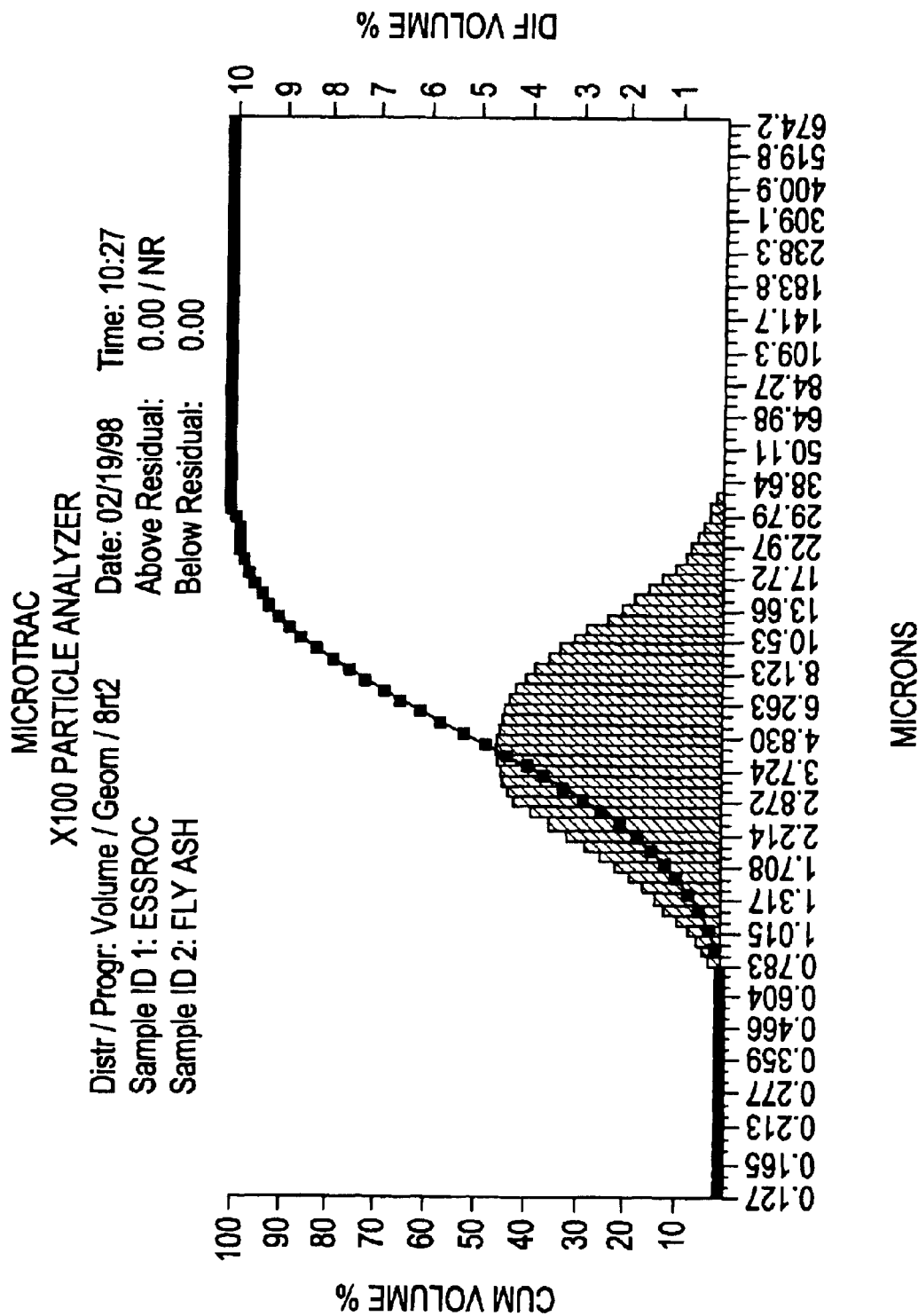
FIG. 20. Histogram of particle size verses percentage of the volume of fly ash particles having a particular size ground in a non-expanded bed. 2200 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 13 below, and graphically in FIG. 20.

TABLE 13

MICROTRAC x100 PARTICLE ANALYZER
PERCENT PASSING DATA
ASVR PARAMETERS

| Id #1: FLY ASH 8 COARSE | Summary Data | Id #2: Fly ash |
|---|---|---|
| Distrib. Format: Volume | dv = 0.0553 | Med Load |
| Filter: On | 10% = 1.985 | Chan. Progression: |
| Run Time: 60 seconds | 50% = 5.096 | Geom/8rt2 |
| Run Number: Avg of 2 runs | 90% = 13.24 | Upper Channel |
| Transmission: 0.93 | mv = 6.592 | Edge: 704.0 |
| Laser Int: 1,008/1.002/1.004 | mn = 1.856 | Lower Channel |
| Residuals: Disabled | ma = 3.985 | Edge: 0.122 |
| Above Residual: 0.00 | cs = 1.506 | Number of |
| Below Residual: 0.00 | sd = 4.220 | Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.05 |
| 33.93 | 99.95 | 0.12 |
| 31.11 | 99.83 | 0.22 |
| 28.53 | 99.61 | 0.32 |
| 26.16 | 99.29 | 0.43 |
| 23.99 | 98.86 | 0.58 |
| 22.00 | 98.28 | 0.77 |
| 20.17 | 97.51 | 1.00 |
| 18.50 | 96.51 | 1.26 |
| 16.96 | 95.25 | 1.55 |
| 15.56 | 93.70 | 1.85 |
| 14.27 | 91.85 | 2.16 |
| 13.08 | 89.69 | 2.48 |
| 12.00 | 87.21 | 2.79 |
| 11.00 | 84.42 | 3.09 |

TABLE 13-continued

**MICROTRAC x100 PARTICLE ANALYZER
PERCENT PASSING DATA
ASVR PARAMETERS**

| | | |
|---|---|---|
| 10.09 | 81.33 | 3.36 |
| 9.250 | 77.97 | 3.62 |
| 8.482 | 74.35 | 3.83 |
| 7.778 | 70.52 | 4.01 |
| 7.133 | 66.51 | 4.14 |
| 6.541 | 62.37 | 4.24 |
| 5.998 | 58.13 | 4.30 |
| 5.500 | 53.83 | 4.34 |
| 5.044 | 49.49 | 4.35 |
| 4.625 | 45.14 | 4.34 |
| 4.241 | 40.80 | 4.30 |
| 3.889 | 36.50 | 4.24 |
| 3.566 | 32.26 | 4.10 |
| 3.270 | 28.16 | 3.90 |
| 2.999 | 24.26 | 3.64 |
| 2.750 | 20.62 | 3.30 |
| 2.522 | 17.32 | 2.96 |
| 2.312 | 14.36 | 2.60 |
| 2.121 | 11.76 | 2.27 |
| 1.945 | 9.49 | 1.97 |
| 1.783 | 7.52 | 1.71 |
| 1.635 | 5.81 | 1.46 |
| 1.499 | 4.35 | 1.23 |
| 1.375 | 3.12 | 1.00 |
| 1.261 | 2.12 | 0.77 |
| 1.156 | 1.35 | 0.56 |
| 1.060 | 0.79 | 0.39 |
| 0.972 | 0.40 | 0.26 |
| 0.892 | 0.14 | 0.14 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this fifth non-expanded bed were:

90% of the particles had a size less than 13.24 $\mu$m;

87.21% of the particles had a size less than 12.0 $\mu$m;

50% of the particles had a size less than 5.09 $\mu$m; and the median value of the size of the particles was 6.30 $\mu$m.

Run No. 6

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Slide 100% |
| Horse Power: | 50 |

-continued

| | |
|---|---|
| RPM Setting: | 400 |
| Power: | 66 amps |
| Original Particle Size: | DCF 50% 16.3 $\mu$m/MV 30.08 $\mu$m/ 90% 74.44 $\mu$m |
| Desired Particle Size: | 90% - 12 $\mu$m |
| Process Procedure: | Continous Dry Grind |
| Test Data: | 1) Material Processed: 570 lbs/15 minutes |
| | 2) Product Temperature: 195° F. |
| | 3) Cooling Water Inlet temperature: 30° F./ Outlet: 48° F. |
| | 4) Cooling Rate: 10 GPM |
| | 5) Feeder setting: 800 |
| Process Rate: | 2280 lbs/hour |

Figure 21:
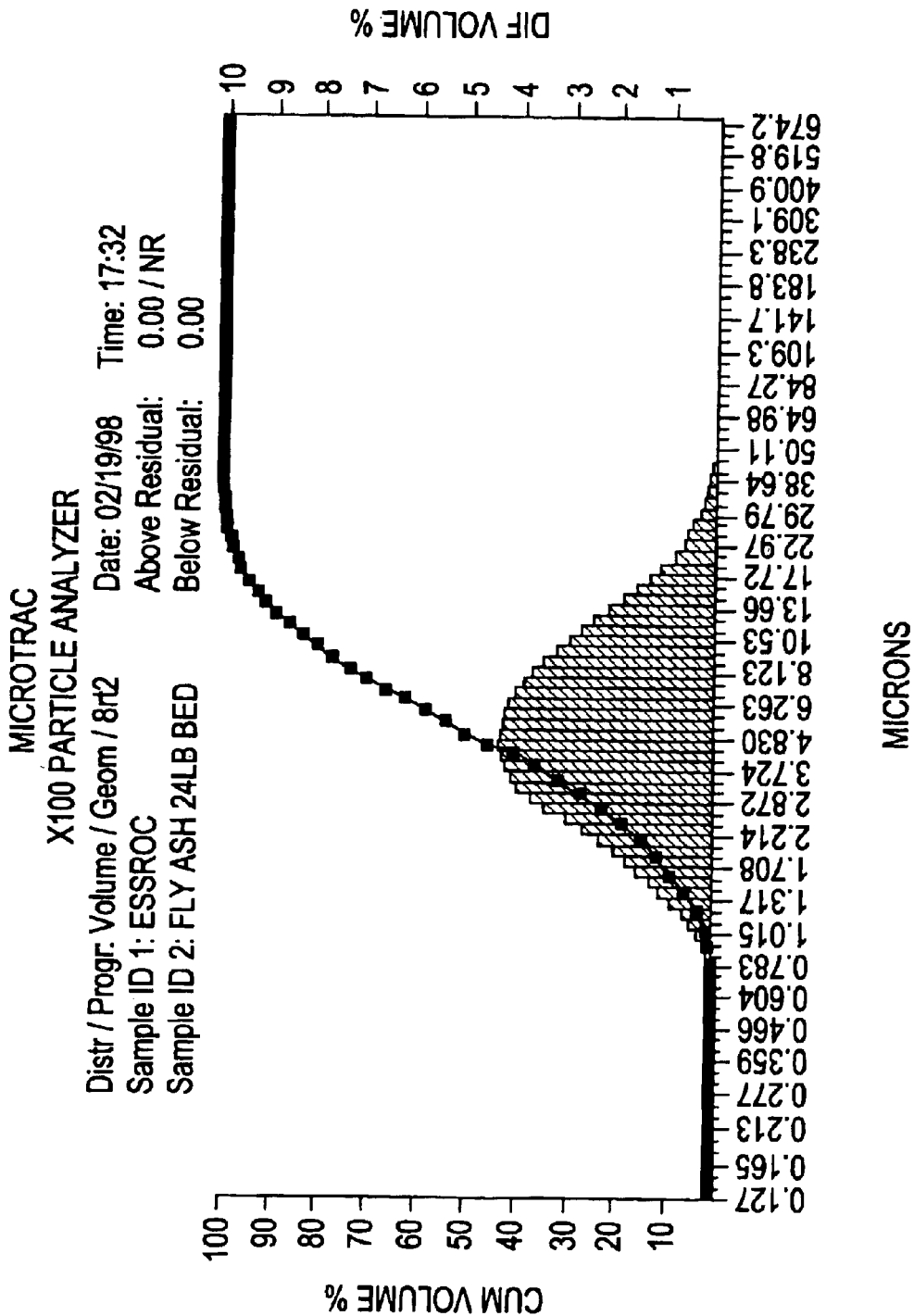
FIG. 21. Histogram of particle size verses percentage of the volume of fly ash particles having a particular size ground in a non-expanded bed. 2280 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 14 below, and graphically in FIG. 21.

TABLE 14

**MICROTRAC x100 PARTICLE ANALYZER
PERCENT PASSING DATA
ASVR PARAMETERS**

| Id #1: FLY ASH 8 COARSE | Summary Data | Id #2: Fly Ash |
|---|---|---|
| Distrib. Format: Volume | dv = 0.0564 | Med Load |
| Filter: On | 10% = 1.945 | Time: 13:00 |
| Run Time: 60 seconds | 50% = 5.012 | Chan. Progression: |
| Run Number: Avg of 2 runs | 90% = 13.59 | Geom/8rt2 |
| Transmission: 0.90 | mv = 6.688 | Upper Channel |
| Laser Int: 1,008/1.002/1.004 | mn = 1.830 | Edge: 704.0 |
| Residuals: Disabled | ma = 3.929 | Lower Channel |
| Above Residual: 0.000 | cs = 1.527 | Edge: 0.122 |
| Below Residual: 0.000 | sd = 4.309 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |

TABLE 14-continued

MICROTRAC x100 PARTICLE ANALYZER
PERCENT PASSING DATA
ASVR PARAMETERS

| | | |
|---|---|---|
| 57.06 | 100.00 | 0.00 |
| 52.33 | 100.00 | 0.00 |
| 47.98 | 100.00 | 0.00 |
| 44.00 | 100.00 | 0.05 |
| 40.35 | 99.95 | 0.10 |
| 37.00 | 99.85 | 0.18 |
| 33.93 | 99.67 | 0.24 |
| 31.11 | 99.43 | 0.29 |
| 28.53 | 99.14 | 0.37 |
| 26.16 | 98.77 | 0.48 |
| 23.99 | 98.29 | 0.62 |
| 22.00 | 97.67 | 0.80 |
| 20.17 | 96.87 | 1.03 |
| 18.50 | 95.84 | 1.29 |
| 16.96 | 94.55 | 1.56 |
| 15.56 | 92.99 | 1.84 |
| 14.27 | 91.15 | 2.12 |
| 13.08 | 89.03 | 2.38 |
| 12.00 | 86.65 | 2.65 |
| 11.00 | 84.00 | 2.91 |
| 10.09 | 81.09 | 3.16 |
| 9.250 | 77.93 | 3.42 |
| 8.482 | 74.51 | 3.65 |
| 7.778 | 70.86 | 3.86 |
| 7.133 | 67.00 | 4.02 |
| 6.541 | 62.98 | 4.15 |
| 5.998 | 58.83 | 4.23 |
| 5.500 | 54.60 | 4.28 |
| 5.044 | 50.32 | 4.31 |
| 4.625 | 46.01 | 4.32 |
| 4.241 | 41.69 | 4.29 |
| 3.889 | 37.40 | 4.24 |
| 3.566 | 33.16 | 4.13 |
| 3.270 | 29.03 | 3.94 |
| 2.999 | 25.09 | 3.69 |
| 2.750 | 21.40 | 3.37 |
| 2.522 | 18.03 | 3.02 |
| 2.312 | 15.01 | 2.67 |
| 2.121 | 12.34 | 2.34 |
| 1.945 | 10.00 | 2.05 |
| 1.783 | 7.95 | 1.78 |
| 1.635 | 6.17 | 1.54 |
| 1.499 | 4.63 | 1.29 |
| 1.375 | 3.34 | 1.06 |
| 1.261 | 2.28 | 0.83 |
| 1.156 | 1.45 | 0.60 |
| 1.060 | 0.85 | 0.42 |
| 0.972 | 0.43 | 0.28 |
| 0.892 | 0.15 | 0.15 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this sixth non-expanded bed were:

90% of the particles had a size less than 13.59 $\mu$m;

85.65% of the particles had a size less than 12.0 $\mu$m,

50% of the particles had a size less than 5.01 $\mu$m; and the median size of a particle produced in this run was 6.68 $\mu$m.

Run No. 7

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 66 amps |
| Original Particle Size: | DCF 50% 16.3 $\mu$m/MV 30.08 $\mu$m/ 90% 74.44 $\mu$m |
| Desired Particle Size: | 90% - 12 $\mu$m |
| Process Procedure: | Continuous Dry Grind |
| Test Data: | 1) Material Processed: 675 lbs/15 minutes |
| | 2) Product Temperature: 195° F. |
| | 3) Cooling Water Inlet temperature: 30° F./ Outlet: 48° F. |
| | 4) Cooling Rate: 10 GPM |
| Process Rate: | 2700 lbs/hour |

Figure 22:
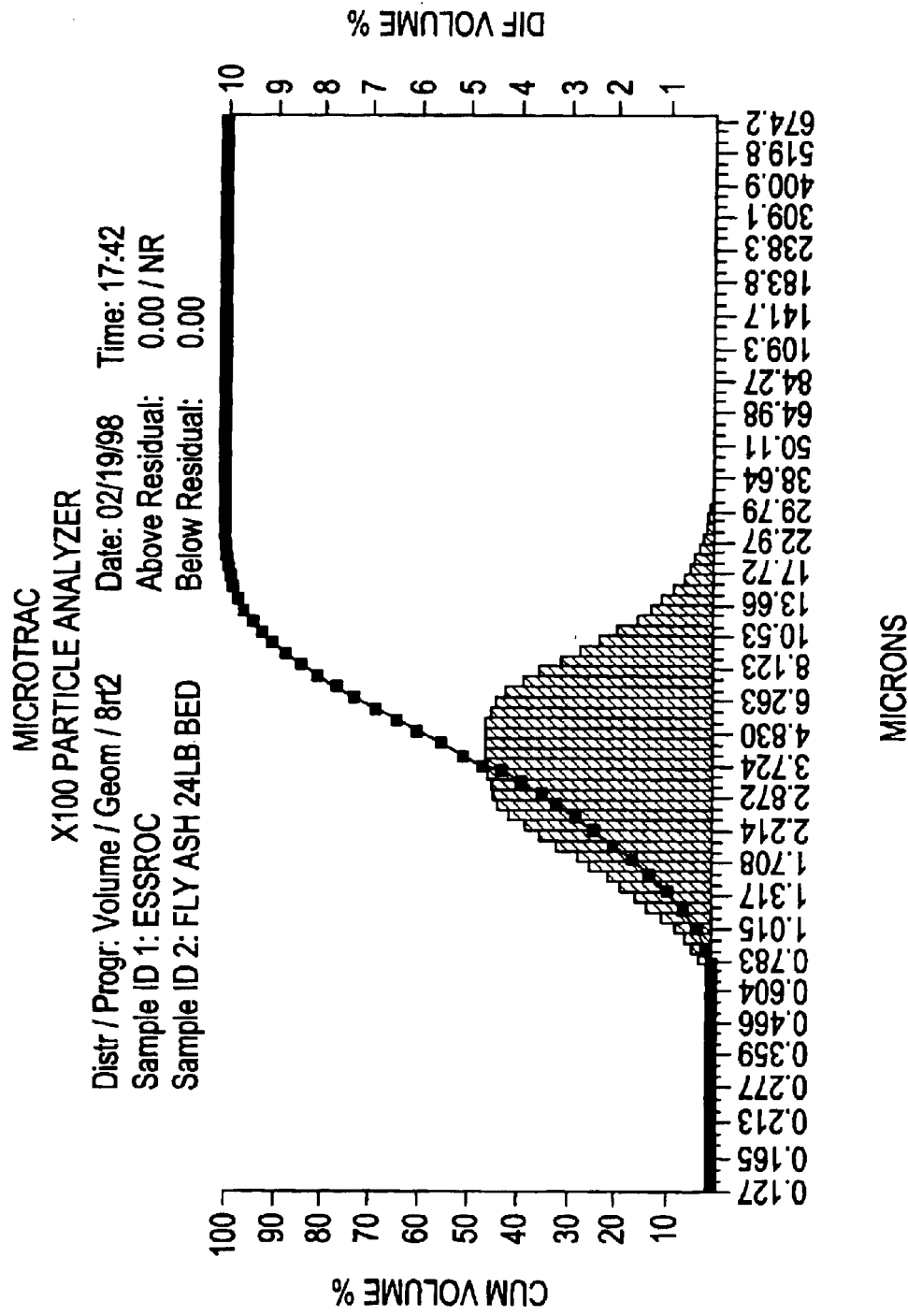
FIG. 22. Histogram of particle size verses percentage of the volume of fly ash particles having a particular size ground in a non-expanded bed. 2700 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 15 below, and graphically in FIG. 22.

TABLE 15

MICROTRAC x100 PARTICLE ANALYZER
PERCENT PASSING DATA
ASVR PARAMETERS

| | | |
|---|---|---|
| Id #1: FLY ASH 8 COARSE | Summary Data | Id #2: Fly Ash |
| Distrib. Format: Volume | dv = 0.0618 | Med Load |
| Filter: On | 10% = 1.837 | Time: 13:00 |
| Run Time: 60 seconds | 50% = 4.564 | Chan. Progression: |
| Run Number: Avg of 2 runs | 90% = 10.97 | Geom/8rt2 |
| Transmission: 0.90 | mv = 5.698 | Upper Channel |
| Laser Int: 1,008/1.002/1.004 | mn = 1.805 | Edge: 704.0 |
| Residuals: Disabled | ma = 3.629 | Lower Channel |
| Above Residual: 0.000 | cs = 1.653 | Edge: 0.122 |
| Below Residual: 0.000 | sd = 3.459 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |

TABLE 15-continued

MICROTRAC x100 PARTICLE ANALYZER PERCENT PASSING DATA ASVR PARAMETERS

| | | |
|---|---|---|
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.00 |
| 33.93 | 100.00 | 0.00 |
| 31.11 | 100.00 | 0.05 |
| 28.53 | 99.95 | 0.12 |
| 26.16 | 99.83 | 0.21 |
| 23.99 | 99.62 | 0.31 |
| 22.00 | 99.31 | 0.40 |
| 20.17 | 98.91 | 0.53 |
| 18.50 | 98.38 | 0.71 |
| 16.96 | 97.67 | 0.92 |
| 15.56 | 96.75 | 1.18 |
| 14.27 | 95.57 | 1.48 |
| 13.08 | 94.09 | 1.82 |
| 12.00 | 92.27 | 2.20 |
| 11.00 | 90.07 | 2.61 |
| 10.09 | 87.46 | 3.02 |
| 9.250 | 84.44 | 3.43 |
| 8.482 | 81.01 | 3.80 |
| 7.778 | 77.21 | 4.10 |
| 7.133 | 73.11 | 4.33 |
| 6.541 | 68.78 | 4.47 |
| 5.998 | 64.31 | 4.53 |
| 5.500 | 59.78 | 4.53 |
| 5.044 | 55.25 | 4.54 |
| 4.625 | 50.71 | 4.54 |
| 4.241 | 46.17 | 4.53 |
| 3.889 | 41.64 | 4.49 |
| 3.566 | 37.15 | 4.40 |
| 3.270 | 32.75 | 4.26 |
| 2.999 | 28.49 | 4.03 |
| 2.750 | 24.46 | 3.74 |
| 2.522 | 20.72 | 3.40 |
| 2.312 | 17.32 | 3.04 |
| 2.121 | 14.25 | 2.69 |
| 1.945 | 11.59 | 2.37 |
| 1.783 | 9.22 | 2.07 |
| 1.635 | 7.15 | 1.79 |
| 1.499 | 5.36 | 1.52 |
| 1.375 | 3.84 | 1.24 |
| 1.261 | 2.60 | 0.96 |
| 1.156 | 1.64 | 0.69 |
| 1.060 | 0.95 | 0.48 |
| 0.972 | 0.47 | 0.31 |
| 0.892 | 0.16 | 0.16 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this seventh non-expanded bed were:

90% of the particles had a size less than 10.97 μm;

92.2% of the particles had a size less than 12.0 μm;

50% of the particles had a size less than 4.56 μm; and the median size of a particle produced in this run was 5.69 μm.

Run No. 8

| | |
|---|---|
| Machine: | HSA-30 |
| Tank: | SS |
| Arms: | 8 L |
| Diverter Discs: | 3 |
| Tank Volume: | 28.6 gallons |
| Cooling Water: | Yes |
| Discharge Screen: | 0.8 MM/LD |
| Open Area: | 1-Side 100% |
| Horse Power: | 50 |
| RPM Setting: | 400 |
| Power: | 66 amps |
| Original Particle Size: | DCF 50% 16.3 μm/MV 30.08 μm/ 90% 74.44 μm |
| Desired Particle Size: | 90% - 12 μm |
| Process Procedure: | Continuous Dry Grind |
| Test Data: | 1) Material Processed: 675 lbs/15 minutes |
| | 2) Product Temperature: 195° F. |
| | 3) Cooling Water Inlet temperature: 30° F./ Outlet: 48° F. |
| | 4) Cooling Rate: 10 GPM |
| Process Rate: | 2700 lbs/hour |

Figure 23:
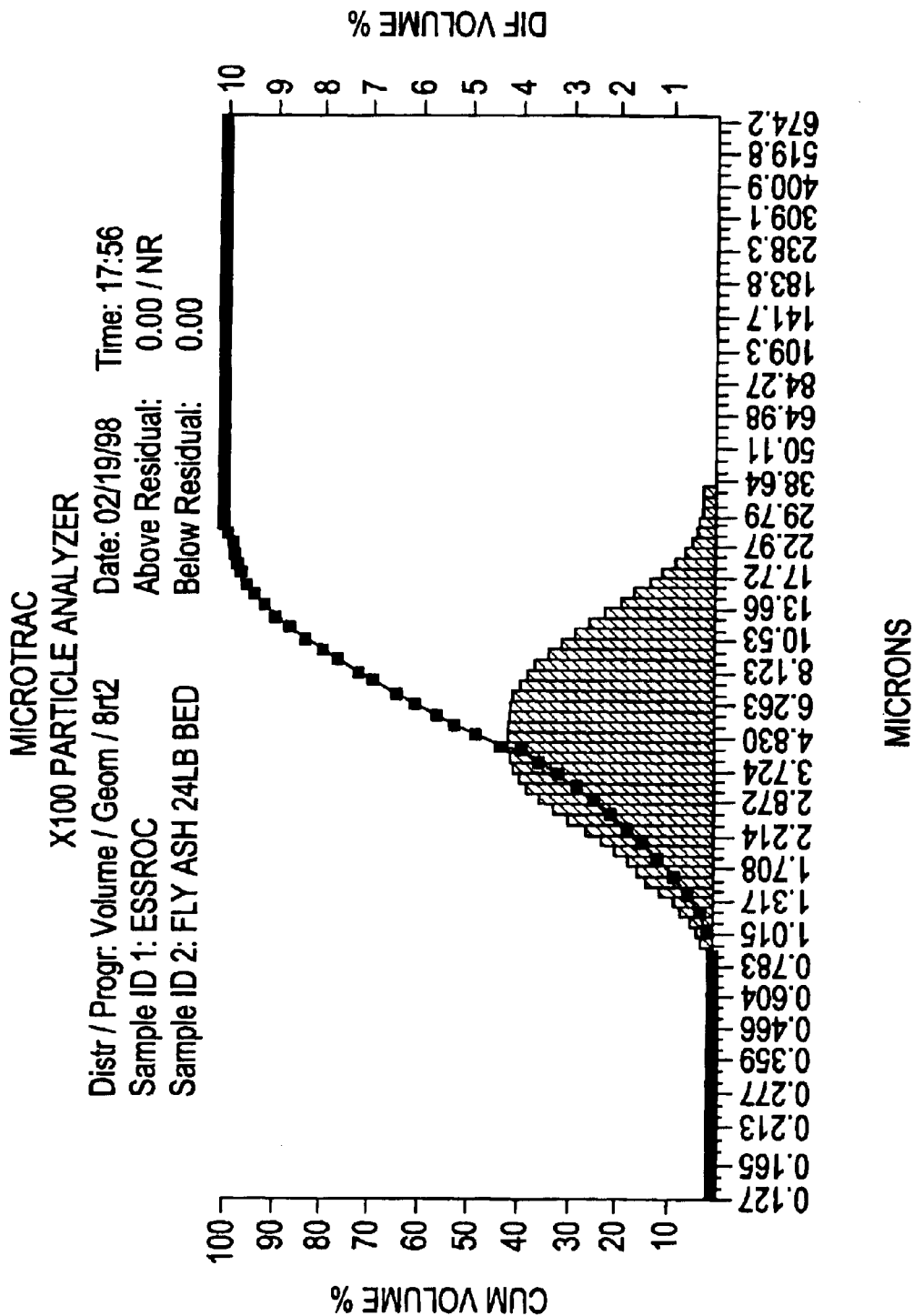
FIG. 23. Histogram of particle size verses percentage of the volume of fly ash particles having a particular size ground in a non-expanded bed. 2700 lbs/hour of fly ash were ground with a grinding medium comprising 11.5 gallons (462 lbs) of carbon steel spheres having a diameter of ⅛ inch. The power setting for the grinder was 66 amps, and the RPM setting of the grinder was 400.

The grinding medium comprises 11.5 gallons (462 lbs) of carbon steel spheres having a size of about ⅛ inch. The results of this run are set forth in Table 16 below, and graphically in FIG. 23.

TABLE 16

MICROTRAC x100 PARTICLE ANALYZER PERCENT PASSING DATA ASVR PARAMETERS

| Id #1: FLY ASH 8 COARSE | Summary Data | Id #2: Fly ash |
|---|---|---|
| Distrib. Format: Volume | dv = 0.0663 | Med Load |
| Filter: On | 10% = 1.967 | Time: 13:00 |
| Run Time: 60 seconds | 50% = 5.156 | Chan. Progression: |

TABLE 16-continued

MICROTRAC x100 PARTICLE ANALYZER
PERCENT PASSING DATA
ASVR PARAMETERS

| Run Number: Avg of 2 runs | 90% = 13.50 | Geom/8rt2 |
|---|---|---|
| Transmission: 0.90 | mv = 6.706 | Upper Channel |
| Laser Int: 1,008/1.002/1.004 | mn = 1.832 | Edge: 704.0 |
| Residuals: Disabled | ma = 3.988 | Lower Channel |
| Above Residual: 0.000 | cs = 1.504 | Edge: 0.122 |
| Below Residual: 0.000 | sd = 4.328 | Number of Channels: 100 |
| | | Fluid Refractive Index: 1.33 |
| | | Particle Transparency: Transp. |
| | | Spherical Particles: No |
| | | Part. Refractive Index: 1.81 |

| Ch Top | % Pass | % Change |
|---|---|---|
| 704.0 | 100.00 | 0.00 |
| 645.6 | 100.00 | 0.00 |
| 592.0 | 100.00 | 0.00 |
| 542.9 | 100.00 | 0.00 |
| 497.8 | 100.00 | 0.00 |
| 456.5 | 100.00 | 0.00 |
| 418.6 | 100.00 | 0.00 |
| 383.9 | 100.00 | 0.00 |
| 352.0 | 100.00 | 0.00 |
| 322.8 | 100.00 | 0.00 |
| 296.0 | 100.00 | 0.00 |
| 271.4 | 100.00 | 0.00 |
| 248.9 | 100.00 | 0.00 |
| 228.2 | 100.00 | 0.00 |
| 209.3 | 100.00 | 0.00 |
| 191.9 | 100.00 | 0.00 |
| 176.0 | 100.00 | 0.00 |
| 161.4 | 100.00 | 0.00 |
| 148.0 | 100.00 | 0.00 |
| 135.7 | 100.00 | 0.00 |
| 124.5 | 100.00 | 0.00 |
| 114.1 | 100.00 | 0.00 |
| 104.7 | 100.00 | 0.00 |
| 95.96 | 100.00 | 0.00 |
| 88.00 | 100.00 | 0.00 |
| 80.70 | 100.00 | 0.00 |
| 74.00 | 100.00 | 0.00 |
| 67.86 | 100.00 | 0.00 |
| 62.23 | 100.00 | 0.00 |
| 57.06 | 100.00 | 0.00 |
| 52.33 | 100.00 | 0.00 |
| 47.98 | 100.00 | 0.00 |
| 44.00 | 100.00 | 0.00 |
| 40.35 | 100.00 | 0.00 |
| 37.00 | 100.00 | 0.14 |
| 33.93 | 99.86 | 0.21 |
| 31.11 | 99.65 | 0.26 |
| 28.53 | 99.39 | 0.33 |
| 26.16 | 99.06 | 0.45 |
| 23.99 | 98.61 | 0.60 |
| 22.00 | 98.01 | 0.79 |
| 20.17 | 97.22 | 1.03 |
| 18.50 | 96.19 | 1.30 |
| 16.96 | 94.89 | 1.60 |
| 15.56 | 93.29 | 1.91 |
| 14.27 | 91.38 | 2.22 |
| 13.08 | 89.16 | 2.53 |
| 12.00 | 86.63 | 2.84 |
| 11.00 | 83.79 | 3.13 |
| 10.09 | 80.66 | 3.40 |
| 9.250 | 77.26 | 3.65 |
| 8.482 | 73.61 | 3.85 |
| 7.778 | 69.76 | 4.02 |
| 7.133 | 65.74 | 4.14 |
| 6.541 | 61.60 | 4.19 |
| 5.998 | 57.41 | 4.23 |
| 5.500 | 53.18 | 4.25 |
| 5.044 | 48.93 | 4.24 |
| 4.625 | 44.69 | 4.22 |
| 4.241 | 40.47 | 4.17 |
| 3.889 | 36.30 | 4.12 |
| 3.566 | 32.18 | 4.00 |
| 3.270 | 28.18 | 3.82 |
| 2.999 | 24.36 | 3.58 |
| 2.750 | 20.78 | 3.27 |
| 2.522 | 17.51 | 2.93 |
| 2.312 | 14.58 | 2.59 |
| 2.121 | 11.99 | 2.27 |
| 1.945 | 9.72 | 1.99 |
| 1.783 | 7.73 | 1.72 |
| 1.635 | 6.01 | 1.49 |
| 1.499 | 4.52 | 1.26 |
| 1.375 | 3.26 | 1.03 |
| 1.261 | 2.23 | .080 |
| 1.156 | 1.43 | 0.59 |
| 1.060 | 0.84 | 0.41 |
| 0.972 | 0.43 | 0.28 |
| 0.892 | 0.15 | 0.15 |
| 0.818 | 0.00 | 0.00 |
| 0.750 | 0.00 | 0.00 |
| 0.688 | 0.00 | 0.00 |
| 0.630 | 0.00 | 0.00 |
| 0.578 | 0.00 | 0.00 |
| 0.530 | 0.00 | 0.00 |
| 0.486 | 0.00 | 0.00 |
| 0.446 | 0.00 | 0.00 |
| 0.409 | 0.00 | 0.00 |
| 0.375 | 0.00 | 0.00 |
| 0.344 | 0.00 | 0.00 |
| 0.315 | 0.00 | 0.00 |
| 0.289 | 0.00 | 0.00 |
| 0.265 | 0.00 | 0.00 |
| 0.243 | 0.00 | 0.00 |
| 0.223 | 0.00 | 0.00 |
| 0.204 | 0.00 | 0.00 |
| 0.187 | 0.00 | 0.00 |
| 0.172 | 0.00 | 0.00 |
| 0.158 | 0.00 | 0.00 |
| 0.145 | 0.00 | 0.00 |
| 0.133 | 0.00 | 0.00 |

The final particle size achieved in this eighth non-expanded bed were:

90% of the particles had a size less than 13.50 $\mu$m;

86.6% of the particles had a size less than 12.0 $\mu$m;

50% of the particles had a size less than 5.15 $\mu$m; and the median size of a particle produced in this run was 6.70 $\mu$m.

Results

TABLE 17

Results
Grinding Results at 600 RPM

| Grinding Medium volume | Amperes | Feed Setting | Product. Rate (lbs/hr) | % bed voids | 50% Particle Size | % less than 12 μ | Product Discharge Temp. (F.) | Product Discharge Opening |
|---|---|---|---|---|---|---|---|---|
| 5.7 | 65 | 440 | 1050 | — | 5.2 μ | 81 | 260 | 100% one side |
| 5.7 | 65 | 555 | 1440 | — | 6.7 μ | 72 | 230 | 100% one side |
| 5.7 | 65 | 640 | 1800 | — | 7.7 μ | 66 | 210 | 100% one side |

Operation of the mill at 600 RPM produces an expanded bed where grinding effectiveness of the bed decreases with an increase in feed setting. At 600 RPM, it appears that the smallest feed setting to the bed volume produces the finer particle size distribution, but at lower production rates when compared to using the higher feed settings (compare curves representing % volume difference in FIGS. 13, 14, and 15). A comparison of these figures show that the particle size distributions become broader and coarser with increasing feed setting. At the lowest feed setting, the distribution of particle sizes show that 10% of the particles are smaller than 1.3 μm, and 90% of the particles are less than 17.7 μm (see FIG. 13). At the 555 feed setting, 10% of the particles are smaller than 1.7 μm, and 90% of the particles are less than 29.8 μm (see FIG. 14). At the 640 feed setting, 10% of the particles are also below 1.7 μm, but 90% of the particles are less than 35 μm. In the expanded bed tests, the highest feed setting introduced sufficient fly ash to exceed the bed void volume. The reduction in bed void volume, due to increased feed settings of fly ash, leads to a coarser product.

However, reduction of the mill speed from 600 RPM to 400 RPM, while maintaining the current constant at 65 amps, allowed the volume of the grinding media to be increased from 5.7 gallons to 11.5 gallons. In addition, at 400 RPM, the volume of the bed does not expand.

Under the conditions described in Table 18 below, the particle size distribution within the product does not appear to be influenced by the feed rate over the range of feed settings from 440 up to 990. This may be seen by comparison of the % volume cumulative curves in FIGS. 16 through 23. In the first 3 runs the grinding process was operated in the expanded bed mode. The feed rate was increased from 440 to 640, which increased the rate of fly ash processed. As a result, the volume of fly ash to the void volume increased, and efficiency of the grinding decreased, which can be seen in Table 17 above.

In contrast, operation of the bed in a non-expanded mode as the feed setting increased employed in these tests indicates that the contact time between the media and the fly ash is unaffected by the increase in feed setting or influenced by a reduction in the product discharging opening. Furthermore, operation at the maximum feed setting of 990, and employing a product discharging opening of 25% of one side stilt does not provide sufficient quantities of fly ash within the bed to reduce the contact time between the media and the fly ash to produce a coarser product as was observed with the expanded bed tests set forth above. This is apparently due to the grinding condition where the fly ash in the grinding bed does not exceed the void volume.

Figure 14:
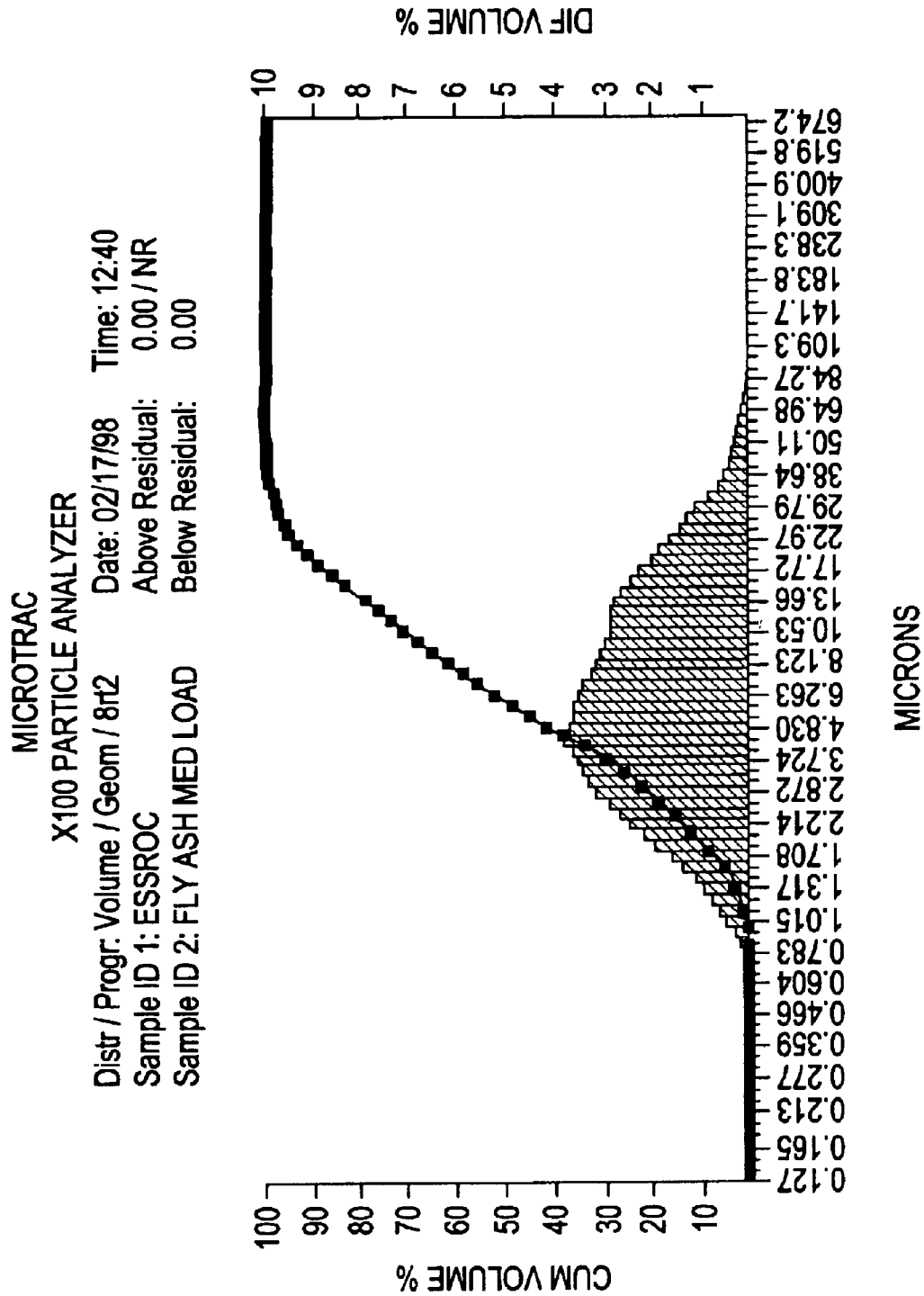
FIG. 14. Histogram of particle size verses percentage of the volume of fly ash particles having a particular size ground in an expanded bed. 1440 lbs/hour lbs of fly ash were ground with a grinding medium comprising 5.7 gallons (229 lbs) of carbon steel spheres having a diameter of ⅛ inch. The power setting for the grinder was 66 amps, and the RPM setting was 600.
Figure 15:
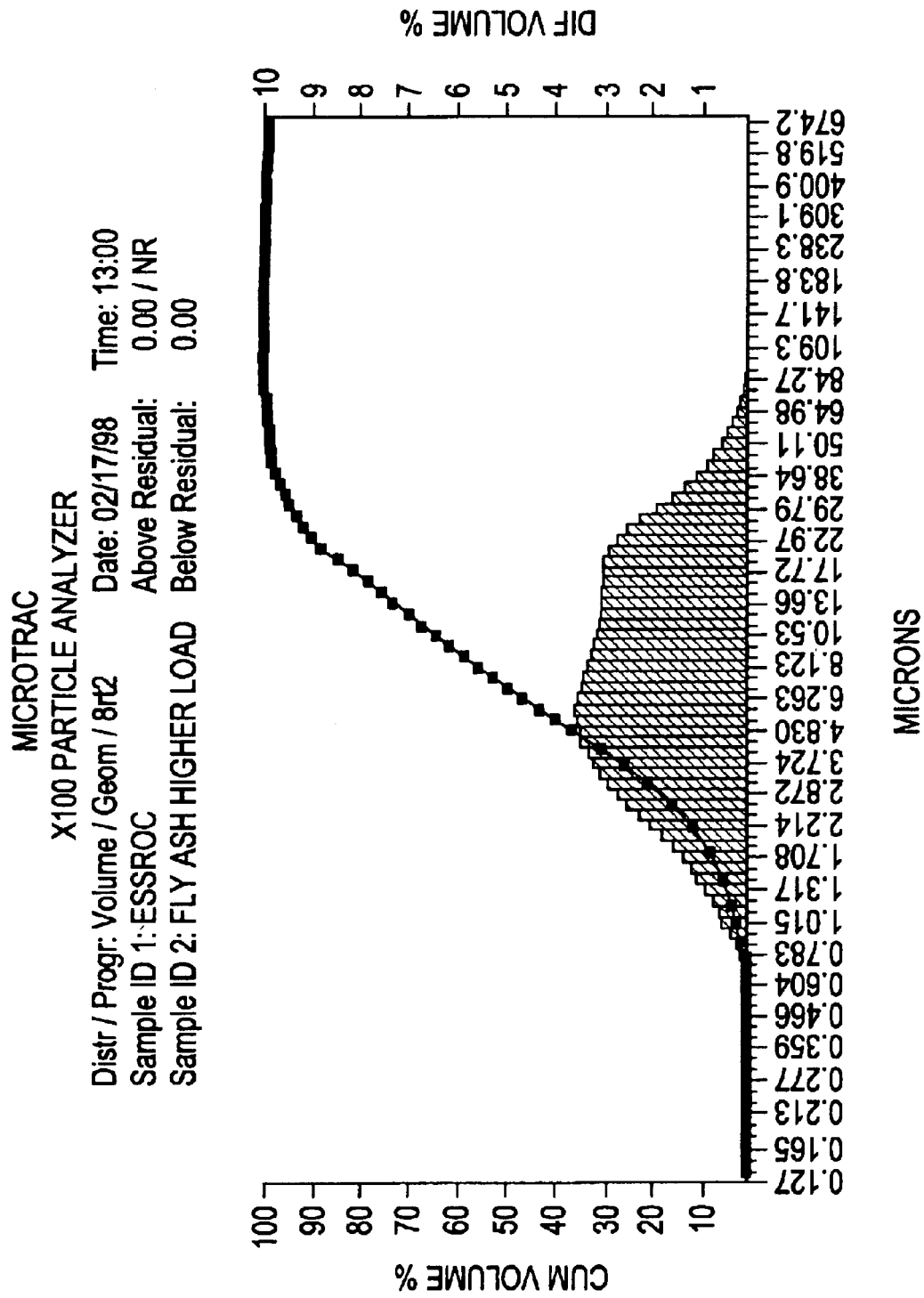
FIG. 15. Histogram of particle size verses percentage of the volume of fly ash particles having a particular size ground in an expanded bed. 1800 lbs/hour of fly ash were ground with a grinding medium comprising 5.7 gallons (229 lbs) of carbon steel spheres having a diameter of ⅛ inch. The power setting for the grinder was 66 amps, and the RPM setting of the grinder was 600.

In the case of the tests using the expanded bed and increased feed settings, the contact time between the media and the fly ash becomes shortened with an increase in feed setting. A comparison of the % volume different curves in FIGS. 13, 14 and 15 show that the particle size distributions range become broader and coarser as the feed settings are increased.

Also, it should be noted that in Table 18, as the feed settings are increased, the bed temperatures decrease from 260° F. to 195° F. Apparently, the greater rate of the fly ash process in the non-expanded mode provides a heat sink and transfer of grinding heat to the wall of the tank.

TABLE 18

Grinding Results at 400 RPM

| bed med wt (lbs) | bed med. Vol. (Gal) | amps | food setting | Prod Rate lbs/hr | % bed voids | bed prod. Vol. | 50 % particle size (μ) | % of particle 3 < 12 μ | Prod. Disch. Temp. | Prod. Dis. Open. |
|---|---|---|---|---|---|---|---|---|---|---|
| 462 | 11.5 | 65 | 440 | 1050 | 49 | 2.4 | 4.7 | 90.2 | 260 | 100 |
| 462 | 11.5 | 65 | 550 | 1440 | 49 | 2.4 | 4.3 | 93.2 | 230 | 100 |
| 462 | 11.5 | 65 | 640 | 1800 | 49 | 2.4 | 4.7 | 89.4 | 206 | 100 |
| 462 | 11.5 | 65 | 720 | 2000 | 49 | 2.4 | 4.9 | 88.9 | 200 | 100 |
| 462 | 11.5 | 65 | 800 | 2280 | 49 | 2.4 | 5.0 | 87.2 | 195 | 100 |
| 462 | 11.5 | 65 | 800 | 2280 | 37 | 3.0 | 5.0 | 86.7 | 195 | 50 |
| 462 | 11.5 | 65 | 990 | 2700 | 37 | 3.0 | 4.6 | 92.3 | 195 | 50 |
| 462 | 11.5 | 65 | 990 | 2700 | 16 | 4.0 | 5.2 | 86.6 | 195 | 25 |

Using a non-expanded bed of the invention, as much as 2700 lbs/hour of coarse fly ash can be continuously ground to produce a fly ash product with acceptable particles size distributions for use in concrete or mortar, wherein 87% or greater of the particles have a size of 12 μm or less. The present invention is not to be limited in scope by the specific embodiments describe herein. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

What is claimed is:

1. Fly ash characterized by
   a. substantially uniform spherical shape;
   b. greater than about 90% of the particles have a diameter of less than 11 μm, greater than about 60% of the particles have a diameter of less than 5.5 μm, and greater than about 15% of the particles have a diameter of less than 1.375 μm;
   c. a median particle diameter of less than about 4.0 μm; and
   d. a range of particle diameters of from about 0.1 μm to about 70 μm.

2. The fly ash of claim 1, wherein greater than about 93% of the particles have a diameter of less than 11 μm, greater than about 70% of the particles have a diameter of less than 5.5 μm, and greater than about 18% of the particles have a diameter of less than 1.375 μm.

3. The fly ash of claim 1, wherein the median particle diameter is less than about 3.0 μm.

4. The fly ash of claim 1, wherein the range of particle diameters is from about 0.9 μm to about 62 μm.

5. The fly ash of claim 1, wherein
   a) greater than about 93% of the particles have a diameter of less than 11 μm, greater than about 70% of the particles have a diameter of less than 5.5 μm, and greater than about 18% of the particles have a diameter of less than 1.375 μm;
   b) the median particle diameter is less than about 3.0 μm; and
   c) the range of particle diameters is from about 0.9 μm to about 62 μm.

6. The fly ash of claim 5, which is prepared by grinding unfractionated fly ash.

7. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight the fly ash of claim 1 and about 50% to about 90% by weight cement.

8. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight the fly ash of claim 5 and about 50% to about 90% by weight cement.

9. The concrete of claim 7 further comprising silica fume.

10. The concrete of claim 7 further comprising glass fibers.

11. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash of claim 1 and about 50% to about 90% by weight cement.

12. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash of claim 5 and about 50% to about 90% by weight cement.

13. The mortar of claim 12 further comprising silica fume.

14. The mortar of claim 12 further comprising glass fibers.

15. Fly ash prepared by processing fly ash so as to shift the size distribution to have the following characteristics:
   a) substantially uniform spherical shape;
      greater than about 90% of the particles have a diameter of less than 11 μm, greater than about 60% of the particles have a diameter of less than 5.5 μm, and greater than about 15% of the particles have a diameter of less than 1.375 μm;
   c) a median particle diameter of less than about 4.0 μm; and
   d) a range of particle diameters of from about 0.1 μm to about 70 μm; and
      wherein the said processing comprises grinding with a fluidized bed grinding process using a ratio of one part unfractionated fly ash with four parts grinding media (by volume).

16. The fly ash of claim 15 wherein the grinding media is zirconium silicate.

17. The fly ash of claim 15 wherein the grinding media is carbon steel.

18. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight the fly ash of claim 15 and about 50% to about 90% by weight cement.

19. The concrete of claim 18, further comprising silica fume.

20. The concrete of claim 18, further comprising glass fibers.

21. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight the fly ash of claim 16 and about 50% to about 90% by weight cement.

22. The concrete of claim 21 further comprising silica fume.

23. The concrete of claim 21 further comprising glass fibers.

24. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash of claim 15 and about 50% to about 90% by weight cement.

25. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash of claim 16 and about 50% to about 90% by weight cement.

26. The mortar of claim 25 further comprising silica fume.

27. The mortar of claim 25 further comprising glass fibers.

28. A method for preparing fly ash comprising processing fly ash so as to shift the size distribution to have the following characteristics:

a) substantially uniform spherical shape;

b) greater than about 90% of the particles have a diameter of less than 11 μm, greater than about 60% of the particles have a diameter of less than 5.5 μm, and greater than about 15% of the particles have a diameter of less than 1.375 μm;

c) a median particle diameter of less than about 4.0 μm; and d) a range of particle diameters of from about 0.1 μm to about 70 μm; and wherein said processing comprises grinding with a fluidized bed grinding process using a ratio of one part unfractionated fly ash with four parts grinding media (by volume).

29. The method according to claim 28, wherein the grinding media is zirconium silicate.

30. The method according to claim 28, wherein the grinding media is carbon steel.

31. The method according to claim 28 wherein the fly ash is dry bottom boiler fly ash.

32. The method according to claim 28 wherein the fly ash is wet bottom boiler fly ash.

33. Fly ash prepared by processing fly ash so as to shift the size distribution to have the following characteristics:

a) substantially uniform spherical shape;

b) greater than about 90% of the particles have a diameter of less than 12 μm, greater than about 50% of the particles have a diameter of less than 5 μm, and greater than about 15% of the particles have a diameter of less than 2.3 μm;

c) a median particle diameter of less than about 6.0 μm; and d) a range of particle diameters of from about 0.78 μm to about 30 μm; and wherein said processing comprises grinding the fly ash with a grinding medium in a non-expanded bed, and the volume of fly ash is less than the void volume of the grinding medium.

34. The fly ash of claim 33, wherein the ratio of fly ash to grinding medium is about 1 part fly ash to about 4 parts grinding medium, by volume.

35. The fly ash of claim 33, wherein the ratio of fly ash to grinding medium is about 1 part fly ash to about 18 parts grinding medium, by weight.

36. The fly ash of claim 33 wherein the grinding media comprises carbon steel or stainless steel.

37. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight the fly ash of claim 33 and about 50% to about 90% by weight cement.

38. The concrete of claim 37, further comprising silica fume, glass fibers, or a combination thereof.

39. A concrete comprising about 1 part by weight cementitious materials, about 1 to about 3 parts by weight fine aggregate, about 1 to about 5 parts by weight coarse aggregate, and about 0.35 to about 0.6 parts by weight water, wherein the cementitious materials comprise from about 10% to about 50% by weight of the fly ash of claim 33 and about 50% to about 90% by weight cement.

40. The concrete of claim 39, wherein the ratio of fly ash to grinding medium is about 1 part fly ash to about 4 parts grinding medium, by volume.

41. The concrete of claim 39, wherein the ratio of fly ash to grinding medium is about 1 part fly ash to about 18 parts grinding medium, by weight.

42. The concrete of claim 39, wherein the grinding medium comprises carbon steel.

43. The concrete of claim 39, further comprising silica fume, glass fibers, or a combination thereof.

44. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight the fly ash of claim 33 and about 50% to about 90% by weight cement.

45. A mortar comprising about 1 part by weight cementitious materials, about 1 to about 3 parts by weight fine aggregate, and about 0.35 to about 0.6 parts by weight water, wherein the cementitious materials comprise from about 10% to about 50% by weight of the fly ash of claim 33 and about 50% to about 90% by weight cement.

46. The mortar of claim 45, wherein the ratio of fly ash to grinding medium is about 1 part fly ash to about 4 parts grinding medium by volume.

47. The mortar of claim 45, wherein the ratio of fly ash to grinding medium is about 1 part fly ash to about 18 parts grinding medium, by weight.

48. The mortar of claim 45, wherein the grinding medium is carbon steel.

49. The mortar of claim 45, wherein the grinding medium is stainless steel.

50. The mortar of claim 45, further comprising silica fume, glass fibers, or a combination thereof.

51. A method for preparing fly ash comprising processing fly ash so as to shift the size distribution to have the following characteristics:

a) substantially uniform spherical shape;

b) greater than about 90% of the particles have a diameter of less than 12 μm, greater than about 50% of the particles have a diameter of less than 5 μm, and greater than about 15% of the particles have a diameter of less than 2.3 μm;

c) a median particle diameter of less than about 6.0 μm; and d) a range of particle diameters of from about 0.78 μm to about 30 μm; and wherein said method comprising grinding the fly ash with a grinding medium in a non-expanded bed, wherein the volume of fly ash is less than the void volume of the grinding medium.

52. The method of claim 51, wherein the ratio of fly ash to grinding medium is about 1 part fly ash to about 4 parts grinding medium, by volume.

53. The method of claim 51, wherein the ratio of fly ash to grinding medium is about 1 part fly ash to about 18 parts grinding medium, by weight.

54. The method of claim 51, wherein the grinding medium comprises stainless steel.

55. The method of claim 51, wherein the grinding medium comprises carbon steel.

56. The method of claim 51, wherein the fly ash is dry bottom boiler fly ash.

57. The method of claim 51, wherein the fly ash is wet bottom boiler fly ash.

* * * * *